US009849588B2

(12) United States Patent
Izhikevich et al.

(10) Patent No.: US 9,849,588 B2
(45) Date of Patent: Dec. 26, 2017

(54) APPARATUS AND METHODS FOR REMOTELY CONTROLLING ROBOTIC DEVICES

(71) Applicant: Brain Corporation, San Diego, CA (US)

(72) Inventors: Eugene M. Izhikevich, San Diego, CA (US); Patryk Laurent, San Diego, CA (US); Csaba Petre, San Diego, CA (US); Todd Hylton, La Jolla, CA (US); Vadim Polonichko, San Diego, CA (US)

(73) Assignee: Brain Corporation, San Diego, CA (US)

( * ) Notice: Subject to any disclaimer, the term of this patent is extended or adjusted under 35 U.S.C. 154(b) by 201 days.

(21) Appl. No.: 14/489,242

(22) Filed: Sep. 17, 2014

(65) Prior Publication Data
US 2016/0075015 A1 Mar. 17, 2016

(51) Int. Cl.
G05B 19/04 (2006.01)
G05B 19/18 (2006.01)
(Continued)

(52) U.S. Cl.
CPC ............ B25J 9/163 (2013.01); B25J 9/1697 (2013.01); G05B 15/02 (2013.01); H04L 12/282 (2013.01);
(Continued)

(58) Field of Classification Search
CPC ... B25J 9/16; B25J 9/0003; B25J 9/163; B25J 5901/05; B25J 9/161; B25J 9/1656;
(Continued)

(56) References Cited

U.S. PATENT DOCUMENTS 4,484,120 A 11/1984 Olex et al.
5,046,022 A 9/1991 Conway et al.
(Continued)

FOREIGN PATENT DOCUMENTS

CN 102226740 A 10/2011
JP H0487423 A 3/1992
(Continued)

OTHER PUBLICATIONS

Abbott L. F. and Nelson S.B. (2000), "Synaptic plasticity: taming the beast", Nature Neuroscience, 3, 1178-1183.
(Continued)

*Primary Examiner* — Rachid Bendidi
(74) *Attorney, Agent, or Firm* — Gazdzinski & Associates, PC

(57) ABSTRACT

Computerized appliances may be operated by users remotely. A learning controller apparatus may be operated to determine association between a user indication and an action by the appliance. The user indications, e.g., gestures, posture changes, audio signals may trigger an event associated with the controller. The event may be linked to a plurality of instructions configured to communicate a command to the appliance. The learning apparatus may receive sensory input conveying information about robot's state and environment (context). The sensory input may be used to determine the user indications. During operation, upon determine the indication using sensory input, the controller may cause execution of the respective instructions in order to trigger action by the appliance. Device animation methodology may enable users to operate computerized appliances using gestures, voice commands, posture changes, and/or other customized control elements.

22 Claims, 22 Drawing Sheets

(51) Int. Cl.
*B25J 9/16* (2006.01)
*H04L 12/28* (2006.01)
*G05B 15/02* (2006.01)

(52) U.S. Cl.
CPC .. *H04L 12/2803* (2013.01); *G05B 2219/2642* (2013.01); *G05B 2219/40411* (2013.01); *H04L 2012/2841* (2013.01); *H04L 2012/2849* (2013.01); *Y10S 901/05* (2013.01)

(58) Field of Classification Search
CPC .... B25J 9/1697; B25J 9/1612; B25J 5901/01; B25J 9/05; B25J 11/0085; B25J 13/006; B25J 13/08; B25J 19/02; B25J 4112/282; B25J 19/2803; B25J 9/1694; G06N 3/005; G06N 3/008; G06N 3/10; G06N 3/0635; G06N 3/086; G06N 3/088; G06N 3/04; G06N 3/06; G06N 3/105; H04L 2012/2849; H04L 2012/2642; H04L 2012/2841; Y10S 901/01; Y10S 901/05
USPC .... 700/253, 245, 250, 255, 257, 258; 901/5, 901/3, 9
See application file for complete search history.

(56) References Cited

U.S. PATENT DOCUMENTS

| | | | |
|---|---|---|---|
| 5,063,603 A | 11/1991 | Burt | |
| 5,079,491 A | 1/1992 | Nose et al. | |
| 5,092,343 A | 3/1992 | Spitzer et al. | |
| 5,245,672 A | 9/1993 | Wilson et al. | |
| 5,355,435 A | 10/1994 | DeYong et al. | |
| 5,388,186 A | 2/1995 | Bose | |
| 5,408,588 A | 4/1995 | Ulug | |
| 5,467,428 A | 11/1995 | Ulug | |
| 5,638,359 A | 6/1997 | Peltola et al. | |
| 5,673,367 A | 9/1997 | Buckley | |
| 5,875,108 A | 2/1999 | Hoffberg et al. | |
| 5,937,143 A | 8/1999 | Watanabe et al. | |
| 6,009,418 A | 12/1999 | Cooper | |
| 6,014,653 A | 1/2000 | Thaler | |
| 6,363,369 B1 | 3/2002 | Liaw et al. | |
| 6,458,157 B1 | 10/2002 | Suaning | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,581,046 B1 | 6/2003 | Ahissar | |
| 6,643,627 B2 | 11/2003 | Liaw et al. | |
| 7,164,971 B2 | 1/2007 | Ferla et al. | |
| 7,395,251 B2 | 7/2008 | Linsker | |
| 7,426,920 B1 | 9/2008 | Petersen | |
| 7,672,920 B2 | 3/2010 | Ito et al. | |
| 7,849,030 B2 | 12/2010 | Ellingsworth | |
| 7,937,164 B2 | 5/2011 | Samardzija et al. | |
| 7,945,349 B2 | 5/2011 | Svensson et al. | |
| 7,970,492 B2* | 6/2011 | Matsushima | B25J 9/1671 700/245 |
| 8,015,130 B2 | 9/2011 | Matsugu et al. | |
| 8,315,305 B2 | 11/2012 | Petre et al. | |
| 8,467,623 B2 | 6/2013 | Izhikevich et al. | |
| 8,494,677 B2 | 7/2013 | Mizutani | |
| 8,600,166 B2 | 12/2013 | Adhikari | |
| 8,990,133 B1 | 3/2015 | Ponulak et al. | |
| 9,111,441 B2* | 8/2015 | Yano | G08C 17/02 |
| 9,164,596 B1 | 10/2015 | Lee et al. | |
| 2002/0038294 A1 | 3/2002 | Matsugu | |
| 2003/0050903 A1 | 3/2003 | Liaw et al. | |
| 2004/0056625 A1 | 3/2004 | Sano et al. | |
| 2004/0102862 A1 | 5/2004 | Kato et al. | |
| 2004/0136439 A1 | 7/2004 | Dewberry et al. | |
| 2004/0153211 A1* | 8/2004 | Kamoto | A63H 11/00 700/245 |
| 2004/0193670 A1 | 9/2004 | Langan et al. | |
| 2004/0225416 A1 | 11/2004 | Kubota et al. | |
| 2005/0015351 A1 | 1/2005 | Nugent | |
| 2005/0036649 A1 | 2/2005 | Yokono et al. | |
| 2005/0071047 A1 | 3/2005 | Okabayashi et al. | |
| 2005/0149227 A1 | 7/2005 | Peters | |
| 2005/0283450 A1 | 12/2005 | Matsugu et al. | |
| 2006/0094001 A1 | 5/2006 | Torre et al. | |
| 2006/0145647 A1 | 7/2006 | Kitatsuji et al. | |
| 2006/0161218 A1 | 7/2006 | Danilov | |
| 2007/0022068 A1 | 1/2007 | Linsker | |
| 2007/0053513 A1 | 3/2007 | Hoffberg | |
| 2007/0176643 A1 | 8/2007 | Nugent | |
| 2007/0208678 A1 | 9/2007 | Matsugu | |
| 2007/0276690 A1 | 11/2007 | Ohtani et al. | |
| 2007/0290885 A1* | 12/2007 | Tanabe | G08C 23/04 340/13.24 |
| 2008/0085048 A1 | 4/2008 | Venetsky et al. | |
| 2008/0086241 A1 | 4/2008 | Phillips et al. | |
| 2008/0100482 A1 | 5/2008 | Lazar | |
| 2009/0043722 A1 | 2/2009 | Nugent | |
| 2009/0287624 A1 | 11/2009 | Rouat et al. | |
| 2010/0036457 A1 | 2/2010 | Sarpeshkar et al. | |
| 2010/0081958 A1 | 4/2010 | She | |
| 2010/0086171 A1 | 4/2010 | Lapstun | |
| 2010/0100240 A1 | 4/2010 | Wang et al. | |
| 2010/0119214 A1 | 5/2010 | Shimazaki et al. | |
| 2010/0166320 A1 | 7/2010 | Paquier | |
| 2010/0225824 A1 | 9/2010 | Lazar et al. | |
| 2011/0016071 A1 | 1/2011 | Guillen et al. | |
| 2011/0119214 A1 | 5/2011 | Breitwisch et al. | |
| 2011/0119215 A1 | 5/2011 | Elmegreen et al. | |
| 2011/0208355 A1 | 8/2011 | Tsusaka | |
| 2012/0011090 A1 | 1/2012 | Tang et al. | |
| 2012/0079866 A1 | 4/2012 | Kuwayama et al. | |
| 2012/0109866 A1 | 5/2012 | Modha | |
| 2012/0171927 A1 | 7/2012 | Yu | |
| 2012/0209428 A1 | 8/2012 | Mizutani | |
| 2012/0265370 A1* | 10/2012 | Kim | G07C 5/0841 701/2 |
| 2012/0295662 A1 | 11/2012 | Haubrich | |
| 2012/0303091 A1 | 11/2012 | Izhikevich | |
| 2012/0308076 A1 | 12/2012 | Piekniewski et al. | |
| 2012/0308136 A1 | 12/2012 | Izhikevich | |
| 2013/0073484 A1 | 3/2013 | Izhikevich et al. | |
| 2013/0073491 A1 | 3/2013 | Izhikevich et al. | |
| 2013/0073492 A1 | 3/2013 | Izhikevich et al. | |
| 2013/0073495 A1 | 3/2013 | Izhikevich et al. | |
| 2013/0073496 A1 | 3/2013 | Szatmary et al. | |
| 2013/0073498 A1 | 3/2013 | Izhikevich et al. | |
| 2013/0073499 A1 | 3/2013 | Izhikevich et al. | |
| 2013/0073500 A1 | 3/2013 | Szatmary et al. | |
| 2013/0077831 A1 | 3/2013 | Momozono et al. | |
| 2013/0151448 A1 | 6/2013 | Ponulak | |
| 2013/0151449 A1 | 6/2013 | Ponulak | |
| 2013/0151450 A1 | 6/2013 | Ponulak | |
| 2013/0184860 A1 | 7/2013 | Ota et al. | |
| 2013/0218821 A1 | 8/2013 | Szatmary et al. | |
| 2013/0251278 A1 | 9/2013 | Izhikevich et al. | |
| 2013/0272570 A1 | 10/2013 | Sheng et al. | |
| 2013/0297542 A1 | 11/2013 | Piekniewski et al. | |
| 2013/0310977 A1 | 11/2013 | TSUSAKA; Yuko et al. | |
| 2013/0325768 A1 | 12/2013 | Sinyavskiy et al. | |
| 2013/0325773 A1 | 12/2013 | Sinyavskiy et al. | |
| 2013/0325775 A1 | 12/2013 | Sinyavskiy et al. | |
| 2013/0325776 A1 | 12/2013 | Ponulak et al. | |
| 2013/0325777 A1 | 12/2013 | Petre et al. | |
| 2013/0326839 A1* | 12/2013 | Cho | A47L 9/2805 15/319 |
| 2014/0012788 A1 | 1/2014 | Piekniewski | |
| 2014/0041042 A1 | 2/2014 | Wong et al. | |
| 2014/0079297 A1 | 3/2014 | Tadayon et al. | |
| 2014/0081895 A1 | 3/2014 | Coenen et al. | |
| 2014/0114477 A1 | 4/2014 | Sato et al. | |
| 2014/0116469 A1* | 5/2014 | Kim | A47L 9/2894 134/18 |

(56) References Cited

U.S. PATENT DOCUMENTS

| | | | |
|---|---|---|---|
| 2015/0012943 A1 | 1/2015 | Mampaey | |
| 2016/0075015 A1 | 3/2016 | Izhikevich et al. | |
| 2016/0243701 A1* | 8/2016 | Gildert | B25J 9/1656 |

FOREIGN PATENT DOCUMENTS

| | | |
|---|---|---|
| RU | 2108612 C1 | 4/1998 |
| WO | WO-2008083335 A2 | 7/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: /&g;.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection—set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<, http: />.

Gewaltig et al.. 'NEST (Neural Simulation Tool)', Scholarpedia, 2007. pp. I-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf,2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Harmony Ultimate User Guide, Version 4, pp. 1-54 Oct. 31, 2013.

Izhikevich E.M. (2006) Polychronization: Computation With Spikes. Neural Computation, 18:245-282.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.

Karbowski et al., 'Multispikes and Synchronization in a Large Neural Network with Temporal Delays', Neural Computation 12. 1573-1606 (2000).

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/ Khotanzad.pdf.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013], Retrieved from the Internet: <URL'https://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Masquelier, Timothee, 'Relative spike time coding and STOP-based orientation selectivity in the early visual system in natural continuous and saccadic vision: a computational model.' Journal of computational neuroscience 32,3 (2012): 425-441.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005, IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi=0.1.1.5.4346&rep-repl&type-pdf.

Sato et al., 'Pulse interval and width modulation for video transmission,' Cable Television, IEEE Transactions on 4 (1978): 165-173.

Schemmel, J., Grub!, A., Meier, K., Mueller, E.: Implementing synaptic plasticity in a VLSI spiking neural network model. In: Proceedings of the 20061nternational Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/download.cgi/4620/ps/1774.pdf> Introduction.

Simulink.RTM. model [online], [Retrieved on Dec, 10, 2013] Retrieved from <URL: http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2)1 362 (2010), pp. 1-18.

Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371%2Fjournal,pcbi.1000879<url:><url:>.

Wang 'The time dimension for scene analysis.' Neural Networks, IEEE Transactions on 16.6 (2005): 1401-1426.

(56) References Cited

OTHER PUBLICATIONS

Shepard et al., "Evaluation of Smart Grid and Civilian UAV Vulnerability to GPS Spoofing Attacks", Northrop Grumman Information Systems, 2012 ION GNSS Conference Nashville, TN, Sep. 19-21, 2012.

* cited by examiner

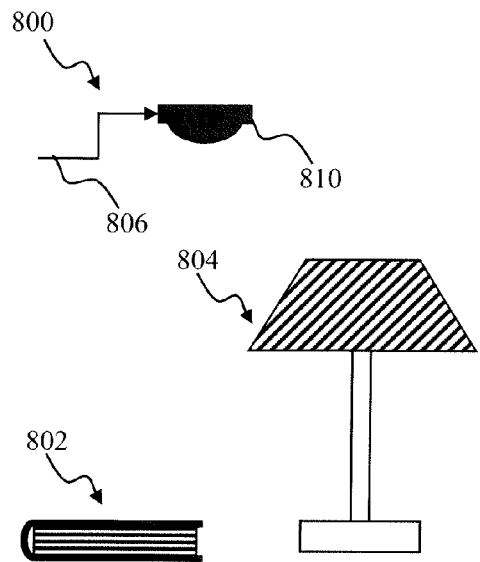
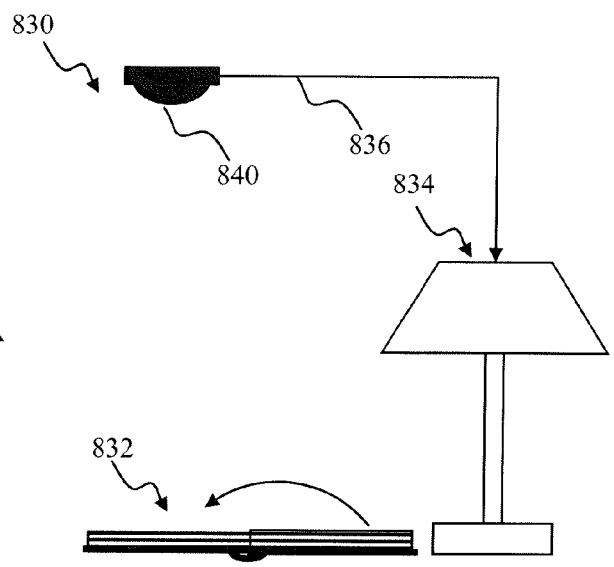
FIG. 8A                    FIG. 8B
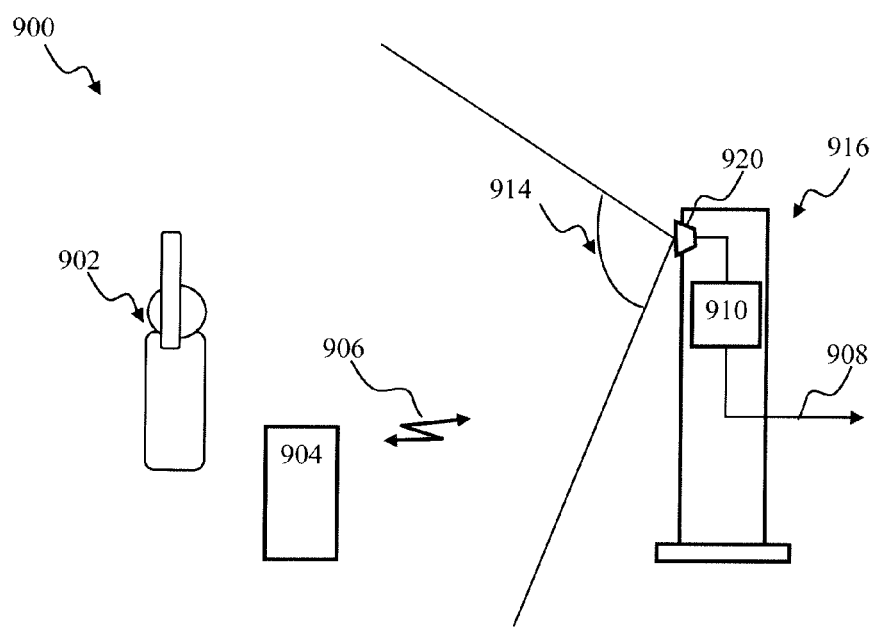
FIG. 9

```
1.  if device_name=='robome':
2.  codes['left']='6500,850,800,850,800,4250,800,850,750'
3.  codes['right']='6550,850,800,850,800,4250,800,4300,750'
4.  codes['forward']='6550,800,800,850,800,850,800,850,700'
5.  codes['backward']='6550,800,850,800,800,850,800,4300,750'
6.  codes['forward'+self.stop_string]='6550,4250,800,4300,800,4300,80
    0,4250,800'
7.  codes['right'+self.stop_string]='6450,4400,800,4250,800,4250,850,
    4250,800'
8.  codes['left'+self.stop_string]='6450,900,750,900,700,4400,650,100
    0,650'
9.  codes['backward'+self.stop_string]='6350,4400,750,4300,750,4350,7
    00,4350,850'

10.     elif device_name=='donald_duck_car':
11.     codes['forward']='2750,400,250,800,650,350,300,750,700,350,
    650,350,650,400,650,350,650,350,300,750,650,400,250,800,650,350,3
    00,750,250,800,250,800,300'
12.     codes['backward']='2800,350,300,750,700,300,650,400,250,750
    ,700,350,650,350,700,350,650,350,300,750,650,400,650,350,250,800,
    300,750,250,800,300,750,300'
13.     codes['right']='2800,350,300,750,650,400,250,800,600,400,65
    0,400,250,750,650,400,650,350,300,750,700,350,200,850,250,800,650
    ,350,650,400,200,850,250'
14.     codes['left']='2800,400,250,800,600,400,250,800,650,400,250
    ,800,650,350,650,350,650,400,200,850,650,350,250,800,250,800,650,
    400,250,800,250,750,300'
15.     codes['backleft']='2800,350,250,800,650,350,700,350,250,800
    ,250,800,650,350,700,300,650,400,250,800,650,350,300,750,650,400,
    650,350,300,750,300,750,300'
16.     codes['backright']='2800,400,250,800,650,350,650,350,300,80
    0,600,400,300,750,650,350,650,400,200,850,650,350,250,800,700,350
    ,600,400,650,400,300,750,250'
17.     codes[self.stop_any_string]='2800,350,300,750,650,350,700,3
    50,650,350,700,350,650,350,700,350,650,350,250,800,650,350,650,40
    0,650,350,300,750,300,750,250,800,250'

18.     elif device_name=='tmnt_truck':
19.     codes['forward']='7600,4450,500,1600,550,650,550,1550,550,6
    50,550,600,450,750,550,650,500,1600,8700'
20.     codes['backward']='7600,4400,450,1700,550,650,400,1700,550,
    650,500,650,550,650,500,1600,450,700,8800'
21.     codes['right']='7600,4400,450,1700,550,600,450,750,550,650,
    500,1600,550,650,550,650,550,1550,8700'
22.     codes['left']='7600,4400,500,1650,500,650,500,650,450,750,5
    50,650,550,1550,550,650,500,1600,8750'
23.     codes[self.stop_any_string]='7600,4400,550,1600,400,750,600
    ,600,550,650,500,650,550,650,500,650,450,700,8700'
```

FIG. 16

```
24.     elif device_name=='inchwm_a':
25.        codes['left']='1900,600,1950,1000,400,1550,400,1550,400,600
   ,400,600,350,650,350,650,350,650,350,1600,300,1650,350,1600,350'
26.        codes['right']='1900,550,1900,1050,300,700,300,700,350,1600
   ,350,650,300,750,250,1650,350,1650,250,750,250,1700,250,1650,300'
27.        codes['forward']='1950,600,1850,1100,300,1650,300,700,300,7
   00,250,700,350,700,300,650,250,1700,300,1700,250,1700,250,1700,30
   0'
28.        codes['forwardleft']='1950,550,1950,1000,400,1600,350,600,4
   00,1600,400,600,350,600,400,600,400,1600,400,600,300,1650,350,160
   0,350'
29.        codes['forwardright']='1950,550,1950,1000,400,600,400,1550,
   400,1600,350,650,350,600,400,1600,350,650,350,650,400,1550,350,16
   00,350'
30.        codes['backward']='1950,550,1900,1100,300,700,250,1700,300,
   700,300,700,250,700,350,1600,300,700,300,1650,300,1700,250,1700,2
   50'
31.        codes['backwardleft']='2000,500,1950,1050,350,1600,350,1600
   ,350,1600,350,650,350,650,350,650,350,650,350,650,350,1600,350,16
   00,400'
32.        codes['backwardright']='2000,500,2000,1000,350,650,350,650,
   400,550,400,1600,350,650,350,2100,400,1600,350,1600,350,650,350,1
   600,350'
33.        codes[self.stop_any_string]='2000,550,1900,1050,350,650,350
   ,650,300,700,350,650,300,650,350,1600,350,1650,300,1650,300,1650,
   300,1650,300'
34.     elif device_name=='inchwm_b':
35.        codes['left']='2000,500,2000,1000,350,1600,350,1600,350,650
   ,350,650,350,1600,350,650,350,650,350,1600,350,1600,350,650,350'
36.        codes['right']='1950,550,1950,1000,350,650,400,600,350,1600
   ,350,650,350,1600,400,1550,400,1600,350,600,400,1600,350,600,400'
37.        codes['forward']='2000,500,2000,1000,350,1600,350,650,350,6
   00,400,600,400,1550,400,600,400,1550,400,1600,350,1600,350,600,40
   0'
38.        codes['forwardleft']='2000,500,2000,1000,350,1600,350,650,4
   00,1550,400,600,350,1650,350,650,350,1600,350,650,350,1600,350,65
   0,350'
39.        codes['forwardright']='1950,550,2000,1000,350,650,350,1600,
   350,1600,400,600,400,1600,350,1600,350,650,350,650,350,1600,350,6
   50,350'
40.        codes['backward']='2000,500,2000,1000,350,650,350,1600,350,
   600,400,600,400,1550,400,1600,350,600,400,1600,350,1600,350,650,3
   50'
41.        codes['backwardleft']='2000,500,2000,1000,350,1600,350,1650
   ,350,1600,350,650,350,1600,350,650,350,650,350,650,350,1600,350,6
   50,350'
```

FIG. 16
(Continued)

```
42.      codes['backwardright']='2000,500,2000,1000,350,650,350,650,
   350,600,400,1600,350,1600,350,1650,350,1600,400,1550,350,650,350,
   650,350'
43.      codes[self.stop_any_string]='2000,500,2000,1000,350,650,350
   ,650,350,600,400,600,400,1550,400,1600,350,1600,350,1600,350,1600
   ,400,600,350'

44.    elif device_name=='spider_a':
45.      codes['left']='4200,1050,1000,1050,1050,1000,2000,1100,1050
   ,1050,1000,1050,2050'
46.      codes['right']='4150,1050,1050,1000,950,1150,950,1100,2050,
   1050,1050,1050,2000'
47.      codes['forward']='4150,1100,1000,1050,2050,1050,1000,1050,1
   050,1000,1000,1100,2050'
48.      codes['forwardleft']='4150,1050,1000,1050,2050,1100,2000,10
   50,950,1150,1000,1050,2050'
49.      codes['forwardright']='4150,1050,1000,1050,2050,1050,1050,1
   050,2050,1050,1000,1050,2050'
50.      codes['backward']=''
51.      codes[self.stop_any_string]='4100,1150,1000,1050,1000,1050,
   1000,1100,1050,1000,1000,1050,2050'

52.    elif device_name=='spider_b':
53.      codes['left']='4200,1050,2050,1000,1000,1100,2050,1050,1000
   ,1050,1000,1100,1000'
54.      codes['right']='4200,1000,2050,1050,1000,1050,900,1150,2050
   ,1050,1050,1050,1000'
55.      codes['forward']='4200,1050,2050,1050,2000,1100,1000,1050,1
   050,1000,950,1150,1000'
56.      codes['forwardleft']='4150,1050,2050,1050,2050,1050,2000,11
   00,1000,1100,1000,1050,900'
57.      codes['forwardright']='4150,1050,2050,1050,2050,1050,1000,1
   050,2050,1050,1050,1000,950'
58.      codes['backward']=''
59.      codes[self.stop_any_string]='4150,1050,2050,1050,1050,1000,
   1000,1100,1000,1050,1000,1050,1050'

60.    elif device_name=='bc_samsung_tv':
61.      codes['forward']='4450,4600,500,1700,500,1750,500,1750,500,
   600,500,650,500,600,500,650,500,600,500,1750,500,1750,500,1750,50
   0,600,500,600,500,650,500,600,500,650,500,600,500,1750,500,600,50
   0,650,500,1750,500,600,500,600,500,650,500,1750,500,600,500,1750,
   500,1750,500,600,500,1750,500,1750,500,1750,450'
```

FIG. 16
(Continued)

```
62.     codes['backward']='4450,4550,500,1750,500,1750,500,1700,500
   ,650,500,600,500,650,500,600,500,600,500,1750,500,1750,500,1750,5
   00,600,500,650,500,600,500,650,500,600,500,600,500,650,500,600,50
   0,650,500,1700,500,650,500,600,500,650,500,1700,500,1750,500,1750
   ,500,1750,500,600,500,1750,500,1750,500,1750,500'
63.     codes['left']='4450,4550,500,1750,500,1750,500,1750,500,600
   ,500,650,450,650,500,600,500,650,500,1750,450,1750,500,1750,500,6
   50,450,650,500,600,500,650,500,600,500,1750,500,1750,500,1750,500
   ,600,500,650,450,650,500,600,500,650,500,600,500,650,450,650,500,
   1750,500,1750,500,1700,500,1750,500,1750,500'
64.     codes['right']='4450,4600,450,1750,500,1750,500,1750,500,60
   0,500,650,500,600,500,650,500,600,500,1750,500,1750,450,1800,450,
   650,500,600,500,650,500,600,500,650,500,1700,500,1750,500,650,500
   ,1700,500,650,500,600,500,650,500,600,500,650,450,650,500,1750,50
   0,600,500,1750,500,1750,500,1750,500,1700,500'
65.     codes['forward'+self.stop_string]=''
66.     codes['backward'+self.stop_string]=''
67.     codes['right'+self.stop_string]=''
68.     codes['left'+self.stop_string]=''

69.   elif device_name=='robosapien':
70.     codes['left_hand_up']='7000,3400,850,950,850,900,900,900,85
   0,3400,850,950,850,900,900,3400,800'
71.     codes['left_hand_down']='7050,3400,850,950,850,900,850,950,
   850,3400,850,3400,900,900,850,950,800'
72.     codes['right_hand_up']='7050,3400,850,900,850,950,850,950,8
   50,900,850,950,850,950,850,3400,850'
73.     codes['right_hand_down']='7000,3400,850,950,900,900,850,900
   ,850,950,850,3400,850,950,850,950,850'
74.     #codes['forward']='7000,3450,850,900,850,950,850,950,850,90
   0,850,3400,850,3400,900,900,850'
75.     #codes['left']='7000,3400,850,900,900,900,850,950,850,900,8
   50,950,850,900,900,900,850'
76.     #codes['right']='7050,3400,850,900,850,950,850,950,850,3400
   ,850,900,900,900,850,950,850'
77.     #codes['backward']='7000,3400,850,950,850,900,900,900,850,9
   50,850,3400,850,3400,850,3400,900'
78.     #codes['forward'+self.stop_string]='7050,3400,850,900,850,9
   50,850,950,850,3400,850,3400,850,3400,850,950,850'
79.     #codes['left'+self.stop_string]='7050,3400,850,900,850,950,
   850,950,850,3400,850,3400,850,3400,850,950,850'
80.     #codes['right'+self.stop_string]='7050,3400,850,900,850,950
   ,850,950,850,3400,850,3400,850,3400,850,950,850'
81.     #codes['backward'+self.stop_string]='7050,3400,850,900,850,
   950,850,950,850,3400,850,3400,850,3400,850,950,850'
```

FIG. 16
(Continued)

```
82.     elif device_name == 'insignia_tv':

83.       codes['volume_up'] =
   '8968,4574,515,608,510,1739,509,1734,517,609,512,606,518,609,508,
   610,519,1727,522,1725,525,602,511,1734,518,605,519,605,515,609,51
   7,605,514,609,517,606,515,610,513,1734,518,1730,514,602,522,607,5
   13,604,525,601,517,1728,515,1734,515,604,521,604,517,1729,519,172
   9,520,1726,520,1728,521'

84.       codes['volume_down'] =
   '8965,4573,529,595,528,1718,532,1715,529,592,528,597,528,591,530,
   596,527,1718,529,1715,529,590,534,1713,536,593,527,592,535,590,52
   8,593,532,592,528,1718,529,594,530,1718,530,1715,529,590,532,594,
   529,591,534,592,529,589,537,1711,534,591,530,589,537,1710,537,171
   0,535,1713,532,1717,534'

85.       codes['channel_up'] =
   '8960,4577,505,613,512,1733,517,1731,517,609,506,615,515,609,510,
   612,512,1736,515,1732,513,605,517,1729,520,605,511,609,519,609,50
   8,609,516,613,510,608,518,1730,519,606,511,1732,518,606,522,600,5
   18,606,516,605,518,1727,523,605,510,1733,517,602,520,1725,519,172
   9,523,1725,523,1726,520'

86.       codes['channel_down'] =
   '8964,4577,530,588,532,1715,532,1715,530,592,530,594,527,595,530,
   594,534,1715,528,1715,531,597,527,1720,527,592,532,592,530,594,52
   8,591,531,594,528,1718,532,1712,528,595,527,1721,531,590,530,597,
   531,591,531,591,528,598,527,594,528,1718,532,592,528,1715,530,171
   2,534,1715,534,1715,530'

87.       codes['power'] =
   '8960,4580,524,592,534,1714,540,1708,540,586,528,596,530,594,528,
   598,528,1720,530,1718,526,594,534,1712,536,592,528,588,538,592,52
   6,592,536,596,526,1720,522,1724,526,1720,528,1716,534,594,532,588
   ,534,596,526,592,534,596,526,594,532,596,522,592,538,1710,536,171
   2,534,1716,536,1712,532'

88.     elif device_name == 'tivo':

89.       codes['play'] =
   '8961,4540,504,1741,497,619,481,1753,489,626,479,628,477,632,475,
   630,475,1754,487,630,475,631,475,631,475,632,477,1756,482,1751,49
   1,628,477,632,476,1749,490,632,477,631,478,630,477,628,477,1754,4
   86,629,479,630,476,630,475,632,475,630,478,628,478,1756,481,629,4
   78,1748,492,1747,492'
```

FIG. 16
(Continued)

90.     codes['pause'] =
    '8960,4543,493,1752,489,620,485,1753,488,620,487,622,483,623,484,
    622,485,1750,489,621,486,623,482,623,487,621,484,1752,488,1751,48
    8,621,488,623,484,1748,492,1747,491,619,488,622,485,621,484,1749,
    492,621,486,622,485,620,484,622,488,619,485,620,489,1747,489,621,
    489,1745,492,1748,492'

91.     codes['slow'] =
    '8932,4569,499,1739,499,613,494,1742,500,609,495,613,495,611,496,
    612,493,1744,499,610,497,614,493,611,497,606,497,1747,497,1741,50
    0,610,496,608,497,1744,498,607,497,1745,499,608,496,610,496,1743,
    500,606,497,613,495,613,494,611,495,616,494,611,495,1743,496,613,
    496,1741,498,1741,499' end;

APPARATUS AND METHODS FOR REMOTELY CONTROLLING ROBOTIC DEVICES

CROSS-REFERENCE TO RELATED APPLICATIONS

This application is related to co-pending and co-owned U.S. patent application Ser. No. 14/489,368, entitled "APPARATUS AND METHODS FOR CONTEXT DETERMINATION USING REAL TIME SENSOR DATA", filed contemporaneously herewith on Sep. 17, 2014; Ser. No. 14/489,353, entitled "HOME ANIMATION APPARATUS AND METHODS", filed contemporaneously herewith on Sep. 17, 2014; Ser. No. 14/489,373, entitled "APPARATUS AND METHODS FOR REMOVAL OF LEARNED BEHAVIORS IN ROBOTS", filed contemporaneously herewith on Sep. 17, 2014, Ser. No. 14/244,888, entitled "LEARNING APPARATUS AND METHODS FOR REMOTE CONTROL OF ROBOTIC DEVICES VIA SPOOFING", filed Apr. 3, 2014, Ser. No. 14/244,892 entitled "SPOOFING REMOTE CONTROL APPARATUS AND METHODS", filed Apr. 3, 2014, Ser. No. 14/244,890, entitled "APPARATUS AND METHODS FOR REMOTELY CONTROLLING ROBOTIC DEVICES", filed Apr. 3, 2014, Ser. No. 14/208,709 entitled "TRAINABLE MODULAR ROBOTIC APPARATUS AND METHODS", filed Mar. 13 2014, Ser. No. 13/953,595 entitled "APPARATUS AND METHODS FOR CONTROLLING OF ROBOTIC DEVICES", filed Jul. 29, 2013, Ser. No. 13/918,338 entitled "ROBOTIC TRAINING APPARATUS AND METHODS", filed Jun. 14, 2013, Ser. No. 13/918,298 entitled "HIERARCHICAL ROBOTIC CONTROLLER APPARATUS AND METHODS", filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, Ser. No. 13/842,583 entitled "APPARATUS AND METHODS FOR TRAINING OF ROBOTIC DEVICES", filed Mar. 15, 2013, Ser. No. 13/918,620 entitled "PREDICTIVE ROBOTIC CONTROLLER APPARATUS AND METHODS", filed Jun. 14, 2013, and Ser. No. 13/465,918 entitled "SPIKING NEURAL NETWORK OBJECT RECOGNITION APPARATUS AND METHODS", filed May 7, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of computerized devices.

Background

Computerized devices may be used in a variety of home automation applications such as autonomous vacuum cleaners, multifunction remote controllers, entertainment appliances, lighting systems and/or other appliances. Some existing devices (e.g., Roomba®) may be pre-programmed at a factory in order to perform desired functionality. Some existing devices (e.g., Harmony Remote®) may be programmed by a user in order to perform desired functionality. Some home automation devices (e.g., Savant audio/video distribution and/or lighting appliances) may interface with a portable device (e.g., a tablet, smartphone) running a specific application (App) in order to enable a user to operate the appliance. However, operation of robotic devices by such controllers may be characterized by a constrained form of the user interface, e.g., a requirement to carry around e.g., an iPhone, in order to be able to turn on/off an audiovisual equipment. Some such existing solutions may require some form of "programming" (e.g., button assignment, model selection) at minimum, arranging buttons on one or more page views of a smartphone app, and/or other operation.

SUMMARY

One aspect of the disclosure relates to a robotic system. The system may comprise a first robotic device. The system may comprise a remote controller configured to provide a first wireless transmission conveying a first control instruction from a user to the first robotic device. The first control instruction may be configured to cause the first robotic device to execute a first action. The system may comprise a learning controller apparatus configured to, during first time interval: receive the first wireless transmission; determine a first context associated with execution of the first action; and determine an association between data related to the first control instruction and the first context. During a second time interval, subsequent to the first time interval, the learning controller apparatus may be configured to: determine another version of the first context related to execution of the first action; and provide, in lieu of the first control instruction, a first remote transmission conveying data related to the first control instruction, the data related to the first control instruction being configured to cause the first robotic device to execute the first action.

A method of providing transmissions to a remotely controlled apparatus by a learning controller is disclosed. In one embodiment, the method includes: configuring the learning controller to monitor one or more sensors configured to provide information related to a state of the remotely controlled apparatus disposed remotely from the learning controller; and enabling the learning controller to transmit a wireless command to the apparatus.

In one variant, at least one of the one or more sensors comprises a video camera. In some implementations, the transmission of the wireless command comprises an infrared signal transmission. In other implementations, the transmission of the wireless command comprises a radio frequency signal transmission.

In another variant the learning controller is configured to record user commands and the state of the remotely controlled apparatus; and the learning controller transmits the wireless command when the remotely controlled apparatus is in a recording state.

In still other variants, the learning controller comprises a computing cloud entity in data communication with the remotely controlled apparatus; the computing cloud entity is configured to record the state of the remotely controlled apparatus; and the computing cloud entity is configured to provide the wireless command based on a detection of the remotely controlled apparatus entering a recorded state.

In another variant, the learning controller is further configured to receive the wireless command from a computing cloud entity, the wireless command based on a profile configured to associate the state with the wireless command, where the learning controller is disposed remote from the cloud entity; and the profile is configured in accordance with a characteristic of the remotely controlled apparatus.

A method of remotely controlling a robotic device by a universal controller is disclosed. In one embodiment the method includes: loading a set of instructions within the universal controller, the set of instructions configured to control the robotic device; monitoring a state of the robotic device; determining a command according to the set of instructions; and transmitting the command to the robotic device, the transmission causing the robotic device to execute the command to perform a task.

In one variant, the state of the robotic device comprises a position of the robotic device in an environment of the robotic device.

In another variant, the state of the robotic device comprises a parameter characterizing an event that is external to the robotic device. For example, the parameter may convey one or more of a position, a gesture, or a movement of a person.

In one variant, the robotic device is configured to perform the task within an environment comprising one or more objects; and the task comprises the robotic device displacing at least one of the one or more objects within the environment.

In one variant, the robotic device is configured to perform the task within an environment comprising one or more objects characterized by corresponding object motion parameters; the command execution is characterized by a first motion parameter of the robotic device; and the command execution is configured based on a modification of the first motion parameter based on value associated with at least one of the corresponding object motion parameters.

In some variants the set of instructions was previously configured for another robotic device or another task.

In some implementations, the loading of the set of instructions is triggered automatically based on a detection of a remote transmission or a pre-defined context in a sensory input.

In yet another incarnation, monitoring the state of the robotic device comprises receiving an input from a video camera. In one such case, the robotic device is configured to perform the task within an environment comprising one or more objects; and the monitored state comprises a position of the robotic device relative to a position of the one or more objects determined based on the input from the video camera.

In one variation, the robotic device is configured to perform the task within an environment comprising one or more objects characterized by corresponding object motion parameters; and the task comprises removing one of the one or more objects from a subset of the environment. In another such example, the robotic device is configured to perform the task within an environment comprising a first area and a second area; the monitoring comprises monitoring the state of the robotic device by the first universal controller in the first area and where the state of the robotic device is monitored by another universal controller in the second area; and the transmission of the command is effectuated by one of the universal controller when the robotic device is within the first area.

In some embodiments, the robotic device is configured to receive the transmission of the command from the universal controller when the robotic device is within the first monitoring area; and the robotic device is configured to receive another transmission from the another universal controller when the robotic device is within the second monitoring area.

In one variant, the robotic device comprises a sensor component; the transmission comprises transmission of an infrared frequency signal; and the state of the robotic device is determined based on an output provided by the sensor component.

In still other variants, the robotic device comprises a household appliance; and the task comprises one or more of a cleaning task.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 8A-8B illustrate operation of a computerized light fixture by a learning system configured to determine sensory context and using context-action associations, according to one or more implementations.

FIG. 9 is a functional block diagram illustrating a system comprising a learning controller configured to automate operation of home entertainment appliance (e.g., a TV), according to one or more implementations.

FIG. 16 is a computer program listing illustrating exemplary control command codes for a plurality of selected remotely controlled devices, according to one or more implementations.

Figure 1A:
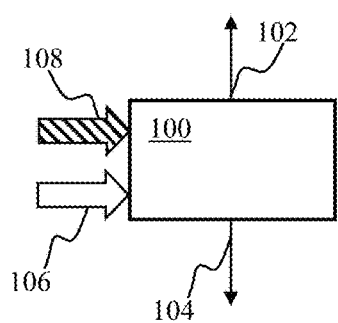
FIG. 1A is a block diagram illustrating a computerized apparatus configured for learning associations between sensory context and control commands for an appliance, according to one or more implementations.

All Figures disclosed herein are © Copyright 2014 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1A illustrates a computerized apparatus configured for learning associations between sensory context and control commands for a robotic device (e.g., a computerized appliance), according to one or more implementations. As used herein the terms robotic device, computerized appliance and/or appliance device may be used to describe an electrical and/or electromechanical apparatus comprising a processing apparatus, non-transitory computer readable media, and/or computerized interface configured to enable the apparatus to perform a household and/or office function/task autonomously (such as via one or more instructions which are locally stored with the processing apparatus) and/or based on one or more remote instructions received via a remote interface (e.g., a network interface, etc.). In some implementations, the computerized apparatus 100 of FIG. 1A may comprise a specialized computerized apparatus (e.g., bStem™ integrated platform, described in, http://www.braincorporation.com/specs/BStem_SpecSheet_Rev_Nov11_2013.pdf, the foregoing being incorporated herein by reference in its entirety, and/or the apparatus 1000 shown and described with respect to FIG. 10 below) configured to operate a learning process. In one or more implementations, the learning process operation may be effectuated by a BrainOS software platform that may include software configured to instantiate modules and/or robotic brain images, and containing learning algorithms not limited to artificial neural networks and other machine learning algorithms. The BrainOS software platform may provide functionality for a software module that may be typical of an operating system including but not limited to: saving, loading, executing, duplicating, restoring, reverting, check pointing, analyzing, debugging, and uploading/downloading operations to/from remote cloud storage. In some implementations, the BrainOS modules or robotic brain images may be used with the intent to control a robotic device and be broadly construed to include actuators and switches as may be present in a home automation system. In one or more implementations, the computerized apparatus 100 may comprise a general use computerized apparatus (e.g., a tablet, a smartphone, a computer, and/or other computerized device) configured to operate the BrainOS library. In one or more implementations, the apparatus 100 may comprise a user interface device to a remote server (e.g., a browser terminal interfacing to a cloud computing service (e.g., Amazon Web Service™, Rackspace, IBM, and/or other services).

The apparatus 100 may comprise an interface to a sensor component configured to provide sensory input 108 to the learning process. In some implementations, the sensor component of the may comprise a camera, a microphone, a radio wave sensor, an ultrasonic sensor, and/or other sensor capable of providing information related environment of the appliance device. The sensor information may be used for determining context associated with the environment using any applicable methodologies including these described below with respect to FIG. 15

In one or more implementations, such as object and/or gesture recognition, the sensory input 108 may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red green, blue (RGB) values refreshed at a 25 Hz frame rate (and/or any suitable frame rate). It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in U.S. patent application Ser. No. 13/623,842 filed Sep. 20, 2012, and entitled "SPIKING NEURON NETWORK ADAPTIVE CONTROL APPARATUS AND METHODS", issued as U.S. Pat. No. 9,367,798 on Jun. 14, 2016, the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013 and issued as U.S. Pat. No. 9,213,937 on Dec. 15, 2015, each of the foregoing being incorporated herein by reference in its entirety.

Contemporaneous with the sensory input 108 the apparatus 100 may receive control input 106 comprising one or more commands for the appliance device. In one or more implementations, the appliance device may comprise an autonomous vacuum cleaner, a lighting device, an entertainment appliance, a heating, ventilation, and air conditioning (HVAC) device, a remotely operated fan, a lawnmower, a mechanized trash bin, a sprinkler system, and/or other home electrical and/or electromechanical apparatus.

In some implementations, e.g., such as described in U.S. patent application Ser. No. 14/244,888, entitled "LEARNING APPARATUS AND METHODS FOR CONTROL OF ROBOTIC DEVICES VIA SPOOFING", filed Apr. 3, 2014, the contents of which were previously incorporated herein by reference in its entirety supra, the control input 106 may be provided by a user of the appliance using a remote control device. On one or more implementations, the input 106 may be provided by a computerized agent, e.g., home automation controller, a proximity sensor, a motion detection device. The input 106 may be communicated using via a wired (e.g., light switch, serial bus, Ethernet) interface and/or wireless (e.g., using radio frequency (RF), infrared (IR), pressure (sound), light, and/or other wave carrier transmissions).

By way of an illustration, a user may use a gesture (e.g., point a hand at a remotely operated lamp) accompanied by a command issued via a remote control device. The sensory input 108 may comprise a video camera output, the control input 106 may comprise one or more infrared light, RF pulses and/or other pulses associated with a button press of the remote controller.

The apparatus 100 may operate an adaptable predictor block configured to, inter alia, determine an association between the remote control instructions 106 and context determined from the sensory input 108. In some implementations, the context may comprise location of user body, head, and/or limb position, orientation, and/or configuration), presence, size, and/or location of objects (e.g., other users), and/or other information associated with environment of the user (e.g., daylight temperature, time of day, and/or other information). By way of an illustration, the same gesture issued in different locations by a user may comprise different sensory contexts.

Various methodologies may be utilized in order to determine the associations between the context and user instructions, including, e.g., these described in U.S. patent application Ser. No. 13/953,595 entitled "APPARATUS AND METHODS FOR CONTROLLING OF ROBOTIC DEVICES", filed Jul. 29, 2013; U.S. patent application Ser. No. 13/918,338 entitled "ROBOTIC TRAINING APPARATUS AND METHODS", filed Jun. 14, 2013; U.S. patent application Ser. No. 13/918,298 entitled "HIERARCHICAL ROBOTIC CONTROLLER APPARATUS AND METHODS", filed Jun. 14, 2013; U.S. patent application Ser. No. 13/918,620 entitled "PREDICTIVE ROBOTIC CONTROLLER APPARATUS AND METHODS", filed Jun. 14, 2013; U.S. patent application Ser. No. 13/907,734 entitled "ADAPTIVE ROBOTIC INTERFACE APPARATUS AND METHODS", filed May 31, 2013; U.S. patent application Ser. No. 13/842,530 entitled "ADAPTIVE PREDICTOR APPARATUS AND METHODS", filed Mar. 15, 2013; U.S. patent application Ser. No. 13/842,562 entitled "ADAPTIVE PREDICTOR APPARATUS AND METHODS FOR ROBOTIC CONTROL", filed Mar. 15, 2013; U.S. patent application Ser. No. 13/842,616 entitled "ROBOTIC APPARATUS AND METHODS FOR DEVELOPING A HIERARCHY OF MOTOR PRIMITIVES", filed Mar. 15, 2013; U.S. patent application Ser. No. 13/842,647 entitled "MULTICHANNEL ROBOTIC CONTROLLER APPARATUS AND METHODS", filed Mar. 15, 2013; and U.S. patent application Ser. No. 13/842,583 entitled "APPARATUS AND METHODS FOR TRAINING OF ROBOTIC DEVICES", filed Mar. 15, 2013; each of the foregoing being incorporated herein by reference in its entirety, and/or U.S.

patent application Ser. No. 14/244,890, entitled "APPARATUS AND METHODS FOR REMOTELY CONTROLLING ROBOTIC DEVICES", filed Apr. 3, 2014, previously incorporated herein by reference in its entirety supra.

An action may be assigned to a given context. In some implementations, e.g., such as described below with respect to FIGS. 6A-6B, a context, comprising detection of a book being open, may be assigned an action comprising execution of a command to turn on a desk lamp. In some implementations of associations based on a look up table (LUT), upon detecting a context (the book being open) and an action to turn the light on, an entry in the LUT corresponding to a combination of opening of a book and the "LIGHT ON" command may be incremented. In some implementations, the combination may comprise opening of a book and turning off of the TV, and/or other combinations. In one or more implementations of the disclosure using a predictor comprising artificial neuron networks, occurrence of a given combination may cause an increment of a corresponding connection efficacy.

Developed associations between the sensory context and the control commands may be stored for further use, as shown by arrow 104 in FIG. 1A. In some implementations, e.g., such as illustrated with respect to FIG. 10 below, the association information 104 may comprise a LUT stored within a nonvolatile storage medium of the learning controller apparatus. In one or more implementations, e.g., such as illustrated with respect to FIG. 4, the association information 104 may be on a nonvolatile storage medium disposed outside of the learning controller apparatus (e.g., within a computing Cloud, and/or other storage device, e.g., depository 406 in FIG. 4)).

During learning, the apparatus 100 may be configured to provide feedback 102. In some implementations of training by the user, the feedback 102 may comprise one or more of audible, vibration, and/or visible indications to the user configured to communicate information related to learning progress (e.g., a success indication signifying that the control command was received and the association with the sensory context was determined and stored, a failure-to-learn indication signifying that the control command was received but the association with the sensory context was not successfully determined or stored; and/or a perceptual indication signifying that the sensory context was ambiguous, had no discernible signal, and/or substantially overlapped with the sensory context already associated with another control command.) In some implementations, lack of the indication may signify to the user that the control command was not received by the appliance (e.g., due to obstruction or interference). In some implementations of training by the computerized agent, the feedback 102 may comprise one or more of electrical, infrared, RF, signals and/or computer messages configured to communicate information related to learning progress.

Upon developing the associations between the sensory context and the remote control commands, the computerized apparatus (e.g., 100 in FIG. 1A) may be capable of providing one or more control instructions to appliance device in lieu of the remote control commands 106 provided by the user and/or computerized agent.

Figure 1B:
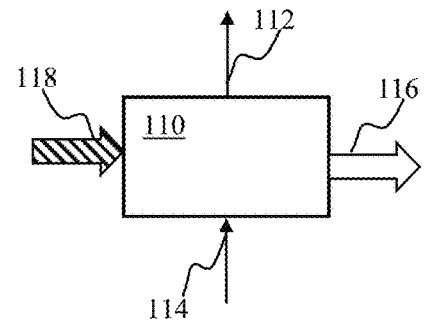
FIG. 1B is a functional block diagram illustrating operation of the learning apparatus of FIG. 1A, according to one or more implementations.

FIG. 1B illustrates provision of control instructions to an appliance device by a computerized controller apparatus, according to one or more implementations. The apparatus 110 may comprise a specialized and/or commercially available computerized apparatus, e.g., the apparatus 100 described above with respect to FIG. 1A above. The apparatus 110 may be configured to operate a control process configured to produce control output 116. In some implementations, the control output 116 may comprise one or more instructions to an appliance device (e.g., an autonomous vacuum cleaner) based on occurrence of a given sensory context determined in sensory input 118.

The apparatus 110 of FIG. 1B may utilize process configuration 114 (e.g., the configuration 104 learned during training and described above with respect to FIG. 1A) in order relate the occurring context to a respective control output 116. In one or more implementations, the configuration 114 may comprise a look up table whose entries have been populated during learning, an array of efficacies (e.g., weights) for an artificial neuron network (e.g., a perceptron), and/or other configuration. Provision of the control instructions 116 may be effectuated over wired and/or wireless interface.

The apparatus 110 of FIG. 1B may comprise an interface to a sensor component configured to provide the sensory input 118 to the control process. In some implementations, the sensory input may comprise a visual, audio, radio frequency and/or other sensor data, e.g., such as described above with respect to FIG. 1A. The sensor information may be used for determining context associated with the environment using any applicable methodologies including these described below with respect to FIG. 15 and/or FIGS. 17A-17D. In one or more implementations, such as object and/or gesture recognition, the sensory input 118 may comprise a sequence of digital images comprised of pixels.

The control instructions of the output 116 may be produced based on a determination of occurrence one or more previously occurring context(s) within the sensory input 118. By way of an illustration, the apparatus 110 may determine an occurrence of a gesture (e.g., a user pointing a hand at a TV) using a camera, a voice command "ROOMBA VACUUM DINGING ROOM NOW" using a microphone, and/or other context. During learning, contemporaneously with the gesture, the user may issue an "ON" control command to the TV, e.g., using an RF or IR remote controller as described above with respect to FIG. 1A. During operation, subsequent to learning, the apparatus 110 may automatically determine that the "ON" control command is to be provided based on detecting the user pointing a hand at the TV in the sensory input 118. The apparatus 110 may automatically provide the "ON" control command to the TV via output 116. In some implementations, the ON control command provision may be effectuated using an RF/IR interface. Such functionality may (i) obviate need for users of home appliances and/or other devices to perform step-by-step control of robotic devices, (ii) enable prompt command responses to changes in context, provide more precise commands, (iii) provide commands fully autonomously, and/or (iv) generate multiple commands for simultaneous control of multiple controllable aspects (e.g., speed, direction, channel, volume) and/or operate multiple devices contemporaneous with one another (e.g., mute TV while activating phone speaker function) and/or other advantages that may be discernable given the present disclosure.

During operation, the apparatus 110 may be configured to provide feedback 112. In some implementations of training by the user, the feedback 112 may comprise one or more of audible, vibration, and/or visible indications to the user configured to communicate information related to operation progress (e.g., such as described above with respect to FIG. 1A). In some implementations of training by the computerized agent, the feedback 112 may comprise one or more of electrical, infrared, RF, signals and/or computer messages configured to communicate information related to learning progress.

In some implementations, wherein the output 116 may comprise RF signal transmission, a bound connection (e.g. a radio link session) may be established between a controller 110 and the appliance. Some link examples may include a Bluetooth session, a Digital Spectrum Modulation (DSM) session, and/or other links. The link may be established based on identity of the appliance device and/or the controller.

In one or more implementations, wherein information for establishment of the link (e.g., communication protocol, hopping sequence, device identification codes, and/or other), may not be readily available, a multi-carrier command delivery approach may be employed, e.g., such as described below with respect to FIG. 2A.

Figure 2A:
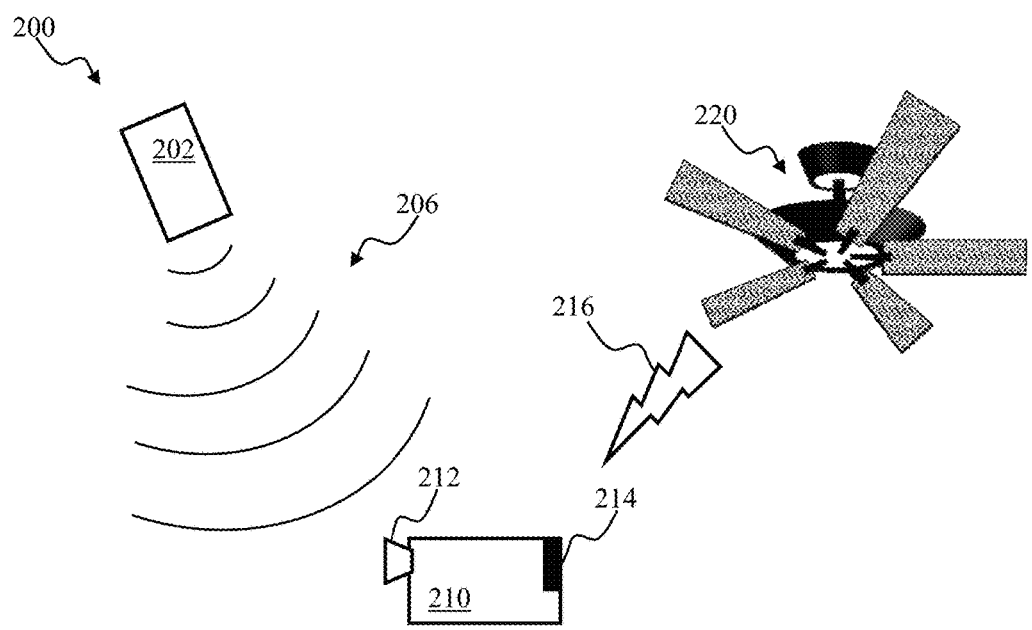
FIG. 2A is a functional block diagram illustrating a system comprising a controller apparatus in data communication with a computerized appliance and remote control device, according to one or more implementations.

FIG. 2A illustrates a system comprising a controller apparatus in data communication with a computerized appliance via a link of one signal carrier type and a remote control device via another signal carrier type, according to one or more implementations.

Figure 2B:
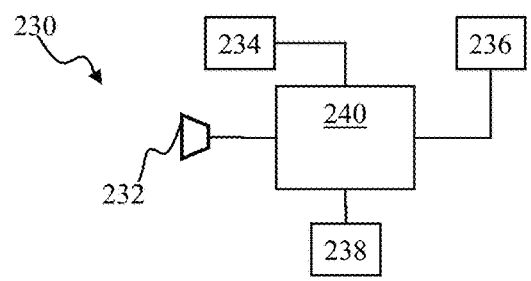
FIG. 2B is a functional block diagram illustrating the learning controller apparatus of FIG. 2A, according to one or more implementations.

The system 200 may comprise a learning controller apparatus 210, e.g., the apparatus 100, 110 described above with respect to FIGS. 1A-1B and/or apparatus 230 shown in FIG. 2B. The system 200 may comprise a computerized appliance (e.g., remotely controlled fan 220), and a remote controller 202 configured to provide control commands for the appliance 220. In the implementation of FIG. 2A, the remote controller 202 may utilize carrier of a first type (e.g., IR waves) for communicating control instructions 206 to the controller 210. The controller 210 may comprise a remote controller component 214 (component 234 in FIG. 2B) configured to provide control commands via transmissions 216 to the appliance 220. In one exemplary implementation, the component 214 may comprise electronics portion of a remote controller comprising a transmitter configured to interface to the appliance 220 (e.g., fan remote controller printed circuit board without the enclosure) interfaced to processing component of the controller 210 (e.g., the component 238 of the controller 230 in FIG. 2B). The interface may comprise an electrical component configured to operate at a given voltage, pull-up or pull-down resistors, and/or other circuitry.

Various implementations of the data communication 216 between the controller component 214 and the appliance 220 may be employed. In some implementations, a Direct Sequence Spread Spectrum (DSSS), and/or frequency hopping spread spectrum" (FHSS) technology may be utilized. DSSS communication technology may employ carrier phase-modulation using a string of pseudorandom (PR) code symbols called "chips", each of which may have duration that is shorter than an information bit. That is, each information bit is modulated by a sequence of much faster chips. Therefore, the chip rate is much higher than the information signal bit rate. DSSS uses a signal structure in which the sequence of chips produced by the transmitter is already known by the receiver. The receiver may apply the known PR sequence to counteract the effect of the PR sequence on the received signal in order to reconstruct the information signal.

Frequency-hopping spread spectrum (FHSS) is a method of transmitting radio signals by rapidly switching a carrier among many frequency channels, using a pseudorandom sequence known to both transmitter and receiver.

The controller apparatus 210 may comprise a sensor component 212 configured to provide sensory input to the controller. In some implementations of a bStem™ integrated platform, the component may comprise a discrete camera module and/or microphone component. In one or more implementations wherein the controller 210 may comprise a portable computing and communications device (e.g., a tablet, a smartphone device) the component 214 may comprise a built-in camera and/or microphone of the computing device. The component 212 may provide information related to gestures, voice commands, and/or other indications configured to convey intentions of a user.

By way of an illustration, the user may whirl an arm around and/or point a finger at the fan 220 in order to indicate a start operation. The user gesture intention may be accompanied by a transmission of an "ON" command using the remote controller 202. In some implementations, the controller 210 may be configured to establish a data link with (pair to) the remote controller 202. Pairing of the remote controller 202 and the learning controller 210 may enable transmission of the user commands from the handset 202 to the learning controller 210. In some implementations establishment of the link 206 may be facilitated by, e.g., obtaining link protocol parameters specifications (e.g., the spreading code, list of device IDs) for given remote controller device 202.

In order to learn associations between user commands and context associated with the task, the learning controller 210 may comprise a receiver component (e.g., the receiver component 234 of the controller apparatus 230 shown in FIG. 2B) configured to detect transmissions 206. Detection of remote control commands in the transmissions 206 may be effectuated using a variety of methodologies including, e.g., signal monitoring described in co-owned U.S. patent application Ser. No. 14/244,888, entitled "LEARNING APPARATUS AND METHODS FOR CONTROL OF ROBOTIC DEVICES VIA SPOOFING", filed Apr. 3, 2014; Ser. No. 14/244,892 entitled "SPOOFING REMOTE CONTROL APPARATUS AND METHODS", filed Apr. 3, 2014; and Ser. No. 14/244,890, entitled "APPARATUS AND METHODS FOR REMOTELY CONTROLLING ROBOTIC DEVICES", filed Apr. 3, 2014, each of the foregoing previously incorporated herein by reference in their entirety supra. As described in above referenced applications, the controller 210 may monitor transmissions 206 in order to detect one or more known commands (e.g., ON, OFF, and/or other) using a given pulse configuration.

The controller 210 may comprise a processing component configured to operate a learning process configured to learn associations between the user intentions (e.g., the gesture) and the control command provided via transmissions 206.

Referring now to FIG. 2B, one implementation of a controller for use in the system of FIG. 2A is shown and described. The controller 230 of FIG. 2B may comprise processing component 240 operably coupled to the sensor component 232, the receiver component 234 and remote controller electronics 236 comprising a transmitter.

The processing component 240 may comprise a specialized computerized apparatus (e.g., bStem™) and/or a general use computerized apparatus (e.g., a tablet computer, a smartphone, a computer, and/or other computerized device) configured to operate a learning process (e.g., by BrainOS library). In one or more implementations, the learning process operation may be by a remote server interfaced to the processing component 240 via a wired or wireless link.

In some implementations, the controller apparatus 230 may comprise a user interface component 238 configured to communicate to the learning process indications configured to start, stop, pause, and/or resume learning. In some implementations, learning may commence automatically based on detection of one or more remote transmissions 206 and/or context in the sensory input. In one or more implementations, learning may terminate based on receipt of a stop command via the interface 238, expiration of a time interval, number of context-command occurrences, and/or another indication (e.g., absence of transmissions 206 within a given time period) automatically based on detection of one or more remote transmissions 206 and/or context in the sensory input.

Subsequent to activation of learning, the learning process may detect one or more control instructions within the remote transmissions (e.g., 206 in FIG. 2A). The learning process may be configured to determine an association between the control instructions provided by the receiver 234 and context determined from the sensory input provided by the sensor 232. In some implementations, the context may comprise information related to presence, size, and/or location of a person, gesture, audio signal (e.g., clap whistle) and/or other indication provided by a user. The control instruction may comprise a turn ON/OFF and/or other command. In some implementations (not shown) the context information may come from sensors distributed remotely in the environment. Various methodologies may be utilized in order to determine the associations between the context and user control instructions, including, for example, adaptive predictor methodologies including these described above with respect to applications '888, '890, '892, referenced above and/or U.S. patent application Ser. No. 13/842,530 entitled "ADAPTIVE PREDICTOR APPARATUS AND METHODS", filed Mar. 15, 2013, the foregoing being incorporated herein by reference in its entirety. In some implementations, the learning process may comprise adaptation of a look up table based on occurrence of given associations (e.g., user hand gesture and remote command to turn the fan ON). In one or more implementations, the learning process may be configured based on adaptation of an artificial neuron network (e.g., a perceptron), and/or other learning approaches.

In one or more implementations, data from two or more sensor types may be combined (e.g., via an adaptive data fusion process). A false positive of features detected using video, may be filtered out using audio signal provided in order to disambiguate context detection. By way of an illustration of one implementation of audio/visual sensor input, a representation of a person leaning towards a cell phone may not trigger an association with a TV mute action. However, a representation of the person leaning towards a cell phone when accompanied by the cell phone ring may cause muting of the TV. In another such example, an audio/visual sensor input may detect when there are multiple raised hands among a group of people, and then an automatic camera may select the appropriate person with a raised hand gesture (from the group of people) based on a voice indication (e.g., "I have a question").

In some implementations, wherein the learning controller operation may be effectuated by a portable communications device (e.g., a smartphone) determination of the associations between the context and user control instructions may be effectuated by the portable device using sensory data obtained by a sensor component of the portable device (e.g., a microphone, a camera, and/or other component).

In some implementations, determination of the associations between the context and user control instructions may be effectuated by a computing entity (e.g., a local computer and/or a remote computing Cloud) in data communication with the apparatus 230 of FIG. 2B (and/or 210 of FIG. 2A), e.g., such as described with respect to FIG. 4, below. The computing entity may communicate with the apparatus 230 of FIG. 2B (and/or 210 of FIG. 2A) over one or more of wired link (e.g., serial, Ethernet) and/or wireless link (e.g., Bluetooth, WiFi, 3G-4G cellular). The apparatus 230 of FIG. 2B (and/or 210 of FIG. 2A) may provide sensory context via the link to the computing entity, and/or receive association information from the computing entity. The sensory context information may be compressed before transmission to the remote computer cloud, and/or may comprise single image frames or a continuous video stream. As a form of compression, the transmission may include differences from periodically transmitted key frames of data, in some implementations.

Returning now to FIG. 2A, based on developing the associations between the sensory context and user remote control commands, the controller 210 may be capable of providing one or more control instructions over the link 216 to the device 220 in lieu of remote control instructions 206. In some implementations, wherein protocol specification of the control communication between the handset 202 and the robotic device 224 may not be available to the controller 210, individual command transmissions within the communication over the link 216 may be effectuated by activating one or more components of the component 214 electronics using a direct electrical interface methodology. By way of an illustration, contacts corresponding to, e.g., the ON (or ON/OFF) button(s) may be short-circuited using an electronic relay of the apparatus 210 electronics.

Some computerized appliances (as originally provided by a manufacturer) may not be provided with remote control functionality (e.g., dishwasher, refrigerator, and/or other). Some appliance operations, may benefit from an operational trajectory that may prove too difficult for a non-expert user to navigate, too time consuming, too/boring (e.g., follow a regular pattern when vacuuming/mowing a lawn) and/or otherwise not desirable to be performed by the user using manual remote control operations. Some operations may prove too complex for remote control operations (e.g., navigating an unmanned aerial vehicle around subjects of interest while avoiding obstacles, e.g., as described in co-pending and co-owned owned U.S. patent application Ser. No. 14/332,322 entitled "APPARATUS AND METHODS FOR TRACKING USING AERIAL VIDEO", filed Jul. 15, 2014, the foregoing being incorporated by reference in its entirety). In some implementations, a user may elect to remotely operate computerized appliances using interfaces that may originally not intended for use with the appliance. By way of an illustration, the user may elect to employ gestures instead of using a remote controller and/or an app running on a tablet computer and/or smartphone in order to operate a home appliance ordinarily operated via e.g., an infrared remote (e.g., TV, fan, HVAC, and or other devices).

In some implementations, a user may train a learning computerized device to develop an association between a context derived from sensory information and an action. In some implementations, the context may comprise user gesture, audible signal (a whistle, a spoken word, a clap, and/or other indication); the action may comprise activation of a user interface element (e.g., a soft/hard button press, a swipe, touch screen activation) configured cause generation of an event indicative of the context. By way of an illustration of using a home automation system comprising a user interface device, the user may teach the learning computerized device to trigger the event by associating the context (e.g., hand gesture) with a pressing of a button on the user interface device. In one or more implementations, the context change may be determined based on a history (within time window) of a given characteristic. By way of an illustration of audio based context, if a background sound may be present initially (e.g., due to operation of a motor appliance, e.g. a washer), the sudden absence of the sound may identify context and trigger an n inspection action. Initial presence of an object on the table (e.g., a flower vase) followed by sudden absence of that flower vase from the table may a cleaning action.

Figures 3A, 3B:
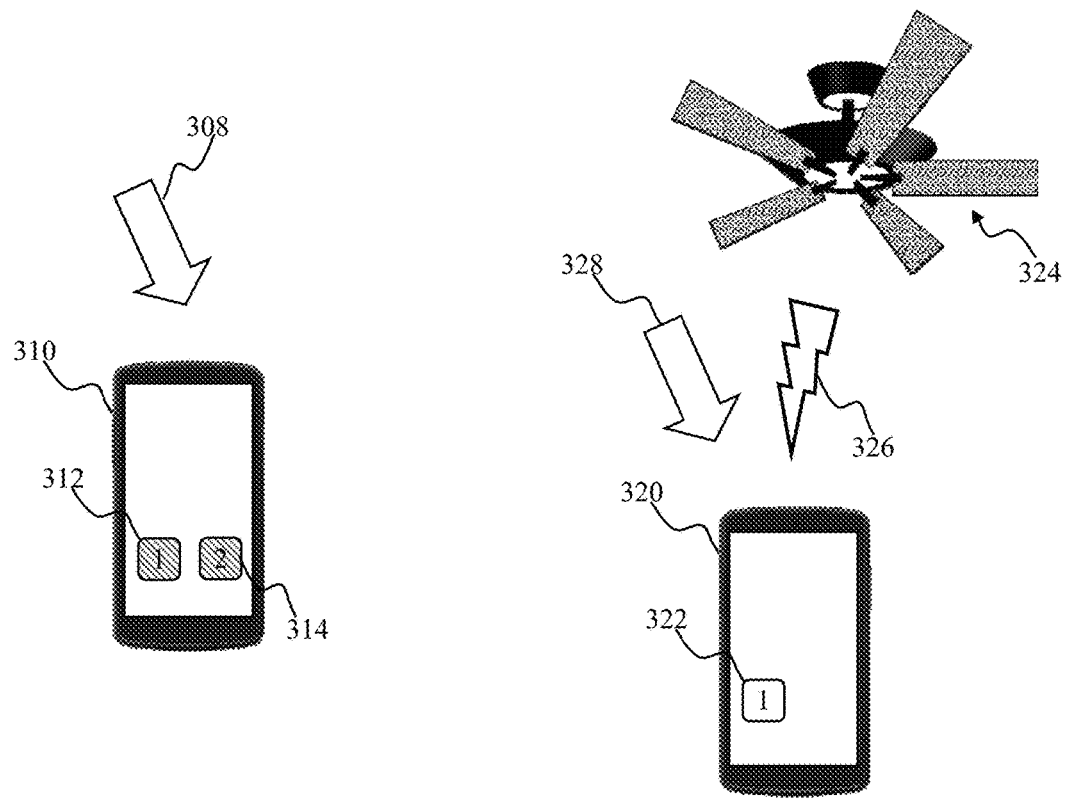
FIG. 3A is a functional block diagram depicting a computerized apparatus configured to produce an event based on a sensory context, according to one or more implementations.
FIG. 3B is a graphical illustration depicting use of trained computerized apparatus of FIG. 3A to operate an appliance based on one or more events and sensory context, according to one or more implementations.

FIG. 3A illustrates a computerized apparatus configured to produce an event associated with a sensory context, in accordance with one or more implementations.

The apparatus 310 may comprise a user interface device 310, e.g., a smartphone, comprising a camera, a display, and a touch interface, and the learning controller operation may be effectuated by executing a plurality of instructions (e.g., a software application and/or a library) by the device 310.

During training, the device 310 may be operable to determine a context (e.g., user gesture and/or sound) using a camera and/or a microphone. Contemporaneous with the provision of the gesture and/or the sound, the user may activate one or more elements of the user interface (e.g., by touching soft buttons 312, 314). The software application executed by the device 310 may be configured to produce an event comprising an event identification (EventID) associated with activation of a given button, e.g., Button1ID. Training of the associations may be effectuated using any applicable methodologies including these described herein.

Subsequent to training, the user may link given EventID with an action to be performed by a home appliance. In some implementations, the link may be effectuated by providing executable instructions to the device 310, configured to turn on a given appliance. By way of an illustration, the user may provide code configured to produce a plurality of RF or IR pulses to operate a fan and/or TV remotely. In one or more implementations, if this than that (IFTTT) framework may be employed wherein a trigger (e.g., the event associated with a hand gesture) may be linked to an action (e.g., turn on/off TV) via a recipe (instructions configured to cause transmission of IR pulses).

FIG. 3B depicts use of the trained and configured computerized apparatus of FIG. 3A for operate an appliance based on one or more events and sensory context, according to one or more implementations.

Subsequent to training the device 320 to detect an indication (e.g., a gesture) and providing executable instruction, a user may utilize the apparatus 310 in order to operate a given appliance. The apparatus 320 may detect a gesture indication by the user in video input denoted by arrow 328 in FIG. 3B. Based on the detected indication, the apparatus may automatically produce an event, e.g., the Button1ID event associated with the button 312 activation by the user shown and described above with respect to FIG. 3A. It is noteworthy that during operation, the button associated with the given ID (Button1ID) may not need to be activated by the user, as illustrated by open face button 322 in FIG. 3B. Responsive to the event being produced, the apparatus 320 may automatically produce remote transmissions 326. In one or more implementations, the transmissions 326 may comprise pulses of IR, RF, sound, light waves conveying one or more commands to the appliance 324. For example, the transmissions 326 may comprise pulses configured to communicate an ON command to the fan 324 based on detection of the user pointing right hand at the fan.

Figures 3C, 3D:
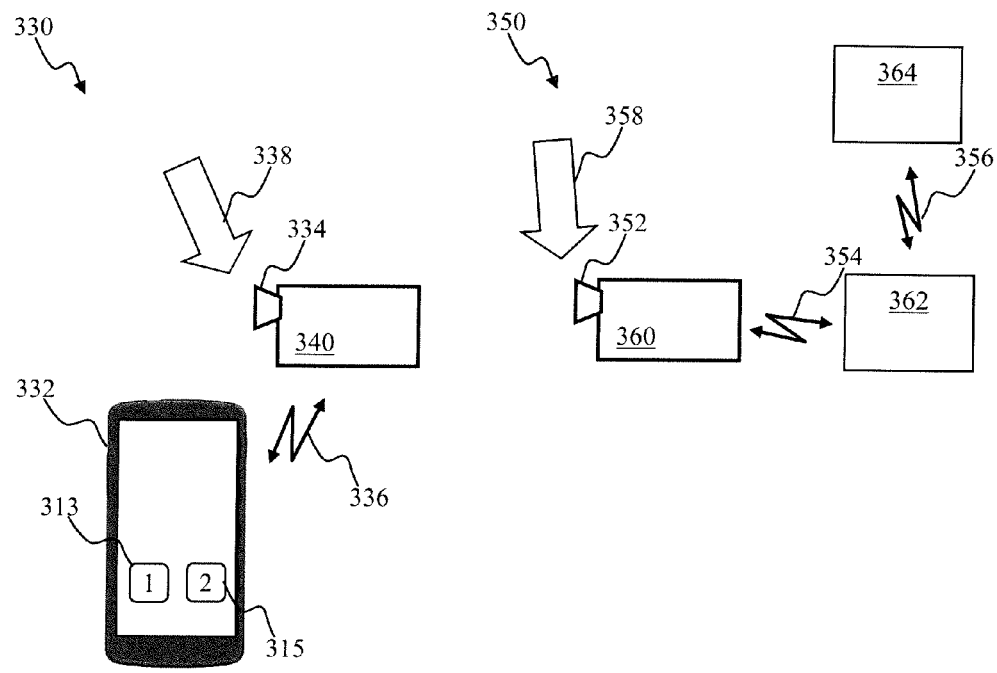
FIG. 3C is a functional block diagram illustrating a system for training a learning controller to operate an appliance using a user interface device based on associating one or more events and sensory context, according to one or more implementations.
FIG. 3D is a functional block diagram illustrating use of the trained learning controller of FIG. 3C for operating an appliance based on one or more events associated with sensory context, according to one or more implementations.

FIG. 3C illustrates a system for training a learning controller to operate an appliance using a user interface device based on associating one or more events and sensory context, according to one or more implementations.

The system 330 may comprise a learning controller apparatus 340 and a user interface device 332, e.g., a smartphone, a tablet computer and/or other. The device 332 may comprise a display, a touch interface, and a communications component. In one or more implementations, the controller apparatus 340 may comprise the controller 100, 110, 210, 230 described above with respect to FIGS. 1A-2B, respectively. The apparatus 340 may comprise a sensor component 334 configured to provide sensory input to the controller learning process. In one or more implementations, the sensor component may comprise a camera, a microphone and/or other sensor configured to provide information related to operating environment (e.g., user premises) of the apparatus 340.

During training, the apparatus 340 may be operable to determine a user indication using sensory input 338 obtained by the sensor component 334. In one or more implementations, sensory input 338 may comprise one or more video image characterizing a gesture (e.g., the user pointing a hand at a ceiling fan). Contemporaneous with the provision of the gesture and/or the sound indication, the user may activate one or more elements of the user interface device 332 (e.g., by touching soft buttons 313, 315). Software application executed by the device 332 may be configured to produce an event comprising an event identification (EventID) associated with activation of a given button, e.g., Button1ID corresponding to activation of the button 313. The EventID may be communicated from the device 332 to the apparatus 340 via a communications link 336. In one or more implementations, the link 336 may comprise one or more of a wired or wireless links (e.g., USB, Ethernet, WiFi, Bluetooth, IR, pulse modulated RF as on the 27 MHz and 49 MHz bands, and/or other communication connections).

Training of determining the associations may comprise multiple repetitions of the gesture/button press combinations and may be effectuated using any applicable methodologies including these described herein (e.g., using a perceptron and/or a look up table).

Figure 5A:
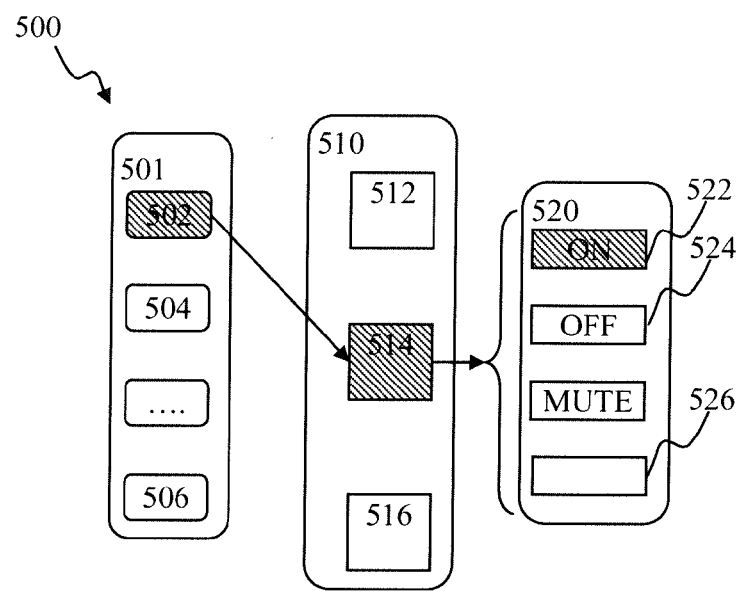
FIG. 5A is a block diagram illustrating a user interface configured to enable linking of an event associated with a context to an action by an appliance device, in accordance with one or more implementations.

Subsequent to training the apparatus 340 to determine the associations between a given user indication and the corresponding event, the event may be linked to an action by an appliance device, e.g., as shown and described in the implementation of FIG. 5A.

FIG. 5A illustrates a user interface configured for linking of an event associated with a context to an action by an appliance device, in accordance with one or more implementations.

In one or more implementations, the linking may be implemented using a configurator application executed by the controller 340, a user interface device 332 of FIG. 3C and/or other computerized device. The configurator application may be executed on a smartphone and/or a tablet computing device and produce an action-device profile that may be uploaded to the controller (e.g., 210 in FIG. 2A and/or 362 in FIG. 3D). In some implementations, the configurator application may be executed by the controller apparatus (e.g., 210 in FIG. 2A and/or 362 in FIG. 3D) configured to be operated as a server and/or executed by a remote (Cloud) server system. A user may access the configurator interface via a smartphone-based and/or a web-based client application. The configurator application may be configured to provide a user interface component, e.g., such as the interface 500 illustrated in FIG. 5A. The interface 500 may comprise an event list 501 configured to present one or more event IDs, e.g., 502, 504, 506, that may have been associated previously (e.g., the events produced by pressings of buttons 313, 315 in FIG. 3C) with user indications during training described above with respect to FIGS. 3A-3C. By way of an illustration, the event ID 502 may be associated with the user pointing their right hand at a ceiling fan, the event ID 504 may be associated with the user pointing their left hand at the fan, the event ID 506, may be associated with the user holding the right hand up, and/or other associations. The interface 500 may comprise a device list 510 configured to present one or more devices, e.g., 512, 514, that may be available for configuration and/or operation. In some implementations, the device list may be configured statically during installation of the home automation system, and/or determined dynamically using message broadcast/interrogation techniques. By way of an illustration, device ID 512 may correspond to a TV, the device ID may denote the ceiling fan, and/or other devices. The interface 500 may comprise an action list 520 configured to present one or more actions, e.g., 522, 524 that may be supported by devices of the home automation. By way of an illustration, the action 522 may correspond to the ON command being communicated to the selected device; the action 524 may correspond to the OFF command being communicated to the selected device. Action list 520 may be customized for individual listed devices 520. For example, actions that may not be appropriate and/or supported by a given device (e.g., volume option for a fan and/or motor speed for a TV) may be not displayed and/or disabled (e.g., grayed out). In some implementations, available actions list may be customized for individual device, by for example, adding, removing individual action, modifying action description (e.g., SPEED for the fan VOLUME for the TV).

In one or more implementations, an event from the event list (e.g., the event 502) may first be associated with an action (e.g., the ON action 522). Subsequently, the action may be applied to one or more devices (e.g., the devices 512, 514). For example, a user transitioning from standing to sitting position may be associated with turning on the television, turning on the associated speaker system and dimming lighting. The event-action linking methodology may be configured to enable a given event (e.g., user gesture) that corresponds to (different) contexts that may be associated with (different) actions based on a location of the user providing the gesture. By way of an illustration, a user gesture comprising pointing a hand at a wall proximate a wall switch may be associated with the light turn on/off action; the same pointing gesture away from the wall switch may be associated with no action.

As illustrated in FIG. 5A, the event-device-action association may be configured by a user selection of given event ID (e.g., 502), a corresponding device (e.g., 514), and the target action (e.g., 522), depicted by shaded shapes in FIG. 5A. The linking of a user indication to an action by a home appliance may enable the user to operate the appliance to perform the action using interface methods that may not have been previously attainable and/or have been envisioned by the appliance and/or home automation system manufacturer.

FIG. 3D illustrates a system configured to enable a user to operate an appliance device using previously learned sensory context associations, according to one or more implementations. The system 350 may comprise a learning component 360, controller component 362, and a computerized appliance 364 (e.g., a TV, a remotely controlled fan, motorized furniture and/or other device). The component 360 may comprise a sensor component 352 and a communications interface configured to communicate data between components 360 and 362. The interface may comprise a wired (e.g., serial bus, Ethernet, 2 wire, SPI, I2C, CAN bus, and/or other interface configurations) and/or wireless interface (e.g., Bluetooth, WiFi, 3G-4G cellular, IR, and/or other wireless data transmission link). In some implementations, the learning component 360 may comprise the apparatus 210, 230 of FIGS. 2A-2B and/or 340 of FIG. 3A; the sensor component 352 may comprise a camera, a microphone, a touch sensor configured to communicate information related to sensory input 358 to the component 360. The component 360 may be operable in accordance with a process configured based on a configuration determined during training. In some implementations, the configuration may comprise a LUT and/or an array of weights, e.g., described above with respect to the configuration 114 of FIG. 1B above. In one or more implementations, the input 358 may comprise the input 118, 308, 328 338, described above with respect to FIGS. 1A, 3A-3C and be configured to communicate one or more user indications (e.g., a gesture, a sound, posture, position, and/or other characteristic). By way of an illustration, the sensor component 358 may be configured to provide a sequence of image frames depicting the user pointing a hand at a ceiling fan. Based on detecting a context (e.g., the hand gesture) in the sensory input and determining that an event ID (e.g., corresponding to the button 313 in FIG. 3C) may have been previously associated with the detected context. The event ID corresponding to the detected context may be communicated via the link 354 to the component 362. Various communications methodologies may be employed, including a sending a packet, a coded pulse, a message, analog and/or digital value, and/or other methods.

In some implementations, wherein the component 360 may comprise a general use computing and/or communications apparatus (e.g., a tablet computer, a smartphone, a laptop a desktop computer) and/or a remote computing cloud entity) context determination and/or event-action link operations may be effectuated by an application executed by the general used computing apparatus. By way of an illustration of one exemplary implementation, sensory input 358 may be pre-processed (e.g., down-sampled, and/or compressed) and communicated to a cloud computing entity for analysis. The analysis may provide an event ID based on a match with a previously determined configuration (e.g., LUT).

In some implementations, the component 362 may comprise a dedicated computerized device (e.g., a home automation controller) provided, e.g., as a part of home automation system installation. In one or more implementations, the component 362 may comprise a general use computing and/or communications device (e.g., a tablet computer, a smartphone, a laptop a desktop computer and/or a remote computing cloud computer) operating a home automation software application (e.g., an operating system, a library e.g., the HomeKit™ by Apple, an app, and/or another software configuration).

In one or more implementations wherein the component 362 may comprise a general purpose computing apparatus (e.g., iPad™), functionality of the components 360 and 362 may be implemented by the apparatus 362. By way of an illustration, the iPad apparatus may comprise one or more sensors and be configured to operate a BrainOS-based application configured to enable learning of the association between user indications and events (e.g., as described above with respect to FIG. 3C). During operation, the BrainOS application may be configured to detect a context in sensory input (e.g., user gesture in video imagery) and produce an event ID.

Based on receiving an event ID, the component 362 may determine an action associated with the given event ID. For example, the component 362 may utilize a table produced e.g., as output of the configuration process described with respect to FIG. 5A, and linking an event ID to an action by an appliance, e.g., as shown in Table 1.

TABLE 1

| Event ID | Device ID | Action ID |
|----------|-----------|-----------|
| 00001    | Fan       | ON        |
| 00010    | Fan       | OFF       |

By way of an illustration, the user gesture may correspond to the event ID 00001 corresponding to fan ON action ID. Based on the determination of the action ID, the component 362 may communicate a control command to the appropriate destination (e.g., the appliance 364) using communication link 356. The link 356 may comprise wired (e.g., serial bus, Ethernet, 2 wire, controller area network (CAN) bus, and/or other wired link) and/or wireless interface (e.g., Bluetooth, WiFi, 3G-40 cellular, IR, and/or other wireless data transmission link, in one or more implementations.

In some implementations, wherein components 360 and 362 may comprise software applications executed by a computerized device, the link 354 may be effectuated using e.g., a message, a semaphore, a queue, a memory location and/or any applicable data exchange methodology between two or more software applications.

In some implementations, wherein the component 362 may comprise a dedicated computerized device, e.g., a home automation controller provided as a part of home automation (HA) system installation, the configurator application described above with respect to FIG. 5A may be executed by the HA controller. In some implementations, the configurator application may be executed by apparatus 340, a user interface device 332 of FIG. 3C, component 360, and/or other computerized device. The configurator application may comprise a library and/or an application (e.g., Apple HomeKit of the iOS operating system) operable on a general purpose computing device, provided with the component 340/360 (an application provided by Brain Corporation and configured to be operable by bStem™ integrated platform) and/or by another party.

In one or more implementations, the configuration application may be executed by a remote computing resource (e.g., by cloud computing service) and interfaced to a user via a user interface computing device (e.g., a smartphone).

Figure 4:
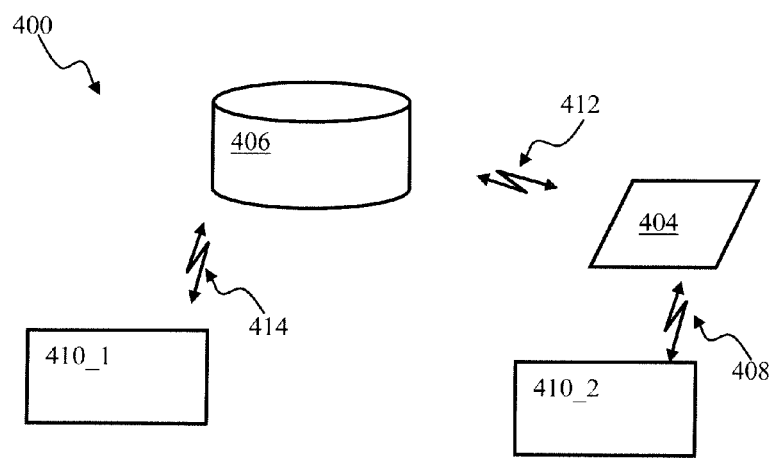
FIG. 4 is a functional block diagram illustrating a computerized system configured to implement the learning controller apparatus of the present disclosure using a remote computing entity, in accordance with one implementation.

FIG. 4 illustrates a computerized system configured to implement methodology for learning of associations between user indications and performing of actions by an appliance apparatus using a remote computing entity, in accordance with one implementation. The system 400 may comprise a computerized entity 406 configured to communicate data with one or more computerized apparatus 410 (e.g., 410_1, 410_2). In some implementations, the entity 406 may comprise a computing cloud entity (e.g., a cloud service, a server, in a public, private and/or hybrid network). In one or more implementations, the entity may comprise a computer server, a desktop, and/or another computing platform that may be accessible to the apparatus 410. In some implementations of the cloud computing services, one or more apparatus 410 may communicate with the entity 406 for access to computing resources (e.g., processing cycles, storage, previously stored configuration of a learning process, and/or memory) in order to, e.g., detect context (e.g., user gestures) in sensory data provided by, e.g., sensor component 232 of FIG. 2B, 334, 352 of FIGS. 3C-3D. In some implementations, the apparatus 410 may communicate with the entity 406 in order to save, load, and/or update, their processing configuration (e.g., robotic brain image 1012 in FIG. 10, learning process configuration 104, 114 in FIGS. 1A-1B). The robotic brain image and/or learning process configuration may comprise executable code (e.g., binary image files), bytecode, an array of weights for an artificial neuron network (ANN), a table, and/or other computer formats. In some implementations, the apparatus 410 may communicate with the entity 406 in order to save, and/or retrieve learned associations between sensory context and actions of a computerized appliance device, e.g., as described with respect to FIGS. 1A-3D, and/or FIGS. 6A-9B.

In one or more implementations the apparatus 410 may comprise a user interface device 310, 332, e.g., a smartphone/tablet computer, comprising a camera, a display, and a touch interface. In one or more implementations (e.g., such as described above with respect to FIGS. 2A, 2B and/or 3C-3D) the apparatus 410 may comprise a computerized apparatus 210, 230, 340, 360. In some implementations (e.g., shown and described with respect to FIG. 3C), the computerized apparatus 410 may comprise a specialized integrated platform bStem™, comprising a camera, a processor and a communications interface. The apparatus 410 may be disposed at user premises (e.g., a home, an office, a commercial facility (e.g., a warehouse, manufacturing floor, a shopping mall, an amusement park, and/or other facility).

In one or more implementations, the apparatus 410 may be configured to obtain sensory information related to the task (e.g. the input 108 in FIG. 1A). The sensory information may be provided to a learning process configured to effectuate the learning of the associations. In some implementations, the learning process may be configured based on execution of a plurality of instructions (e.g., a software application, a component of an operating system, and/or a library) by the computerized apparatus 410.

In some implementations wherein operation of the learning process may require computational power in excess of that that may be provided by a processing module of the apparatus 410, one or more portions of the learning process may be operable by the remote computerized entity 406. In one or more implementations, the remote computerized entity 406 may be configured to receive the sensory information (e.g. the input 108 described above with respect to FIG. 1A) obtained by the computerized apparatus 410. The entity 406 may be configured to operate a feature extraction process configured to determine context (e.g., presence of objects and/or object characteristics (e.g., location, size, position, and/or other parameters), user body position, configuration, gesture, environmental conditions (e.g., ambient light level, time of day, temperature and/or other parameters that may be related to execution of the action by a computerized appliance (e.g., 364 in FIG. 3D such as a TV, a remotely controlled fan, a motorized furniture and/or other device). In other implementations where rapid reaction time may be required, the apparatus 410 may perform feature extraction on-board using specialized hardware. The remote computerized entity 406 may perform learning and/or optimization computations intended to update the specialized feature extraction hardware of the apparatus 410.

In FIG. 4, one or more implementations the computerized apparatus (e.g., 410_1) may connect to the entity 406 via a remote link 414. In some implementations, the computerized apparatus (e.g., 410_2) may connect to the entity 406 via a local computerized interface device 404 using a local link 408. In one or more implementations, the local link 408 may comprise a network (Ethernet), wireless link (e.g. Wi-Fi, Bluetooth, infrared, radio), serial bus link (USB, Firewire) and/or other. The local computerized interface device 404 may communicate with the computerized entity 406 via link 412. In one or more implementations, links 412 and/or 414 may comprise an internet connection, and/or other data connection effectuated via any of the applicable wired and/or wireless technologies (e.g., Ethernet, Wi-Fi, LTE, CDMA, GSM, and/other).

In one or more applications that may require computational power in excess of that that may be provided by a processing module of the apparatus 410, the local computerized interface device 404 may be configured to perform computations associated with context determination, obtaining user instruction, determining of association between the context and the user instructions and/or other operations (e.g., provision of commands to the appliance device). The local computerized interface device 404 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

FIG. 5A illustrates user interface configured to enable linking of an event associated with a context to an action by an appliance device, in accordance with one or more implementations. Methodology illustrated and described with respect to FIG. 5A may be utilized with one or more computerized devices (e.g., 310, 320 of FIGS. 3A-3B). In one or more implementations, the user interface 500 of FIG. 5A may be effectuated based on execution of one or more computer instructions by a computerized device, e.g., the device 314 in FIG. 3A, 332 in FIG. 3C, 360, and/or 362 in FIG. 3D. Components of the user interface 500 may be presented to a user via a display (e.g., display only device and/or display-input device (e.g., touch-sensitive proximity sensitive display). Elements of the user interface 500 may be configured to communicate user selections to an appliance configuration application. User selections may be effectuated using any applicable user input interface, e.g., a pointing device (mouse, stylus), touch/proximity interface, an audio indication, a gesture, and/or other communication indication.

In FIG. 5A, panel 501 may be configured to present indications 502, 504, 506 associated with one or more previously generated events. Individual event indications (e.g., 502) may correspond to, e.g., an event produced by activation of the button 312 as described with respect to FIG. 3A.

In FIG. 5A, panel 510 may be configured to represent one or more computerized devices (e.g., appliance devices 512, 514) that may be available for configuration by a user. In some implementations, a given device representation (e.g., 514) may comprise a button (e.g., a soft button on a touch-sensitive interface), a graphical user interface (GUI) element selectable by a pointer (e.g., a stylus, a mouse, a finger), and/or other input element. Representations for unavailable (e.g., powered off and/or unsupported) appliance devices may be not displayed and/or rendered unselectable (e.g., grayed out).

In FIG. 5A, panel 520 may be configured to present one or more actions (e.g., 522, 524) that may be supported by a given appliance device (e.g., device 514). Individual action indications (e.g., ON action element 522) may be configured to convey information characterizing the action. In one or more implementations, the information may comprise text (e.g., ON), an icon (e.g., shown by the element 542 in FIG. 5B), a command code, and/or other information.

A user may utilize the interface 500 in order to perform an action-event association as follows. Upon activating the configuration application, the user may be presented with one or more available events and/or appliances that may be controlled. The user may select an event (e.g., by activating element 502 in panel 501). For the selected event, the user may select an appliance that is to be controlled (e.g., by activating element 514 in panel 510). The configuration application may update the interface 500 to present one or more actions (e.g., ON, OFF, MUTE) that may be performed by the selected appliance (e.g., a TV). The user may select a target action (e.g., the turn TV ON action) by activating the respective element 522. It is noteworthy, that the panel 520 may be updated in accordance with the selected appliance in order to present actions supported by the selected appliance.

Figure 5B:
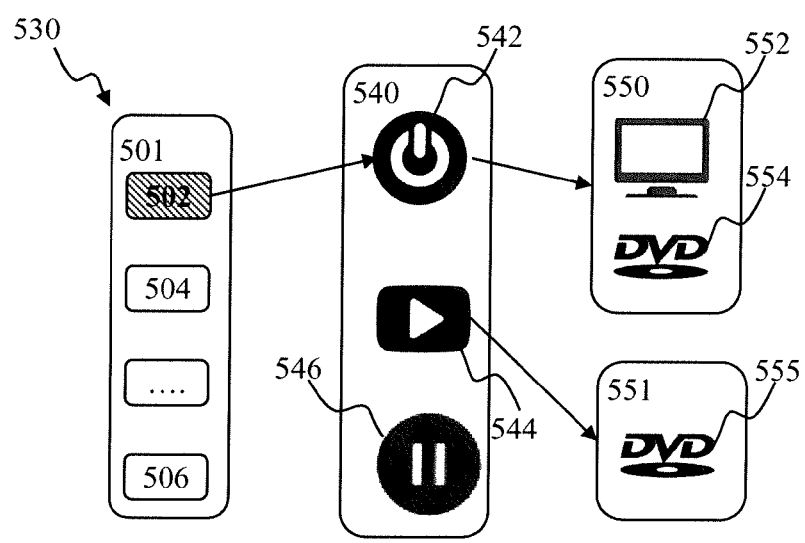
FIG. 5B is a block diagram illustrating a user interface configured to enable linking of an event associated with a context to an action by multiple appliance devices, in accordance with one or more implementations.

In some implementations, a given event may be linked with an action to be performed by a plurality of devices (e.g., power off all components of a home entertainment system). FIG. 5B illustrates user interface configured to enable linking of an event associated with a context to an action executable by multiple appliance devices of an automation system, in accordance with one or more implementations. Methodology illustrated and described with respect to FIG. 5B may be utilized with one or more computerized devices (e.g., 310, 320 of FIGS. 3A-3B).

In one or more implementations, the user interface 530 of FIG. 5B may be effectuated based on execution of one or more computer instructions by a computerized device, e.g., the device 314 in FIG. 3A, 332 in FIG. 3C, 360, and/or 362 in FIG. 3D. Components of the user interface 530 may be presented to a user via a display (e.g., display only device and/or display-input device (e.g., touch-sensitive proximity sensitive display). Elements of the user interface 500 may be configured to communicate user selections to an appliance configuration application. User selections may be effectuated using any applicable user input interface, e.g., a pointing device (mouse, stylus), touch/proximity interface, an audio indication, a gesture, and/or other communication indication.

In FIG. 5B, panel 501 may be configured to present indications 502, 504, 506 associated with one or more previously generated events, e.g. as described above with respect to FIG. 5A.

In FIG. 5B, panel 540 may be configured to present action(s) (e.g., POWER action 542, PLAY action 544, PAUSE action 546) that may be supported by appliances within the automation system (e.g., home entertainment). Individual action indications (e.g., POWER action 542) may be configured to convey information characterizing the action (e.g., via the commonly recognizable icon 542).

In FIG. 5B, panels 550, 551 may be configured to represent one or more computerized devices (e.g., appliance devices 552, 554, 555) that may be available for executing the selected action (e.g., the POWER action 542). In some implementations, a given device representation (e.g., 552) may comprise a button (e.g., a soft button on a touch-sensitive interface), a graphical user interface (GUI) element selectable by a pointer (e.g., a stylus, a mouse, a finger), an icon, and/or other input element. The appliance panel may be configured to convey information related to the one or more available appliances. In some implementations, the information may comprise textual information (e.g., a GUI element displaying TV text), a device code (e.g., a GUI element displaying 101 code text), a commonly recognized icon (e.g., TV icon 552), a combination of elements (e.g., DVD icon 554 with text) and/or other information representations. The user may select a target action (e.g., the POWER action) by activating the respective element 542.

The configuration application may update the device panel (e.g., 550, 551) of the interface 530 in order to match appliances to the respective action. Representations for unavailable (e.g., powered off and/or unsupported) appliance devices may be not displayed and/or rendered unselectable (e.g., grayed out). By way of an illustration, based on the user selecting the POWER action (e.g., by activating the element 542) the appliance panel 550 may be configured to display the TV appliance icon 552 and the DVD appliance icon 554. Based on the user selecting the PLAY action (e.g., by activating the element 544) the corresponding appliance panel 551 may be configured to display the DVD appliance icon 555. The user may select one or more target appliance (e.g., the TV, the DVD) by activating the respective element(s) 552, 554.

A user may utilize the interface 530 of FIG. 5B in order to associate an event with an action execution as follows. Upon activating the configuration application, the user may be presented with one or more available events, e.g., panel 501 of the GUI 530. The user may select an event (e.g., by activating element 542 in panel 540). For the selected action, the user may select one or more target appliances (e.g., the TV, DVD, and/or other devices) by activating the respective device selection element(s) (e.g., 552, 554).

Figure 6A:
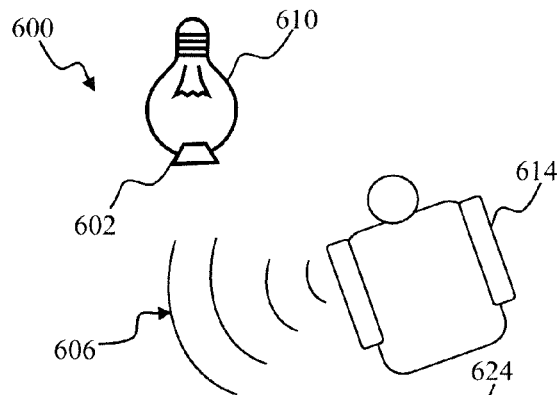
FIGS. 6A-6B is a graphical illustration depicting operation of a computerized furniture apparatus by a learning system using context-action associations, according to one or more implementations.
Figure 6B:
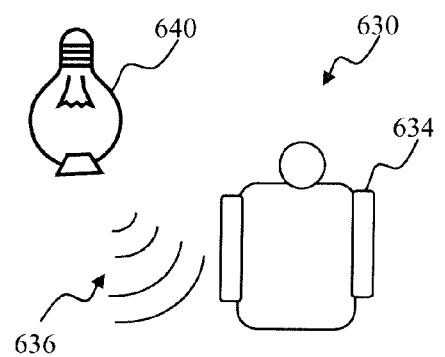

FIGS. 6A-6B illustrate operation of a computerized furniture apparatus by a learning system using context-action associations, according to one or more implementations. System 600 shown in FIG. 6A may comprise a computerized furniture appliance 620 and a learning controller apparatus 610 comprising a sensor component 602 and a transmitter component configured to communicate with the apparatus 620. The system 600 may be employed by a user in order to train the controller apparatus 610 to operate the appliance 620.

The controller apparatus may be incorporated into existing user premises infrastructure. In some implementations, the learning apparatus 610 may comprise the apparatus 210 of FIG. 2A, 310, 320, 360 of FIGS. 3A-3C. In one or more implementations, the controller apparatus may be embodied within a household fixture component, e.g., a light-bulb and/or in an enclosure with a form factor resembling a light bulb and/or interchangeable with a light bulb. The apparatus 610 may in some implementations, be adapted to fit into existing mount, e.g., a medium sized Edison 27 (E27). It will be appreciated by those skilled in the arts that a variety of sockets may be employed such as, e.g., Miniature E10, E11, Candelabra E12, European E14, Intermediate E17, Medium E26/E27, 3-Lite (modified medium or mogul socket with additional ring contact for 3-way lamps), Mogul E40, Skirted (PAR-38), Bayonet styles (Miniature bayonet, Bayonet candelabra, Bayonet Candelabra with pre-focusing collar, Medium pre-focus, Mogul pre-focus, Bi-post, and/or other (e.g., fluorescent T-5 mini, T-8, T12). In some implementations, the component 610 may comprise any household fixture with a power source, e.g., a doorbell, an alarm (e.g., smoke alarm), a security camera, a motion sensor component, a lamp (e.g., portable lamp, torcher), DC and/or AC light fixture (halogen, day light fluorescent, LED, and/or other configuration. In one or more implementations, e.g., such as shown and described with respect to FIGS. 3C, 9A-9D the learning apparatus 610 may comprise a computing device (e.g., a smartphone, a tablet, a notebook computer) configured to execute instructions to effectuate operation of the learning controller.

The computerized furniture appliance 620 may comprise a motor actuator configured to operate one or more components of the appliance (e.g., slide a drawer 622, open/close a door/lid, adjust shelve height and/or orientation, and/or perform other actions). It will be appreciated by those skilled in the arts that although a drawer operation is illustrated in FIG. 6A, various other computerized furniture implementations may be realized using the methodology described herein, e.g., adjustable desk, table, chair, outdoor umbrella, swimming pool, and/or other. In one or more implementations, the automation methodology may be employed with components (doors, windows, fan) of a building, a vehicle (car, boat), and/or practically any motorized component that may be interfaced to a computerized controller.

The apparatus 620 may comprise a receiver component configured to detect remote transmissions 606 in FIG. 6A and/or transmissions 636 in FIG. 6B. The transmissions 606 may comprise one or more remote control instructions (e.g., open/close) issued by a remote transmitter (not shown). In one or more implementations, the transmissions 606 may be effectuated based on an operation of the remote transmitter by a user and/or a computerized agent during training of the controller apparatus 610.

The sensor component 602 may be configured to provide sensory input to the learning controller. In some implementations, the component 602 may comprise a camera, a radio wave sensor, a light sensor, an ultrasonic sensor, and/or other sensor capable of providing information related to operation of the appliance apparatus 620.

An exemplary training operation of the system 600 comprising a camera sensor component 602 may be described as follows, in some implementations.

The appliance 620 and the camera component 602 may be arranged such that to enable the camera to obtain digital images of the appliance and the user with sufficient spatial and/or temporal resolution. In one or more implementations, spatial resolution may be characterized by image size selected between 60×80 pixels to 2000×4000 pixels. Greater image pixel count may be employed provided computational and/or energy use capabilities of the processing electronic may accommodate increased pixel count. In some implementations of home and/or vehicle automation, temporal resolution may be characterized by frame rate selected between 2 frames per second (fps) and 100 fps. It will be appreciated by those skilled in the arts that lower or greater frame rates may be employed in accordance with parameters of a specific application (e.g., rate of change of context) may utilize a remote controller The user may employ a remote control device in order to communicate instructions to the apparatus 620 via, e.g., transmissions 606. In one or more implementations, the transmissions 606 may comprise infrared waves, pressure waves, radio waves, visible light, and/or combination thereof. The appliance apparatus 620 may comprise a detector component configured consistent with the transmission carrier used to communicate transmissions 606.

In one or more implementations, the transmissions 606 may comprise infrared waves, pressure waves, radio waves, visible light, and/or combination thereof. The apparatus 620 and 610 may comprise a detector component configured consistent with the transmission carrier used to communicate transmissions 606.

The user may utilize posture (denoted by icons 614, 644 in FIGS. 6A-6B) and/or gesture in order to control the appliance 620. By way of an illustration, during training the user may issue DRAWER OPEN command via transmissions 606 while leaning towards the appliance 620. The controller 610 may detect change in user posture and associate content of the transmission with the posture change. Combination of the context change (e.g., leaning towards 614) and the command (e.g., DRAWER OPEN) may be repeated during training in order to establish the context-action associations by adapting learning configuration of the apparatus 610.

During operation, the apparatus 640 may detect sensory context change. By way of an illustration, the apparatus 640 may determine user position change from a lean-in posture (depicted by icon 614 in FIG. 6A) to an upright posture (depicted by icon 634 in FIG. 6B). The process of the apparatus 640 may assess as to whether (i) the observed context change (e.g., from inclined posture to upright posture) has previously occurred; and/or (ii) an association between the context change and an action for that context change exists. Based on determining an existing association, the control process may access an instruction associated with the action and communicate the instruction. In some implementations, wherein the controller apparatus 640 may be configured to communicate directly to the apparatus 620, the instruction 636 may comprise, e.g., a remote command configured to cause the drawer close action 644 in FIG. 6B. Upon receipt of the instruction, the apparatus 620 may execute drawer CLOSE action, as illustrated by arrow 644 in FIG. 6B.

Figure 7A:
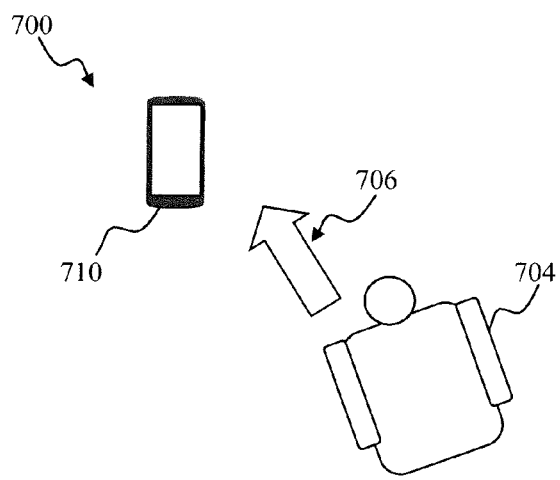
FIGS. 7A-7B illustrate operation of a computerized apparatus by a learning system using context-action associations, according to one or more implementations.
Figure 7B:
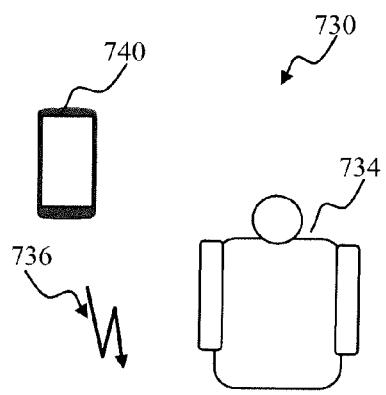

FIGS. 7A-7B illustrate operation of a computerized apparatus by a learning system using context-action associations, according to one or more implementations. System 700 shown in FIG. 7A may comprise a computerized apparatus 720 and a learning controller apparatus 710. In one or more implementations, the computerized apparatus 720 may comprise an appliance (e.g., a drawer, a light, a fan, audio/video equipment, and/or other controllable apparatus). In some implementations, the controller apparatus 710 may comprise a specialized computerized apparatus (e.g., bStem™ integrated platform described above), and/or a general use computerized apparatus (e.g., a tablet, a smartphone, a computer, and/or other computerized device) configured to execute a plurality of computer instructions configured to operate a learning process of the apparatus 710.

The controller apparatus 710 may comprise a sensor component. In one or more implementations, the sensor component may comprise a camera sensor 712 (described above with respect to FIGS. 2A, 2B, 3B, 6A) configured to provide a sequence of images of the user 704, operating environment (e.g., user premises) and/or the apparatus 720. In some implementations, the controller apparatus 710 may comprise a user interface (e.g., touch screen described above with respect to FIGS. 3A-3B) configured to enable the user to provide instructions (depicted by arrow 706) during training and/or operation of the system 700.

The controller apparatus 710 may comprise a data communications interface configured to communicate instruction (depicted by arrow 736) related to operation of the apparatus 720. In one or more implementations, the communications interface may comprise a wireless interface utilizing one or more of e.g., radio frequency (RF), infrared (IR), pressure (sound), light, and/or other carrier waves. In some implementations, (e.g., such as described above with respect to FIG. 3D, the communications interface may comprise a wired interface (e.g., serial bus, Ethernet, 2-wire and/or other applicable interface capable of communicating data).

In some implementations, the transmissions 736 may be detected by the apparatus 720 (e.g., a receiver embodied within the appliance). In one or more implementations (e.g., such as described above with respect to FIG. 3D), the transmissions 736 may be detected by another device (e.g., a home automation controller component and/or the controller component 362 in FIG. 3D) not shown in FIG. 7A. The automation controller component may be provided, e.g., by a user and/or home automation provider and configured to interface to one or more controlled devices (e.g., 720) via a wired and/or wireless link.

The system 700 may be employed by a user (depicted by icon 704 in FIG. 7A) in order to train the controller apparatus 710 to operate the computerized apparatus 720 (e.g., turn on/off light, open/close drawer, mute an audio device, and/or perform other action). An exemplary training operation may be performed as follows:

The user may alter sensory context and provide an indication of an action. In one or more implementations, the context change may comprise a user gesture, posture change (e.g., lean towards the appliance 720), a sound, an audible signal (click, clap), and/or other indication. The controller apparatus 710 may detect the context change using the sensor component (e.g., a camera of a smartphone). In some implementations, the context change may be detected using pixel wise discrepancy estimation methodology, e.g., such as described below with respect to FIG. CC. In one or more implementations, the action indication may comprise activation of a remote controller device (e.g., pressing left/right button on an RF/IR remote controller), activation of a GUI element (e.g., pressing a soft button on the phone touch screen), physically causing the desired movement of the device if it has back-driven motor feedback (e.g., opening a drawer and/or a curtain) and/or performing other action. In some implementations, wherein the action indication may be communicated by the user via the remote controller, the apparatus 710 may comprise a receiver component configured of detect signal transmissions of appropriate type (e.g., RF/IR).

The user may repeat several times the combination of the context change/action indication. The apparatus 710 may operate a learning process configured to associate the action indication with the context change using any applicable methodology (e.g., a perceptron artificial neuron network, a LUT, a classifier, a K-nearest neighbors (K-NN) algorithm and/or other approach).

The learning process may be configured to associate the action indication with an action by the apparatus 720. By way of an illustration, the button press (associated with the transmission 706) may be configured to cause drawer opening of the furniture appliance. In some implementations, wherein the transmission 706 comprises an RF/IR transmission effectuated by a remote control device associated with the appliance, the appliance may detect the transmission (e.g., using receiver component embodied therewith) and perform respective action (e.g., open the drawer).

In some implementations (e.g., such as shown and described with respect to FIG. 2A), the transmission 706 may cause the controller 710 to transmit a command to the apparatus 720 using an appropriate communication interface.

In one or more implementations, the controller may be configured (prior to training or subsequent to training) to training to store action-indication associations (mapping).

By way of an illustration, a user may utilize methodology described above with respect to FIGS. 3A-3B, and/or FIGS. 5A-5B in order to map an action indication (e.g., 506 in FIG. 5A) with an action (e.g., open drawer 526) by an appliance (e.g., night stand 526).

Based on the detection action indication (e.g., using transmission 706) and the action indication-action mapping, the controller apparatus 710 may communicate a respective command for the apparatus 720 (either directly or via a home automation controller).

In some implementations wherein operation of the controlled device may comprise physical manifestations (e.g., drawer opening/closing) that may interfere with the context determination (e.g., user posture detection), the controller apparatus 710 may be configured not to relay the command to the apparatus 720 so as to reduce potential for interference with the context determination process.

FIG. 7B illustrates operation of a computerized apparatus 720 of FIG. 7A by a trained controller apparatus, according to one or more implementations. The apparatus 740 of the system 730 in FIG. 7B may comprise the apparatus 710 of FIG. 7A. The apparatus 740 may operate a control process configured based on the training described above with respect to FIG. 7A. In one or more implementations, the control process configuration may comprise loading of a learning process configuration (e.g., an array of network weights, a LUT). The control process of the apparatus 740 may be operable to determine context based on analysis of sensory data. In some implementations of video camera sensor, the apparatus 740 may be configured to determine user gestures and/or pose changes using pixel-wise discrepancy analysis between images in a sequence. By way of an illustration, the apparatus 740 may determine user position change from a lean-in posture (depicted by icon 704 in FIG. 7A) to an upright posture (depicted by icon 734 in FIG. 7B). The control process of the apparatus 740 may assess as to whether (i) the observed context change (e.g., from inclined posture 704 to upright posture 734) has previously occurred; and/or (ii) an association between the context change and an action for that context change exists. Based on determining an existing association, the control process may access an instruction associated with the action and communicate the instruction. In some implementations, wherein the controller apparatus 740 may be configured to communicate directly to the apparatus 720, the instruction 736 may comprise, e.g., a command configured to cause the drawer close action 744 in FIG. 7B. Upon receipt of the instruction, the apparatus 720 may execute drawer CLOSE action, as illustrated by arrow 744 in FIG. 7B.

In one or more implementations, wherein the controller apparatus 740 may be configured to communicate with an intermediary device (e.g., a home automation controller, an appliance controller, a protocol converter, and/or other apparatus and/or software process) the instruction 736 may comprise, e.g., a message comprising the appliance identification (e.g., NIGHT_STAND) and the action (e.g., CLOSE) communicated to, e.g., the home automation controller. Upon receipt of the instruction, the intermediate entity (e.g., home automation controller (e.g., the component 362 in FIG. 3D) may provide a respective command to the appliance apparatus (e.g., 364 in FIG. 3D) to execute the action.

FIGS. 8A-8B illustrate operation of a computerized light fixture by a learning system configured to determine user gestures using context-action associations, according to one or more implementations.

System 800 shown in FIG. 8A may comprise a computerized apparatus 804 and a learning controller apparatus 810. In one or more implementations, the computerized apparatus 804 may comprise an appliance (e.g., a drawer, a remote controlled light, a fan, audio/video equipment, and/or other controllable apparatus). In some implementations, the controller apparatus 810 may comprise a specialized computerized apparatus (e.g., bStem™ integrated platform described above), and/or a general use computerized apparatus (e.g., a tablet, a smartphone, a computer, and/or other computerized device) configured to execute a plurality of computer instructions configured to operate a learning process of the apparatus 810.

In one or more implementations, the apparatus 810 may comprise user premises equipment (e.g., a security camera) adapted to execute the learning process instructions. The controller apparatus 810 may comprise a sensor component, e.g., a camera described above with respect to FIGS. 2A, 2B, 3B, 6A, 7A) configured to provide a sequence of images of user premises and/or the apparatus 804. In some implementations, the controller apparatus 810 may be coupled to a user interface device (e.g., a smartphone, a tablet, a computer, and/or other device) configured to enable the user to provide instructions (depicted by arrow 806) during training and/or operation of the system 800.

The system 800 may be employed by a user in order to train the controller apparatus 810 to operate the computerized apparatus 804 (e.g., turn on/off light) based on occurrence of a context change. In one exemplary implementation, the user may employ the system 800 to activate the apparatus 804 (turn on the light) responsive to opening of a book. An exemplary training operation may be performed as follows:

The user may alter sensory context and provide an indication of an action. In one or more implementations, the context change may comprise opening of a book 802. In one or more implementations, context (e.g., book opening) may be configured based on a distance (e.g., 0.5 m to 3 m) between the book and the controlled apparatus (e.g., the lamp 804) and/or location of the book being opened. By way of an illustration of operating a trained controller in a library environment, a user opening a book at or near a work desk may trigger the desk lamp, while another user browsing (opening) books near a bookshelf may not trigger the desk lamp. The controller apparatus 810 may detect the context change using the sensor component. In some implementations, the context change may be detected using pixel-wise discrepancy estimation methodology, e.g., such as described below with respect to FIGS. 15 and/or 17A-17C. In one or more implementations, the action indication may comprise activation of a remote controller device (e.g., pressing left/right button on an RF/IR remote controller), activation of a GUI element (e.g., pressing a soft button on the phone touch screen), physically turning on/off a device, physically moving the device in the case of back-driven motors and/or accelerometers and/or gyroscopes, and/or other action. In some implementations, wherein the action indication may be communicated by the user via the remote controller, the apparatus 810 may comprise a receiver component configured of detect signal transmissions of appropriate type (e.g., RF/IR).

The user may repeat several times the combination of the context change/action indication. The apparatus 810 may operate a learning process configured to associate the action indication with the context change using any applicable methodology (e.g., a perceptron artificial neuron network, a LUT, a classifier, a K-NN process, and/or other approach).

The learning process may be configured to associate the action indication with an action by the apparatus 804 using any applicable methodology described herein including, e.g., FIGS. 5A-5B and/or FIGS. 7A-7B. Based on the training, the learning process may produce an association between detecting opening of the book 802 and transmission of a LIGHT ON command.

FIG. 8B illustrates operation of a computerized apparatus 820 of FIG. 8A by a trained controller apparatus, according to one or more implementations. The apparatus 840 of the system 830 in FIG. 8B may comprise the apparatus 810 of FIG. 8A. The apparatus 840 may operate a control process configured based on the training described above with respect to FIG. 8A. In one or more implementations, the control process configuration may comprise loading of a learning process configuration (e.g., an array of network weights, a LUT). The control process of the apparatus 840 may be operable to determine context based on analysis of sensory data. In some implementations of video camera sensor, the apparatus 840 may be configured to determine context change using pixel-wise discrepancy analysis between images in a sequence. By way of an illustration, the apparatus 840 may detect opening of a book depicted by icon 832 FIG. 8B). The control process of the apparatus 840 may assess as to whether (i) the observed context change (e.g., the book is in open state 832) has occurred; and/or (ii) an association between the context change and an action for that context change exists. Based on determining an existing association, the control process may access an instruction associated with the action and communicate the instruction. In some implementations, wherein the controller apparatus 840 may be configured to communicate directly to the apparatus 834, the instruction 836 may comprise, e.g., a command configured to cause turning ON of the light 834.

In one or more implementations, wherein the controller apparatus 840 may be configured to communicate with an intermediary device (e.g., a home automation controller, an appliance controller, a protocol converter, and/or other apparatus and/or software process) the instruction 836 may comprise, e.g., a message comprising the appliance identification (e.g., NIGHT_LAMP) and the action (e.g., ON) communicated to, e.g., the home automation controller. Upon receipt of the instruction, the intermediate entity (e.g., home automation controller (e.g., the component 362 in FIG. 3D) may provide a respective command to the appliance apparatus (e.g., 364 in FIG. 3D) to execute the action.

Methodology described herein may be utilized in home automation applications. FIG. 9 illustrates a system comprising a learning controller configured to automate operation of home entertainment appliance (e.g., a TV), according to one or more implementations. The system 900 may comprise a television (TV) set 916 operable via a remote control device 904 configured to transmit one or more commands 906 to, e.g., change channels of, the TV 916. In some implementations, the remote control device may comprise a dedicated TV controller, a universal remote controller (e.g., Harmony®), a portable user interface device (e.g., a tablet, a smartphone), and/or other device. The system 900 may comprise a learning apparatus 910 configured to determine an association between sensory context and the one or more commands 902. In one or more implementations, the learning apparatus may be embodied within the appliance 916. In some implementations, the learning apparatus may comprise a plurality of instructions (e.g., a downloaded app, and/or instructions executed from other computer readable medium (e.g., an SD card, a flash drive and/or other medium).

The appliance apparatus may comprise a camera 920 configured to provide sensory input related to environment within the room containing the appliance 916 to the learning process of the apparatus 910. The camera 920 may be characterized by field of view 914. Images provided by the camera 920 may be utilized by the learning process to determine changes in the context associated with the environment within the view field 914. In some implementations context change determination may be effectuated using other data e.g., time of day/year, day of the week, weather, daylight, sound, user(s) content preferences, state of other equipment within the premises (e.g., receiver ON state), and/or other information associated with user premises.

In some implementations, the context information may comprise number, position and/or posture of users. By way of an illustration, a single user watching a movie may elect to suspend (pause) the playback in order to get a drink and/or attend to an issue outside the room. Pause command issued by the user via the handset 904 may correspond to the following context data: a single user getting up. In one or more implementations, the context may be based on information related to presence of a person obstructing view of TV screen.

In some implementations, the context may comprise information related to weather, time of day, day of the week and/or year, number of people in the room, identity of a person (e.g., a male adult versus a child), content being displayed, and/or other information. A given context may be associated with a respective control command(s) produced by the apparatus 910. For example, context comprising representation of a male adult user may cause commands to switch the TV to a sports channel while a representation of a child may correspond to a command to switch the TV to a cartoon channel. In some implementations of multi-screen video projection devices (e.g., virtual and/or physical multi-screen TV, tablets, and/or computer monitors), users may configure content for individual screens depending on time of day, day of week, weather, and or other parameters (e.g., occurrence of a sports and/or cultural event). In some implementations, the content may be configured based on presence and/or absence of one or more objects in a room: e.g., presence of a toy (e.g., from a Toy Story cartoon) character in the room may cause selection of a Disney channel and/or related TV channel.

In some implementations, the context may comprise user uses gestures that may be provided via Microsoft Kinect and/or other visual motion and position detection system. In one or more implementations, a user may utilize language commands that may be converted into some representation (e.g., a hash, a voiceprint), and used as a sensory context. Individual words of language commands (spoken language tags) may have a meaning associated therewith, and/or may be meaningless (in a given language) provided the spoken language tags consistently accompany a given action by the robotic device.

The context information (e.g., context change) may be associated with one or more actions by the apparatus 910. The association may be based on operation of a neuron network (e.g., effectuating a perceptron), a look up table and/or other classification approach, e.g., look up table.

In some implementations, a perceptron may comprise ANN network comprising one or more output artificial neuron connected to a plurality of input artificial neurons via an array (layer) of efficacies. Efficacies of the connecting layer may be adapted using e.g., correlative and/or error-based gradient descent learning process in order attain target output. Individual neurons may be operable in accordance with an arctangent, sigmoid, and/or other output generating process. The output neuron(s) may compete with one another in a softmax winner-take-all process to produce a given output.

In some implementations of controlling a digital video recorder/playback apparatus (e.g., TiVo®) coupled to a TV (e.g., via output 908 in FIG. 9), the network output may comprise four neurons configured to provide a respective output signal (e.g., PLAY, PAUSE, SLOW MOTION, and DO NOTHING). The network input may comprise 80×60 change-detection units with connections to individual output neurons.

In some implementations wherein the learning apparatus 910 may be configured to control other devices, additional output units may be utilized and/or additional perceptron components may be employed.

Various other implementations of predictor/classifier learning process may be employed, such as, e.g., a multi-layer perceptron (with a hidden layer), a K-NN predictor, or other classifier/predictors.

In one or more implementations, the action may comprise an operation executed by the appliance 916 (e.g., volume, channel, playback adjustment) and/or operations by one or more devices in communication with the appliance via interface 908. By way of an illustration, the action may comprise a pause command issued to an external playback/record device.

In one or more implementations, e.g., such as described above with respect to FIGS. 3A-3B, the context change may be associated with an event and/or command. The event (e.g., a button press on a user interface device) may be linked to the action by the appliance using, e.g., a graphical user interface methodology described with respect to FIGS. 5A-5B, and/or other applicable methodology.

In some implementations, e.g., such as described in U.S. patent application Ser. No. 14/244,888, entitled "LEARNING APPARATUS AND METHODS FOR CONTROL OF ROBOTIC DEVICES VIA SPOOFING", filed Apr. 3, 2014; Ser. No. 14/244,892 entitled "SPOOFING REMOTE CONTROL APPARATUS AND METHODS", filed Apr. 3, 2014; and Ser. No. 14/244,890, entitled "APPARATUS AND METHODS FOR REMOTELY CONTROLLING ROBOTIC DEVICES", filed Apr. 3, 2014, each of the foregoing previously incorporated herein by reference in their entirety supra, the context change may be associated with an action by the appliance 916 using remote control device 904.

In some implementations, user voice commands may be combined with user actions via a remote control (e.g., in FIG. 9) in order to provide additional disambiguating sensory context for association development. By way of an illustration, a user may say "gromche" and press TV remote "VOLUME UP" button; a user may say "tishe" and press TV remote VOLUME DOWN button. Upon developing the associations, the user may utilize voice commands (e.g., 'gromche', tishe', and/or other voice commands that may or may not have a meaning in English) in order to control the TV 916 without the remote controller. In some implementations, during operation of the trained controller, the recognition of the voice commands as part of the same sensory context may be configured based on command(s) being spoken by the same person who produced the commands during training. In one or more implementations, the command recognition may be configured based on trainer's speech characteristics (e.g., pitch, intonation, rate of speaking, and/or other characteristics).

The apparatus 910 may be configured to provide control instructions via data link 908 to one or more home appliances disposed remote from the apparatus 916. In one or more implementations, the data link 908 may comprise a wireless (e.g., Bluetooth, Wi-Fi, 3G-4G cellular, and/or wired link (e.g., serial, Ethernet and/or other link implementation).

Subsequent to learning the associations, upon detecting occurrence of a given context, the apparatus 910 may issue control instructions to the appliance apparatus 916 that may be associated with the detected context. For example, upon detecting that the user stood up (using sensory input from the camera 920) the apparatus 910 may issue commands to the apparatus 916 to pause content playback; upon detecting an adult user in the room at 6 pm during a week day the apparatus 910 may issue commands to display one or more news stations on one or more screens of the apparatus 916; upon detecting a change in weather (using e.g., a news feed, wired and/or wireless sensor component) the apparatus 910 may issue instructions to a remote window actuator via link 908 to close window, and/or instructions to an irrigation controller to suspend watering. It will be recognized by those skilled in the arts that the learning controller 910 may be employed to learn to operate other home appliances, such as, e.g., HVAC system, fan, heater, humidifier, sound system, security system, furniture, assisted living devices (e.g., motorized bed), and/or other controllable devices.

Figure 10:
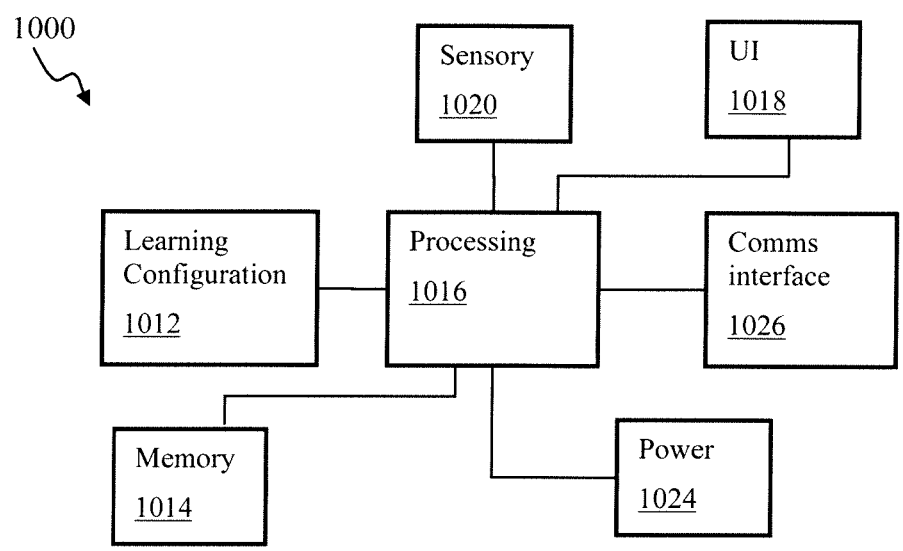
FIG. 10 is a functional block diagram detailing components of a learning control apparatus, in accordance with one implementation.

FIG. 10 is a functional block diagram detailing components of a learning apparatus (e.g., apparatus 100 of FIG. 1A, 200 of FIG. 2A, 410 of FIG. 4) in accordance with one implementation. The learning apparatus 1000 may comprise a memory component 1012 configured to store a learning configuration. In one or more implementations, the learning configuration may comprise an array of efficacies of an artificial neuron network and/or contents of a look up table. Additional memory 1014 and processing capacity 1016 is available for other hardware/firmware/software needs of the apparatus. The processing component 1016 may interface to the sensory component 1020 in order to obtain and process sensory data for, e.g., object detection, face tracking, stereo vision, and/or other tasks.

The processing component may interface with the mechanical 1018, sensory 1020, electrical 1022, power 1024, and user interface 1018 components via driver interfaces and/or software abstraction layers. Additional processing and memory capacity may be used to support these processes. It will be appreciated that these components may be fully controlled by the robotic brain. The memory and processing capacity may aid in management of learning configuration (e.g., loading, replacement), operations during a startup, and/or other operations. Consistent with the present disclosure, the various components of the device may be remotely disposed from one another, and/or aggregated. For example, the learning configuration may be executed on a server apparatus, and control the mechanical components via network or radio connection while memory or storage capacity may be integrated into the brain. Multiple mechanical, sensory, or electrical units may be controlled be a learning apparatus via network/radio connectivity.

The mechanical components 1018 may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, and/or other mechanical components.

The user interface components 1018 may comprise virtually any type of device capable of registering inputs from and/or communicating outputs to a user. These may include, without limitation, display, touch, proximity sensitive interface, light, sound receiving/emitting devices, wired/wireless input devices and/or other devices.

The sensory devices 1020 may enable the learning apparatus to accept sensory input from external entities. These may include, without limitation, video, audio, capacitive, radio, vibrational, ultrasonic, infrared, and temperature sensors radar, lidar and/or sonar, and/or other sensory devices.

The electrical components 1022 may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The communications interface 1026 may include one or more connections to external computerized devices to allow for, inter alia, management of the robotic device, e.g., as described above with respect to FIG. 3D and/or with respect to FIG. 4. The connections may include any of the wireless or wireline interfaces discussed above, and further may include customized or proprietary connections for specific applications. In some implementations, the communications interface 1026 may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the learning controller apparatus (e.g., 410 in FIG. 4) and a remote computing entity (e.g., 406, 404 in FIG. 4).

The power system 1024 may be tailored to the needs of the application of the device. For example, for a small-sized lower power appliance, a wireless power solution (e.g. battery, solar cell, inductive (contactless) power source, rectification, and/or other) may be appropriate. For building management applications, battery backup/direct wall power may be superior. In addition, in some implementations, the power system may be adaptable with respect to the training of the appliance apparatus (e.g., 720 in FIG. 7A). The training may improve operational efficiency of the appliance (to include power consumption efficiency) through learned management techniques specifically tailored to the tasks performed by the appliance apparatus.

FIG. 16 illustrates exemplary control command codes for a plurality of selected remote controlled devices, according to one or more implementations. The data in FIG. 16 represents duration in microseconds. In some implementations, the duration may correspond to duration between pulses used to encode data in using pulse position modulation methodology. In one or more implementations of pulse width modulation, the duration in FIG. 16 may correspond to pulse duration. In some implementations, of infrared remote controllers, the codes shown in FIG. 16 may be used with infrared carrier wave of wavelength at around 870 nm and/or selected between 930 nm and 950 nm. Modulation carrier may be selected between 33 kHz and 40 kHz and/or between 50 kHz and 60 kHz. In some implementations, one or more robotic devices may support a plurality of control channels" (channel a, channel b, shown in lines 44 and 52 of FIG. 16). Such configuration may allow multiple of the same type of robot to be configured and controlled simultaneously. In some implementations, codes may be combined (e.g., using XOR operation).

FIGS. 11A-15 illustrate methods of training and operating a learning controller apparatus of the disclosure in accordance with one or more implementations. The operations of methods 1100, 1120, 1200, 1220, 1240, 1300, 1400, 1500 presented below are intended to be illustrative. In some implementations, methods 1100, 1120, 1200, 1220, 1240, 1300, 1400, 1500 may be accomplished with one or more additional operations not described, and/or without one or more of the operations discussed. Additionally, the order in which the operations of methods 1100, 1120, 1200, 1220, 1240, 1300, 1400, 1500 are illustrated in FIGS. 11A-15 described below is not intended to be limiting.

In some implementations, methods 1100, 1120, 1200, 1220, 1240, 1300, 1400, 1500 may be implemented in one or more processing devices (e.g., a digital processor, an analog processor, a digital circuit designed to process information, an analog circuit designed to process information, a state machine, and/or other mechanisms for electronically processing information and/or execute computer program components). The one or more processing devices may include one or more devices executing some or all of the operations of methods 1100, 1120, 1200, 1220, 1240, 1300, 1400, 1500 in response to instructions stored electronically on an electronic storage medium. The one or more processing devices may include one or more devices configured through hardware, firmware, and/or software to be specifically designed for execution of one or more of the operations of methods 600, 700, 800, 820, 840, 900. The operations of methods 1100, 1120, 1200, 1220, 1240, 1300, 1400, 1500 may be implemented by a learning controller apparatus (e.g., 110 in FIG. 1A) configured to control a computerized appliance apparatus (e.g., 220 in FIG. 2A, 720 in FIG. 7B, and/or 916 in FIG. 9).

Figure 11A:
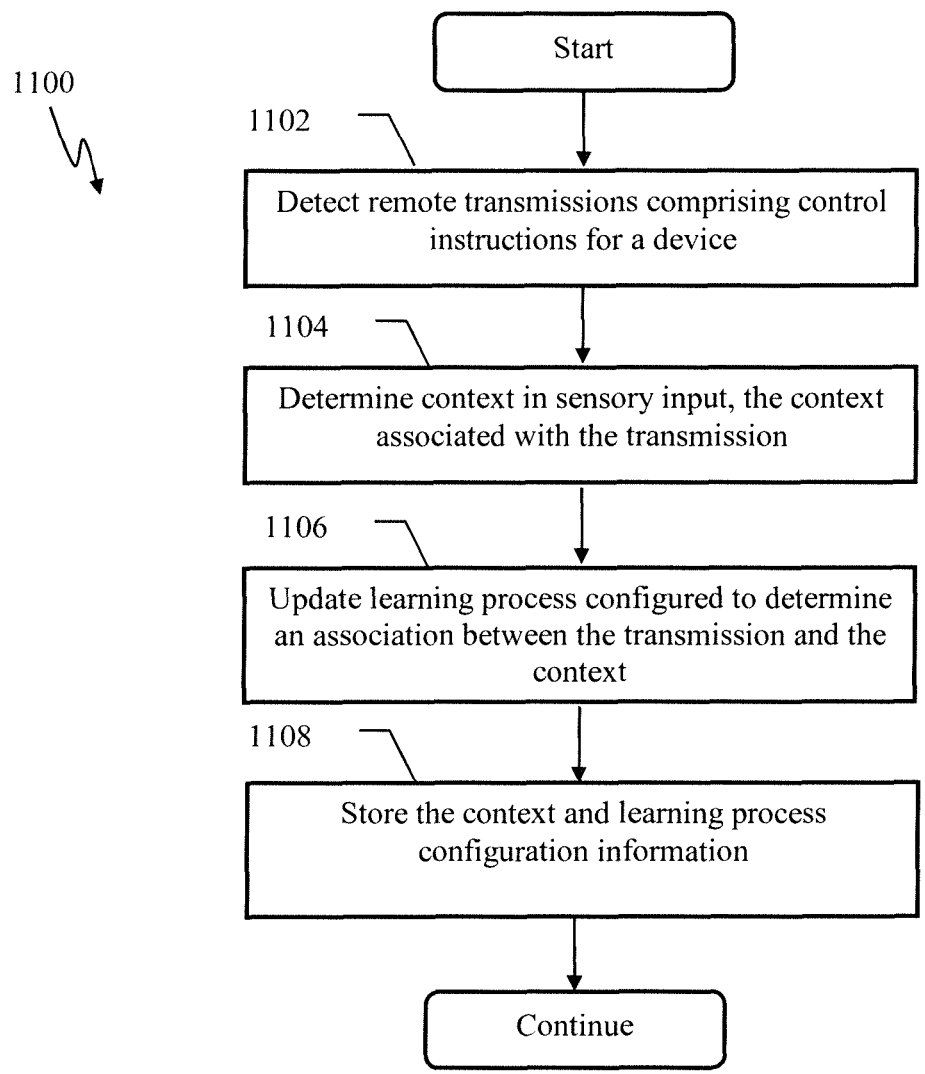
FIG. 11A is a logical flow diagram illustrating a method of determining an association between a control instruction for an appliance apparatus and sensory context, in accordance with one or more implementations.

FIG. 11A illustrates a method of determining an association between a control instruction for an appliance apparatus and sensory context, in accordance with one or more implementations.

At operation 1102 of method 1100, illustrated in FIG. 11A remote transmissions comprising control instructions for the appliance apparatus may be detected. In one or more implementations, the transmissions may comprise infrared light wave and/or radio wave pulses produced by a remote control device (e.g., 202 in FIG. 2A, 904 in FIG. 9). The control instructions may comprise one or more commands to the apparatus device to perform one or more actions (e.g., POWER ON).

At operation 1104 sensory input conveying context associated with environment of the apparatus and occurring contemporaneous with the transmissions may be analyzed. In one or more implementations, such as gesture recognition, the sensory input may be provided by a sensor component of the learning controller (e.g., camera 352 of the apparatus 360 in FIG. 3B) and may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a rate between 2 and 100 fps. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. In one or more implementations, the sensory aspects may include location of user body, head, and/or limb position, orientation, and/or configuration, an object being detected in the input, a location of the object, an object characteristic (color/shape), characteristic of object movements (e.g., limb motion), a characteristic of an environment (e.g., amount of daylight, ambient temperature, time of day, and/or other information).

In some implementations, the context determination may be configured based on detection of a sudden change (e.g., within a time window selected between 1 seconds and 10 seconds) of a given sensory characteristic (e.g., image pixel change in color, brightness, local contrast, local binary pattern, sound level, and/or other parameter). In one or more implementations, e.g., such as described with respect to FIG. 15 and/or FIGS. 17A-17D, the context detection may be configured based on a comparison of current sensory input characteristic and reference sensory input characteristic. In some implementations of image processing, the reference sensory input characteristic may be configured based on a reference frame depicting initial (background) state of the environment (e.g., an image of a room without users and/or image of the user in upright position (e.g., 534 in FIG. 5A). That is, the learning process may be configured to periodically acquire a reference image of a room (I0) and process the differences between the image I0 and a current image I1.

Advantageously, such configuration may enable continuing functioning of the learning controller when relocated (e.g., rotated or translated), as the previously acquired (reference) image of the environment may be utilized in order to be used to compensate for the relocation and prior learned associations to continue to function as desired/expected by the user. By way of an illustration of a learning controller embodied in a light fixture (e.g., 610 of FIG. 6A, and/or 810 of FIG. 8A) the controller apparatus may be removed for maintenance/repairs (e.g., clean/replace the lens). When reinstalled, the lens field of view may not match with sufficient precision (e.g., to within 10-20 pixels). Field of view (FOV) mapping techniques may be applied to correct for mismatch between field of view of the lens user in training and field of view of lens subsequent to repairs/maintenance. In one or more implementations, the FOV mapping may be utilized to correct for mismatch between individual lenses. FOV mapping may enable use of previous training results.

In some implementations wherein user privacy may be of concern, the learning controller may be embodied in a mobile platform (rover). Upon a request from a user, the rover may enter a given room, acquire image input, activate/deactivate one or more appliances, devices, and be dismissed (with image acquisition disabled) if privacy is desired. The learning controller may operate a Wi-Fi on/off switch in order to connect/disconnect the device from the Internet and ensure privacy of video capture.

In one or more implementations, the reference state (the image I0) may be determined based on an output of a high pass filter of the image sequence. The filter may comprise an exponential filter operation, e.g., described with respect to FIG. 15. The decay half life time window of the exponential filter may be selected between 1 and 10 seconds. A given image may be compared to the reference image in order to determine the context. In some implementations, learning the associations may be configured to potentiate occurrence of context-action indication pairs wherein the action indication may occur in close proximity to the context (e.g., 1-2 frames at 10 frames per second video). The filter decay time window may be configured at 5-10 times the interval between the context and the action indication.

At operation 1106 associations may be developed between the control instructions determined at operation 1102 and the corresponding context. In one or more implementations, the associations may be configured based on one or more LUT characterizing the relationship between sensory input (e.g., user gesture) and the control instruction (e.g., POWER ON) obtained by the learning controller during training.

At operation 1108 the association information may be stored. In some implementations, the information storing of operation 1108 may comprise storing one or more entries of a LUT in internal memory of the learning controller apparatus (e.g., the memory 1012, 1014 in FIG. 10). In one or more implementations, the associations may be stored off-device in, e.g., a computer cloud depository 406 of FIG. 4.

In some implementations, it may be of use (e.g., due to a development of an erroneous association and/or given functionality no longer needed) to enable the learning controller to selectively not to trigger a given action (e.g., to selectively not turn on TV) based on occurrence of corresponding context (a given person entering a room). In some implementations, the controller learning process may be trained to select no-action output with the given context by, e.g., utilizing a GUI element configured to convey the DO NOTHING or NO ACTION indication. By way of an illustration, a user may utilize a remote control device (e.g., 202 in FIG. 2A, 904 in FIG. 9 and/or other) in order to communicate to the learning controller the NO ACTION indication contemporaneous with the occurrence of a given context (e.g., appearance of a person in field of view of the camera 920). Based on receiving the NO ACTION indication, the learning process may potentiate the respective output (e.g., by increasing weights of the ANN nodes associated with outputting NO ACTION or incrementing the respective entry in the LUT). Subsequent to training, the learning controller may be configured not to turn the TV automatically when the person enters the room. This result may be obtained through competition (e.g., softmax or other winner-take-all mechanism) governing the output of the system.

The learning controller may comprise functionality configured to enable removal of no longer needed learned associations by "unlearning/'forgetting' respective association between the context (e.g., person entering the room) and the action (turn TV ON) while preserving other trained associations (e.g., turn lights ON).

In some implementations, the association removal may be effectuated using a "remove" GUI element, implemented e.g., by the user interface device 310, 320, and/or 710 of FIGS. 3A, 3B, 7A.

When a given context occurs (e.g., a person entering a room), the user may activate the respective action (turn TV ON) indication element (e.g., the button 322 of the apparatus 320 in FIG. 3B) and the remove element (e.g., a touch button). Upon receiving the context, the action indication (e.g., turn TV OFF) and the remove indication the learning process may depress (reduce efficacy of the ANN nodes associated with enabling the TV ON action output) or decrementing the respective entry in the LUT. Subsequent to training of action removal, the learning process may selectively not perform the removed action (e.g., not turn the TV ON). The remaining action associations (e.g., turn lights ON) may remain unaffected. In some implementations, wherein a substantial amount of background movement and/or sounds may be present during training (e.g., during a party with 7 or more people), multiple repetitions of context-action may be required to obtain a reliable association.

In one or more implementations, a user may be provided with a graphical interface configured to enable removal of associations from the learned configuration implemented e.g., by the user interface device 310, 320, and/or 710 of FIGS. 3A, 3B, 7A. The user may be provided with, e.g., a list detailing an action (e.g., turn TV ON, turn LIGHT ON) and information identifying the respective context (e.g., a picture of the user). The GUI may enable the user to selectively remove unwanted associations. In some implementations, the user may activate "remove" component of the learning process. While in the remove mode, based on occurrence of a context (e.g., the person entering the room) the user may be provided with a list of learned associations for this context.

Figure 11B:
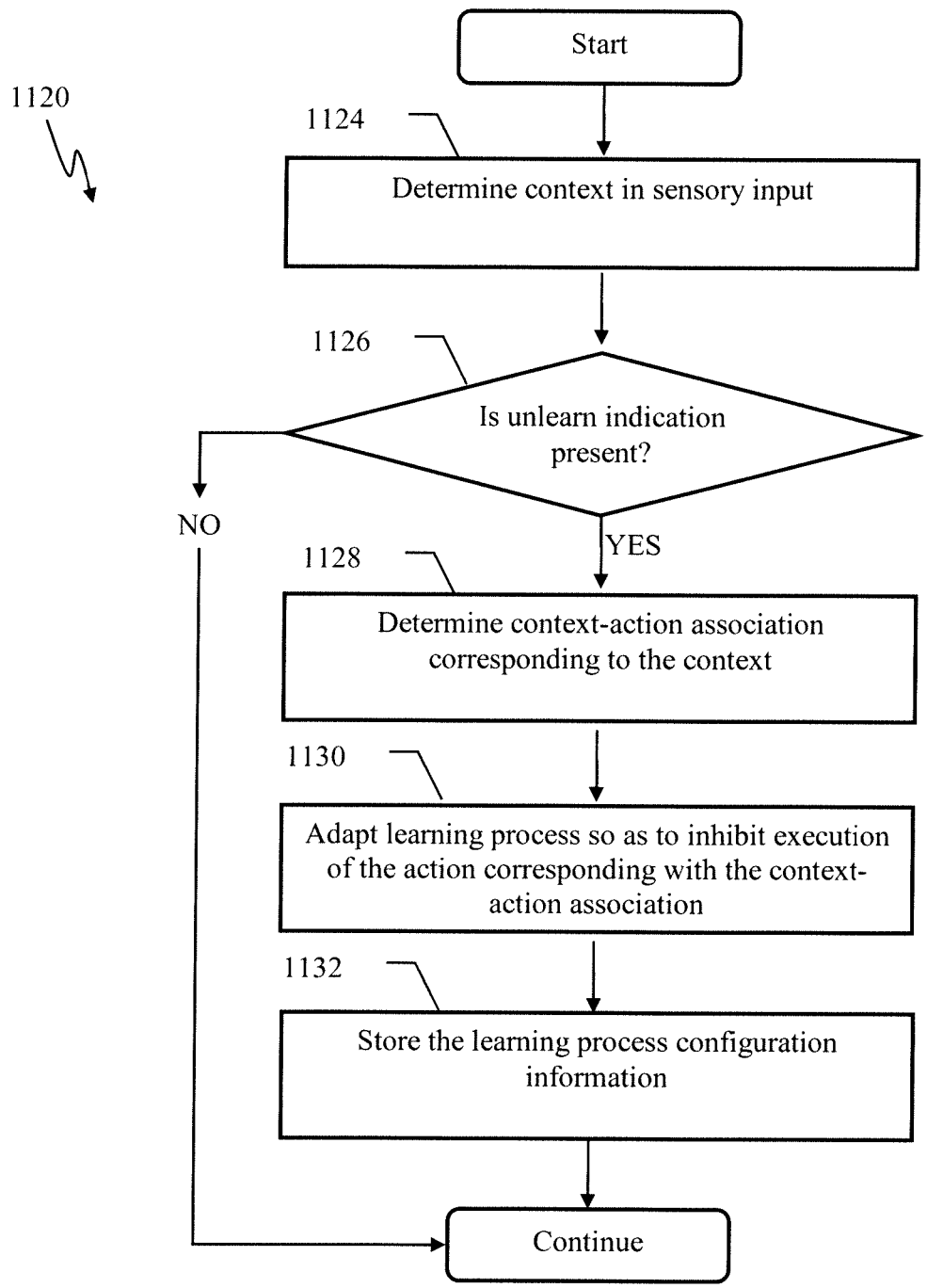
FIG. 11B is a logical flow diagram illustrating a method of determining/eliminating suppressing an association between a control instruction for an appliance and sensory context, in accordance with one or more implementations.

FIG. 11B illustrates a method of suppressing an association between a control instruction for an appliance and sensory context, in accordance with one or more implementations.

At operation 1124 of method 1120 a context may be determined using any applicable methodology described herein. In some implementations, the context may comprise user posture (e.g., 702 in FIG. 7A), user gesture (e.g., 902 in FIG. 9), a representation of a person entering a room, a sound, and/or other sensory information.

At operation 1126 a determination may be made as to whether an unlearn indication present. In some implementations, the unlearn (also referred to as undo) indication may comprise a transmission associated with a button press of a GUI device. In one or more implementations, the unlearn indication may be configured based on activation of unlearn component of a GUI.

Responsive to determination at operation 1126 that the unlearn indication may be present, the method may proceed to operation 1128 wherein context-action association corresponding to the context may be determined. In some implementation wherein a single action may correspond to a given context (e.g., turn TV ON when a given person enters the room), the action determination (e.g., turn TV ON) may be based on identification of the context determined at operation 1124. In one or more implementation wherein multiple actions may correspond to a given context (e.g., turn TV ON and turn light ON when the person enters the room), action identification may be configured based on one or more of (i) action indication provided to the learning process (e.g., activating the button 322 of the apparatus 320 described with respect to FIG. 3B and/or selection of context-action association using the remove GUI component described above.

In some implementations of a LUT-based learning process configured to provide a plurality of outputs (e.g., in absence of a winner takes all competition process) an entry in the LUT associated with the context determined at operation 1124 may be removed, a score corresponding to the [context+control instruction] combination may be decremented. In one or more implementations of a neuron network-based learning process configured to provide a plurality of outputs (e.g., in absence of a winner takes all competition process), efficacy of connections associated with outputting the instruction determined at operation 1122 may be reduced.

In one or more implementations of a LUT-based learning process configured to provide a specific output (e.g., using a winner takes all competition process) an entry in the LUT associated with a competing action for the context determined at operation 1124 may be added, a score corresponding to the [context+competing action] combination may be incremented. In one or more implementations of a neuron network-based learning process configured to provide a given outputs (e.g., based on a winner takes all competition process), efficacy of connections associated with outputting the a NULL command may be increased In one or more implementations, "SEND NOTHING" indication may be utilized. By way of an illustration, a user interface element (e.g., unlearn button) may be provided to indicate to the learning process to ignore a particular input. In some implementations, the unlearn button may be configured to cause the learning process to unlearn sending any action, unlearn sending the most recent action and/or another action composition. The unlearn functionality may enable operation of the learning process to remove false positives cannot be untaught. This helps obviate the disadvantage of false positives, erroneous and/or no longer needed associations and/or other actions.

At operation 1130 learning process may be adapted so as to inhibit execution of the action corresponding with the context-action association. In some implementations, the inhibition may be configured based on potentiation of the NO ACTION output configured to cause the learning process to activate NO ACTION output based on detection of the context. In some implementations, the learning process adaptation may comprise depression of the output associated with the action by e.g., reducing efficacy of the ANN nodes associated with enabling the TV ON action output or decrementing the respective entry in the LUT.

In some implementations, wherein a controlled appliance may be operable in a mode wherein it may expect a command, the NULL association may cause transmission of a NULL command (e.g., a packet with empty payload). Upon detecting such command/packet, the appliance may take no action (e.g., the TV controller may continue listening to commands without altering its state). In one or more implementations, wherein a controlled appliance may be operable via a message queue (e.g., respond when there is a command, otherwise perform no action), the NO ACTION association may cause no command transmission to the transmission to the appliance. At operation 1132 the adapted configuration of the learning process may be stored. In some implementations, e.g., such as illustrated with respect to FIG. 10, the association learning process configuration may comprise a LUT stored within a nonvolatile storage medium of the learning controller apparatus. In one or more implementations, e.g., such as illustrated with respect to FIG. 4, the learning process configuration may be on a nonvolatile storage medium disposed outside of the learning controller apparatus (e.g., within a computing Cloud, and/or other storage device).

Operations of method 1120 may be used to implement "undo" functionality. In some implementations, upon receiving the undo indication the learning process may be operable to unlearn (e.g., suppress) the most recently learned context-action association (remove learned "robotic behavior"). In one or more implementations, the undo indication may cause removal of learned behaviors/associations during a given period of time. Specific associations may be indicated to the learning process by providing the relevant context (e.g., gesture). By way of an illustration, upon realizing that the controller learned an erroneous association causing an undesired behavior of an appliance (e.g., pausing video playback whenever one user may raise an arm while stretching) the user may issue the undo indication. Subsequently, during a given interval, the user may raise an arm to provide the context. The learning process may determine one or more actions (commands) that may be associated with that context (e.g., user gesture of raising an arm). The most recent action from the one or more of the actions associated with that context may be suppressed (removed) using methodology described herein. In one or more implementations, all actions associated with that context may be suppressed (removed).

The interval during which context for unlearning associations may be provided may be selected between 1 s and 300 s. In some implementations, the interval may be selected arbitrarily long (e.g., until another undo indication may be provided to indicate end of the undo interval). In one or more implementations, the interval may be configured based on an amount of ambient sensory input that may have been analyzed during context detection during training. For example, in some implementations, wherein during training, a substantial amount of background movement and/or sounds may have been present (e.g., during a party with 7 or more people), undo interval may be increased commensurate with the duration of the training.

Figure 12A:
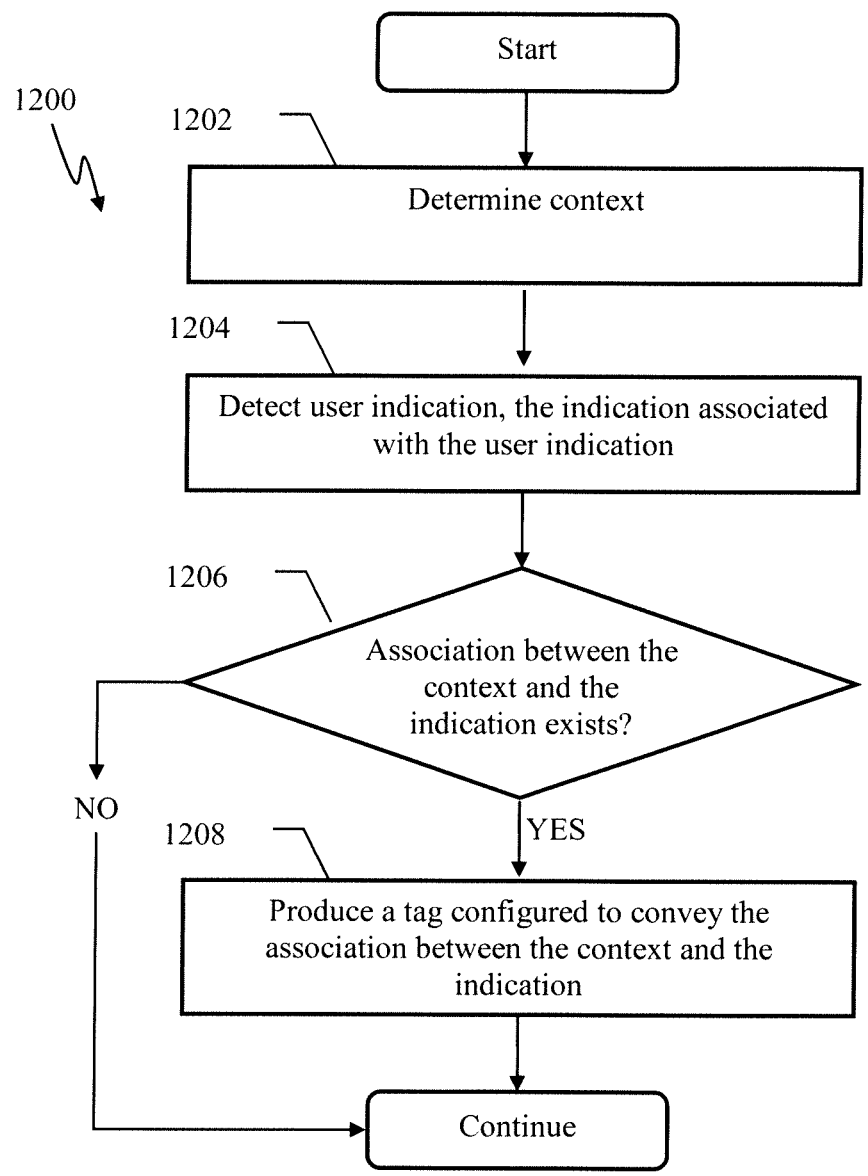
FIG. 12A is a logical flow diagram illustrating a method of assigning a tag to a context determined in sensory input, in accordance with one or more implementations.

FIG. 12A illustrates a method of assigning a tag to a context determined in sensory input during training, in accordance with one or more implementations. Operations of method 1200 may be performed during training of a learning process of a controller apparatus of, e.g., 210 in FIG. 2A, 310 in FIG. 3B, 910 in FIG. 9.

At operation 1202, context may be determined. In some implementations, the context determination may be configured based on analysis of sensory input. In some implementations, the sensory input may comprise video image sequence and/or audio signal. Analysis may comprise, e.g., operations described with respect to FIGS. 15 and/or 17A-17D.

At operation 1204 user indication associated with the context of operation 1202 may be detected. In one or more implementations, the indication may comprise activation of a user interface element (e.g., GUI button 312, 314 in FIG. 3A, and/or remote controller 202 in FIG. 2A). By way of an illustration, during training of a learning process of the controller 610 of FIG. 6A, a user may alter their posture (e.g., lean in towards a night table appliance 620) and communicate a remote control command via the transmission 606. In the implementation shown and described with respect to FIG. 3A, the user may provide a gesture and press a button using the user interface device 310.

In some implementations of training, the user indication may be provided contemporaneously (e.g., within one-2 seconds) with the context (e.g., the user uses one arm to produce a gesture and another hand to press a button on a user interface device). In some implementations, different physical users (referred colloquially as the user) may cooperate to provide the context (e.g., a gesture) and the indication (e.g., the button press). In some implementations, different physical users (referred colloquially as the user) may cooperate to provide the context (e.g., a gesture) and the indication (e.g., the button press). The user indication may closely follow the context and/or context change. In one or more implementations (e.g., described with respect to Eqn. 1) wherein the reference sensory input may comprise output of a filter characterized by a time constant $T_A$, the user indication may follow the context within the window duration. During operation of the trained controller, the action (e.g., command transmission 216 in FIG. 2A) may be triggered (without a delay) based occurrence of the respective context.

At operation 1206 a determination may be made as to whether an association between the context and the indication may exist. In some implementations of the learning process configured based on use of a LUT, a row or a column element of the LUT corresponding to the context may be accessed in order to determine as to whether the given context has previously occurred. An entry (e.g., a cell) of the selected row/column LUT element may be accessed in order to determine as to whether the given indication has previously occurred for the given context.

Responsive to the determination at operation 1206 that the association may exist, the method may proceed to operation 1208 wherein a tag may be produced. The tag may be used to convey the existence and/or identification of the association between the context and the indication.

Figure 12B:
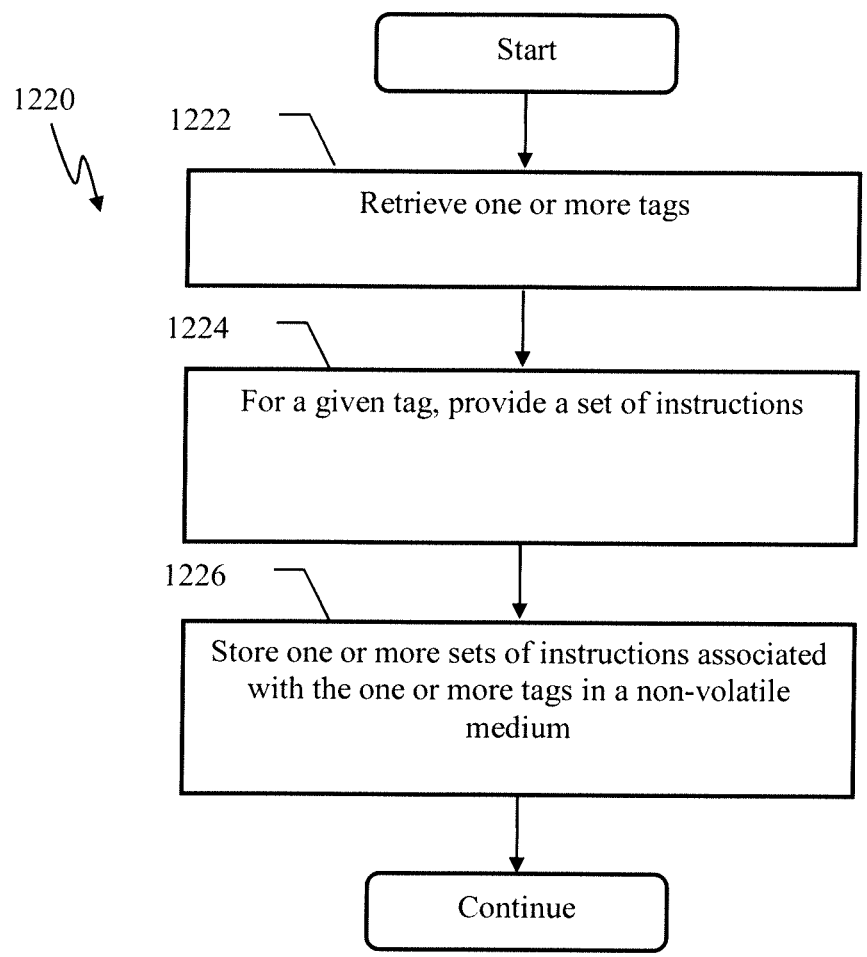
FIG. 12B is a logical flow diagram illustrating assigning a set of machine instructions for a given tag determined by method of FIG. 12A for operating an appliance apparatus, in accordance with one or more implementations.

FIG. 12B illustrates a method of assigning a set of machine instructions for a given tag determined by method of FIG. 12A for operating an appliance apparatus, in accordance with one or more implementations. In one or more implementations, operations of method may be effectuated using a GUI rendered by a computerized device, e.g., such as described with respect to FIGS. 5A-5B.

At operation 1222 one or more tags may be retrieved. In some implementations, the tag retrieval may comprise presentation of the one or more tags (e.g., EventIDs) by a graphical user interface, e.g., the event list 501 comprising tags 502, 504, 506, that may have been associated previously (e.g., the events produced by pressings of buttons 313, 315 in FIG. 3C) with user indications during training described above with respect to FIGS. 3A-3C.

At operation 1224 a set of instructions may be provided for a given tag. In some implementations, the instructions may be provided by specifying an appliance and a respective command for the appliance, (e.g., DVD player 555 and play command 544 in FIG. 5B). In some implementations, wherein a learning controller (e.g., 214 in FIG. 2A) may be configured to communicate directly to the appliance, the instructions when executed by a processor may be configured to cause transmission of pulses of a carrier wave to the appliance. FIG. 16 presents an exemplary listing of pulse codes for communicating commands to several selected appliance devices. In some implementations, wherein a learning controller (e.g., 214 in FIG. 2A) may be configured to communicate directly to the appliance, the instructions when executed by a processor may be configured to cause transmission of pulses of a carrier wave to the appliance. FIG. 16 presents an exemplary listing of pulse codes for communicating commands to several selected appliance devices.

In some implementations, wherein a learning controller process (e.g., 214 in FIG. 2A) may be configured to communicate to an intermediate device, (e.g., home automation controller 362 and/or home automation application) the instructions when executed by a processor may be configured to cause transmission of a command to the automation controller 362 and/or home automation application.

At operation 1224 one or more sets of instructions provided at operation 1224 and associated with the one or more tags may be stored in a non-volatile medium. In some implementations, the instructions may be stored in memory of a local learning controller apparatus (e.g., 210 in FIG. 2A, 320 in FIG. 3B, 410 in FIG. 4). In one or more implementations, the instructions may be stored in memory of a remote apparatus (e.g., computerized device 404 and/or remote server 406 in FIG. 4).

Figure 12C:
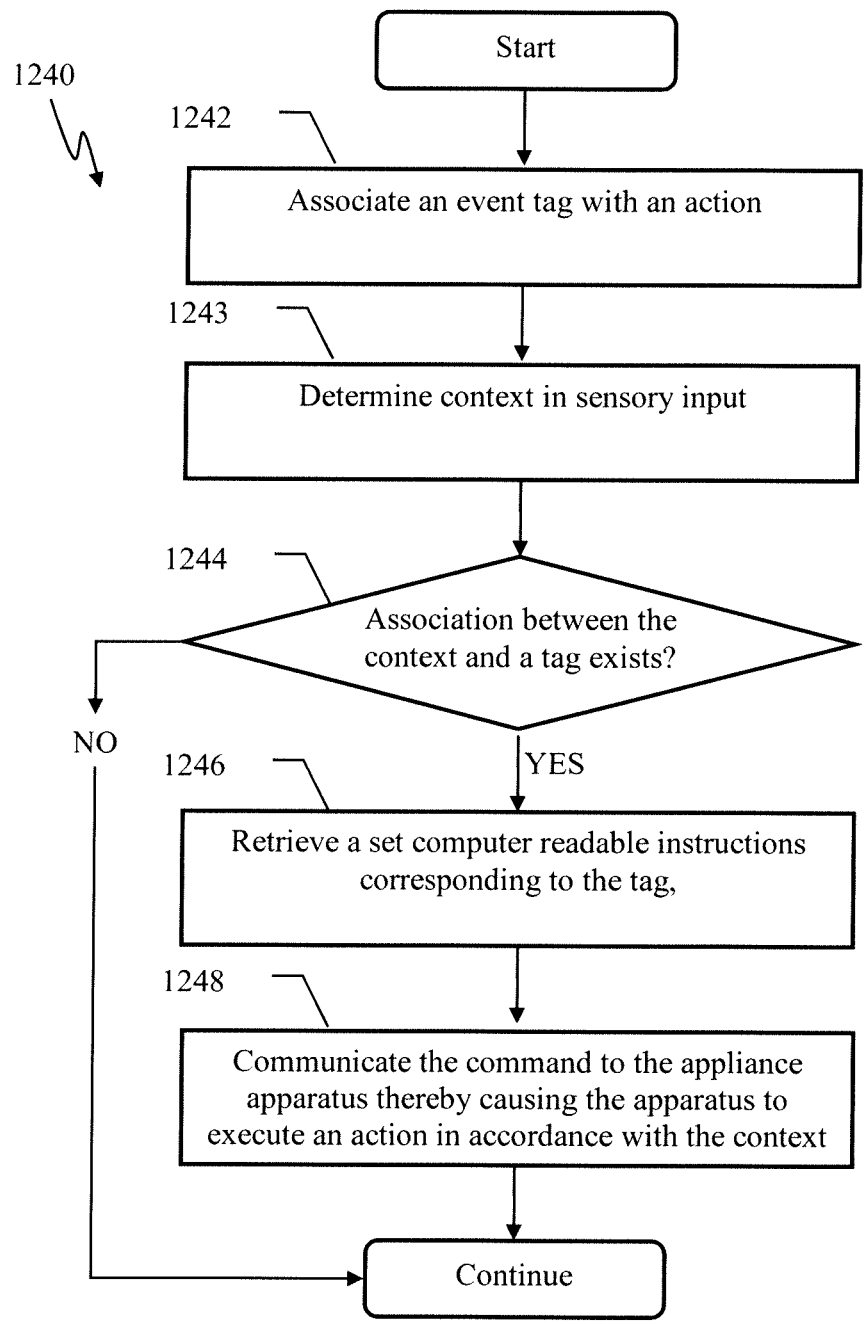
FIG. 12C a logical flow diagram illustrating operating the appliance apparatus using the tag and the set of machine instructions, in accordance with one or more implementations.

FIG. 12C illustrates a method of operating a computerized appliance apparatus using the tag and the set of machine instructions, in accordance with one or more implementations.

At operation 1242 an event tag may be associated with an action. In some implementations, the tag-action association may be effectuated via a GUI, e.g., as described with respect to FIGS. 5A-5B. By way of an illustration, the tag 502 may be associated with power toggle operation for a TV 552 and DVD 554 appliances.

At operation 1243 context in sensory input may be determined. In some implementations, the context determination may be effectuated based on analysis of a plurality of images, e.g., using functionality described with respect to FIG. 15 and/or FIGS. 17A-17D. In one or more implementations, the context determination may be configured based on analysis of two or more signal modalities (e.g., video and audio, video and RF, and/or other combinations) and/or two or more distinct transmissions of a given modality signal (e.g., RF transmission using two distinct PR codes). Use of a second signal modality may enable removal of false positives during context determination.

At operation 1244 a determination may be made as to whether an association between the context and the tag may exist. In some implementations of the learning process configured based on use of a LUT, a row or a column element of the LUT corresponding to the context may be accessed in order to determine as to whether the given context has previously occurred. An entry (e.g., a cell) of the selected row/column LUT element may be accessed in order to determine as to whether the given tag has previously occurred for the selected context.

Responsive to the determination at operation 1244 that the association may exist, the method may proceed to operation 1246 wherein a set computer readable instructions corresponding to the tag may be retrieved. In some implementations, execution of instructions retrieved at operation 1246 may be configured to communicate a command to the computerized appliance apparatus.

At operation 1248 the command may be communicated to the apparatus thereby causing the apparatus to execute an action in accordance with the context detected at operation 1243. In some implementations, the action may comprise one or more actions described with respect to FIGS. 2A, 3A-3D, 5A-7B, and/or other actions.

Figure 13:
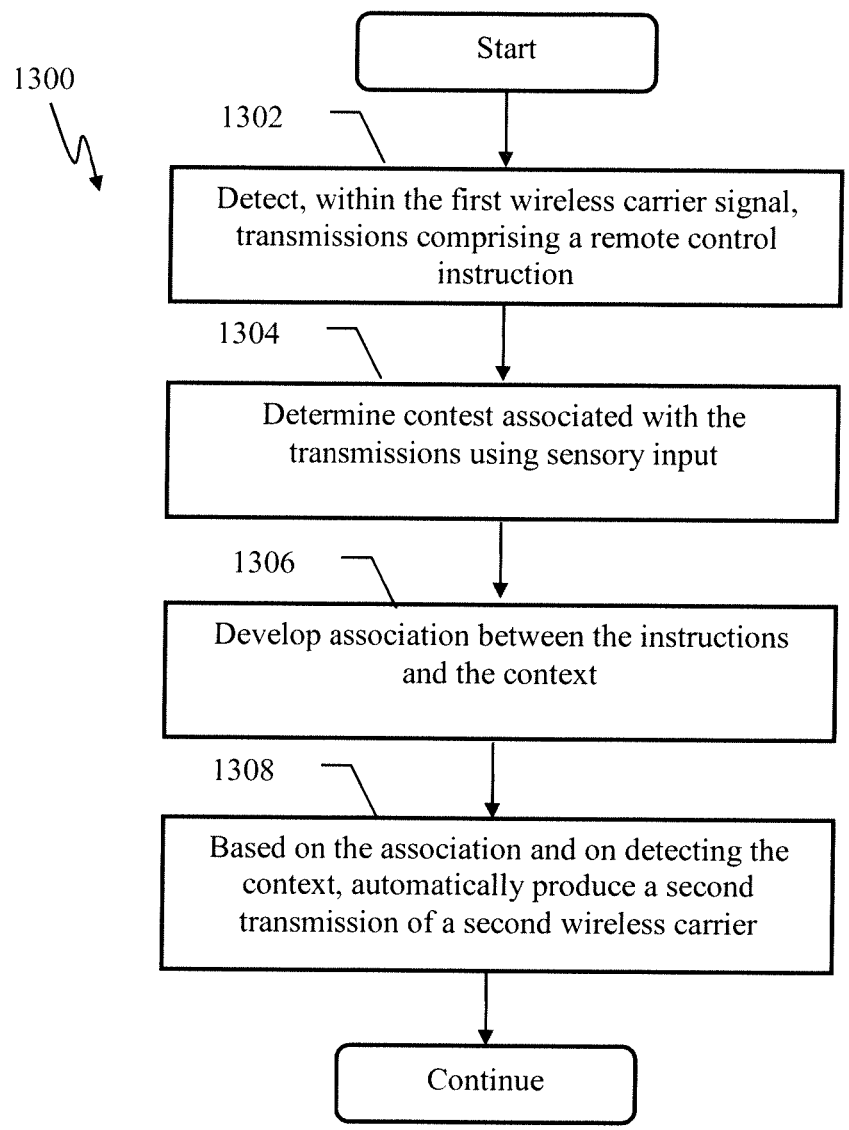
FIG. 13 is a logical flow diagram illustrating provision of control instructions to an appliance device by a learning controller apparatus using mixed carrier operation, in accordance with one or more implementations.

FIG. 13 illustrates provision of control instructions to an appliance device by a learning controller apparatus using mixed carrier operation, in accordance with one or more implementations. Operations of method 1300 of FIG. 13 may be employed by, e.g., the learning controller apparatus 210 of the system 200 shown in FIG. 2A. The control apparatus may utilize methodology of method 1300 in order to operate one or more computerized appliance devices (e.g., a computerized HVAC, At operation 1302 of method 1300 illustrated in FIG. 13 transmissions of a first wireless carrier comprising a control instruction may be determined. In one or more implementations, the first carrier may comprise IR, RF, visible light, pressure (e.g., sound) and/or other carrier configured to communicate data to the learning. In some implementations, the first carrier transmissions may be produced by a wireless remote controller device, e.g., user handset device 202 of FIG. 2A. The control instruction may be configured to communicate an indication of an action to be performed by the appliance device (e.g., POWER ON OFF for the fan 220 of FIG. 2A and/or OPEN CLOSE drawer by the night stand 720 in FIG. 7A).

At operation 1304 context corresponding to the transmissions described with respect to operation 1302 may be determined. In one or more implementations, the context may be determined based on analysis of sensory input, e.g., the input described above with respect to FIGS. 11A, 11B, 12A. The context may comprise user gesture, posture change, user voice command, opening of a book by the user, daytime, and/or other characteristic of environment associated with the appliance At operation 1306 an association between the context and the respective remote control instruction determined at operation 1302 may be developed. In some implementations, the association may be produced based on one or more LUT characterizing the relationship between the context (e.g., user rising the right hand) and control signal (e.g., RF code corresponding to POWER ON) obtained by the learning controller during training. In one or more implementations, the associations may comprise a trained configuration of a network of artificial neurons configured to implement an adaptive predictor and/or combiner of the control system described, e.g., in U.S. patent application Ser. No. 13/842,530 entitled "ADAPTIVE PREDICTOR APPARATUS AND METHODS", filed Mar. 15, 2013; and Ser. No. 13/842,562 entitled "ADAPTIVE PREDICTOR APPARATUS AND METHODS FOR ROBOTIC CONTROL", filed Mar. 15, 2013, each of the foregoing previously incorporated herein by reference in their entirety supra.

At operation 1308, based on the association developed at operation 1306 and on detecting the context occurring at operation 1304, a second transmission of a second wireless carrier may be automatically produced. Second carrier transmissions may comprise IR, RF (e.g., configured using Direct Sequence Spread Spectrum (DSSS), and/or frequency hopping spread spectrum" (FHSS)), pressure, and/or other technology may be utilized. The second transmission may be configured communicate one or more instructions to the appliance apparatus, (e.g., the fan 220 in FIG. 2A, and/or the night stand 720 in FIG. 7B. The instructions may be configured to cause the appliance apparatus to perform the action associated with the control instruction described above with respect to operation 1302.

Figure 14:
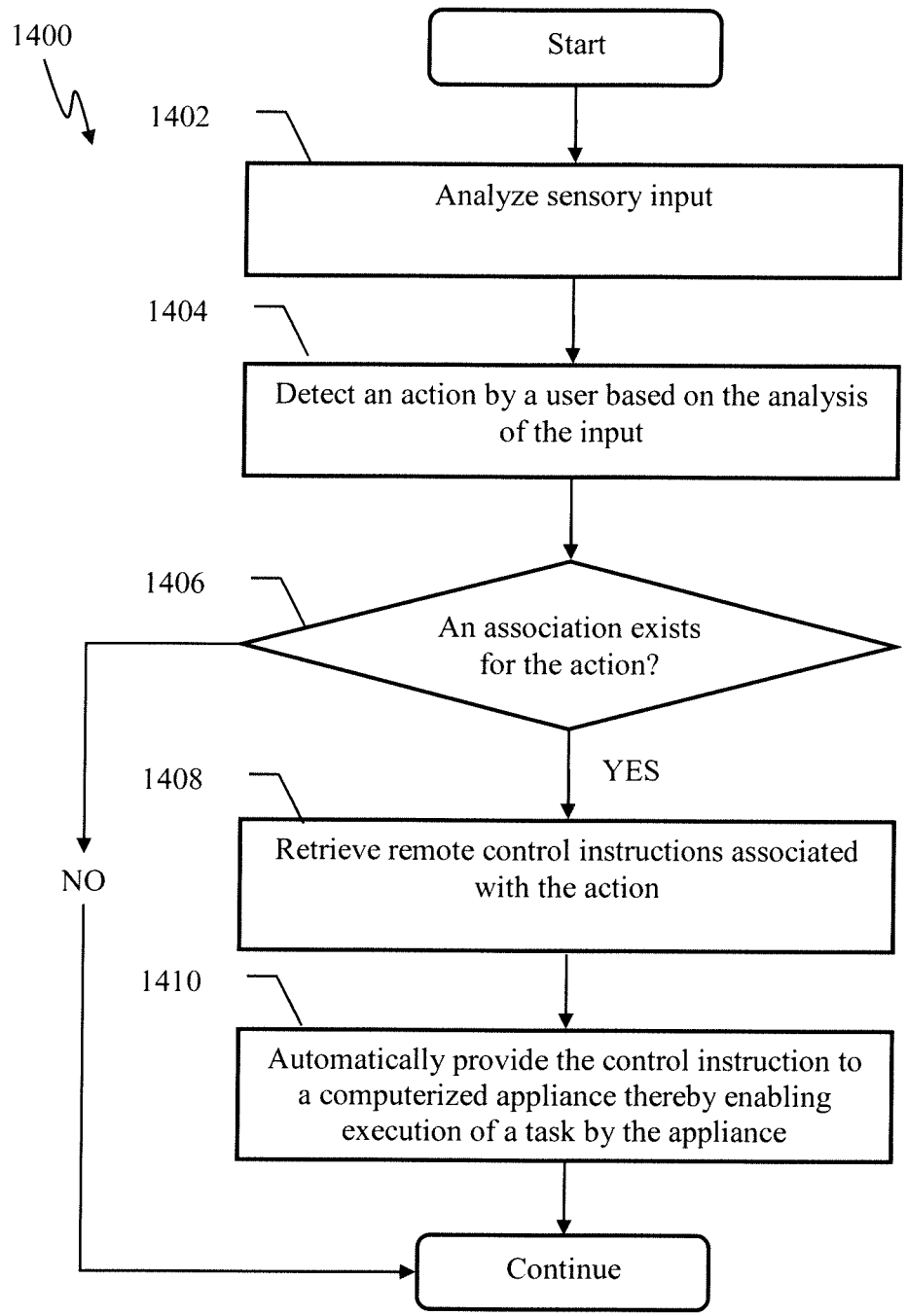
FIG. 14 is a logical flow diagram illustrating provision of control instructions to an appliance device by a learning controller based on an action by a user, in accordance with one or more implementations.

FIG. 14 illustrates provision of control instructions to an appliance device by a learning controller based on an action by a user, in accordance with one or more implementations. The method 1400 described with respect to FIG. 14 may be utilized by e.g., computerized systems 200, 350, 400, 630, 730, 830, 900 described above with respect to FIGS. 2A, 3D, 4, 6B, 7B, 8B, 9, respectively.

At operation 1402 of method 1400 sensory input may be analyzed. In one or more implementations, the sensory input may comprise output of a video camera, audio, electromagnetic, pressure wave sensor array, a combination thereof, and/or other data (e.g., time of day/week/year, motion parameters provided by, e.g., an inertial measurement component. In one or more implementations the sensory input may be provided by a sensor module of the learning controller (e.g., 212 in FIG. 2A) and may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of artificial RGCs, a CCD, an APS, and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure.

At operation 1404 a user action may be determined. In some implementations, the user action may comprise a gesture, a posture change, a voice command, an eye movement, an audible indication, activation of a remote control device (e.g., and/or other 202, 320 in FIGS. 2A, 3B), and/or other indications that may be related to a context associated with a task execution by a robot may be determined. In some implementations, user action determination may be configured using information related to user location, number of users, their characteristics (e.g., age, sex, height). User action determination may be based on analysis of sensory input described with respect to operation 1402. In some implementations of video sensor data, the sensory input analysis may comprise operations described with respect to FIGS. 15, 17A-17D.

At operation 1406 a determination may be made as to whether the action determined at operation 1404 has previously occurred and an association exists for the user action. The association may comprise a relationship between the user action and one or more control instructions configured to cause the computerized appliance to execute an operation (e.g., turn on/off, open close). In one or more implementations, determination as to whether the association exists may be based on an analysis of a LUT configured to store associations between the action and the corresponding control instruction. In some implementations of the learning process configured based on use of a LUT, a row or a column element of the LUT corresponding to the user action may be accessed in order to determine as to whether the given action has previously occurred. An entry (e.g., a cell) of the selected row/column LUT element may be accessed in order to determine as to whether one or more control instructions have been previously associated with the given action.

Responsive to determination at operation 1406 that the association may exist, the method 1400 may proceed to operation 1408 wherein one or more control instructions associated with the user action may be retrieved. In some implementations, wherein protocol specification of the control communication between the user handset (e.g., 202 in FIG. 2A) and the appliance (e.g., 220 in FIG. 2A) may be available to the learning controller (e.g., 210 in FIG. 2A), the control instructions may be configured using the protocol specification (e.g., command pulse code illustrated in FIG. 16). In some implementations, wherein protocol specification of the control communication between the handset and the appliance device may be unavailable to the learning controller, the control instructions may be configured using a playback of user command transmission portions associated with a given user action (e.g., IR remote transmission to cause the robot to mute the TV), e.g., as described in detail in U.S. patent application Ser. No. 14/244,888, entitled "LEARNING APPARATUS AND METHODS FOR CONTROL OF ROBOTIC DEVICES VIA SPOOFING", filed Apr. 3, 2014; Ser. No. 14/244,892 entitled "SPOOFING REMOTE CONTROL APPARATUS AND METHODS", filed Apr. 3, 2014; and Ser. No. 14/244,890, entitled "APPARATUS AND METHODS FOR REMOTELY CONTROLLING ROBOTIC DEVICES", filed Apr. 3, 2014, each of the foregoing previously incorporated herein by reference in their entirety supra.

At operation 1410 the one or more control instructions determined at operation 1408 may be automatically provided to the appliance thereby enabling execution of the operations (e.g., closing the drawer by the night stand 620 in FIG. 6B).

Figure 15:
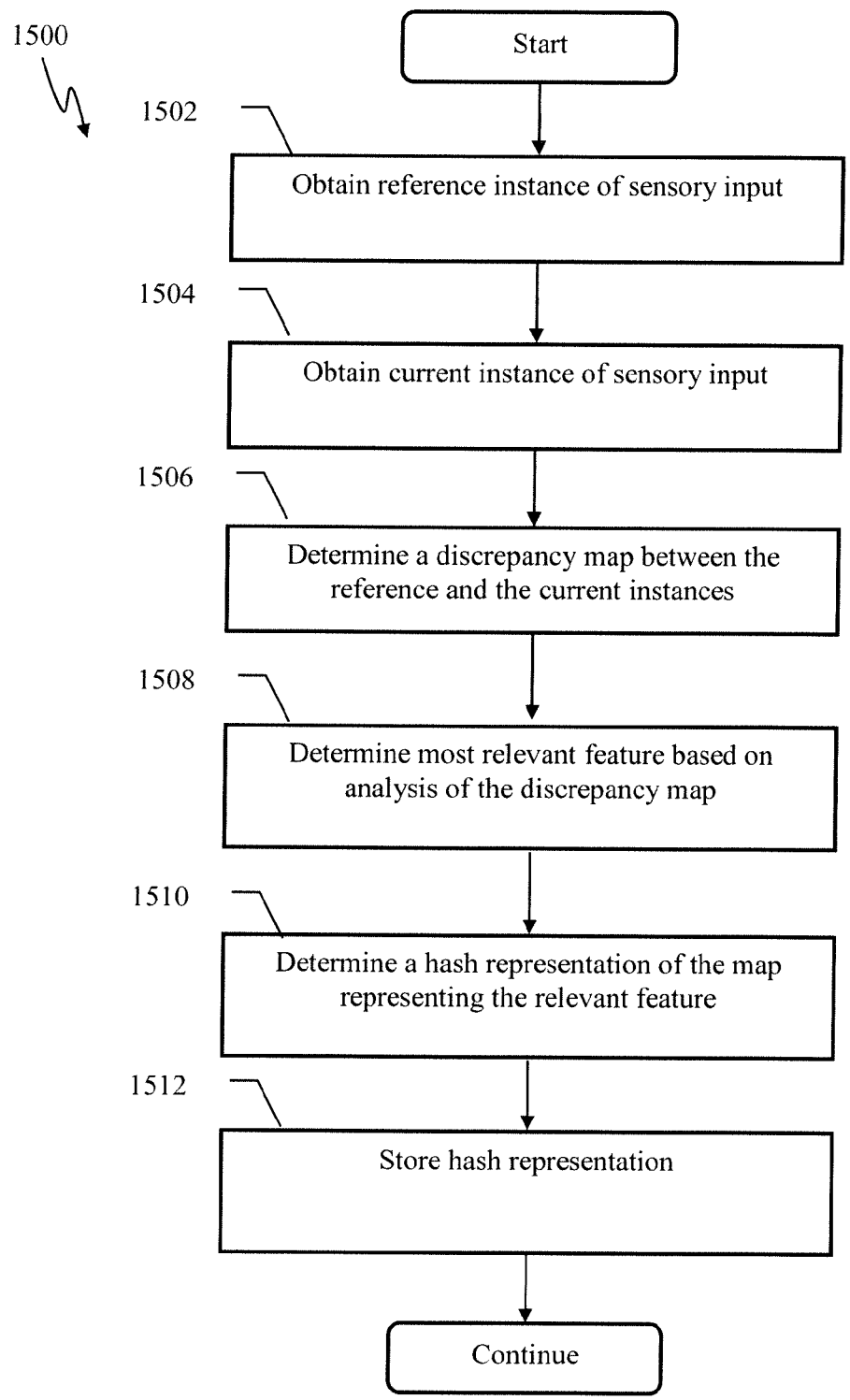
FIG. 15 is a logical flow diagram illustrating a method of determining context in sensory input a learning apparatus, in accordance with one or more implementations.

FIG. 15 illustrates a method of determining context in sensory input a learning apparatus, in accordance with one or more implementations. Methodology illustrated and described with respect to FIG. 15 may be employed for analyzing output of a video sensor (e.g., 212 in FIG. 2A, camera of the device 332 and/or camera 920 of FIG. 9). Images of original video may be down sampled in spatial domain and/or temporal domain form, e.g., 1280×720 pixels at 30 fps down to 80×60 pixels at 10 fps. In some implementations, context methodology may be utilized with data provided by a radar, sonography, x-ray, magnetic resonance imaging, and/or other types of sensing, utilizing various types of waves (e.g., visible light, infrared (IR), ultraviolet (UV), and/or other types of electromagnetic waves, pressure, radio frequency). Methodology of FIG. 15 may be employed by a variety of devices, e.g., learning controller 210, 240 of FIGS. 2A-2B, apparatus 310, 320, 410, 406 of FIGS. 3A-4, apparatus 610, 640, 710, 740, 810, 840, 910, 1000 of FIGS. 6A-10.

At operation 1502 reference instance $I_0$ of sensory input may be obtained. In some implementations, the reference instance may comprise an initial image (e.g., shown in FIG. 17A) of premises associated with task execution (e.g., image of a room comprising the TV 916 of FIG. 9). In one or more implementations, the reference image may comprise output of a low pass filter of image sequence {I(1) . . . I(n−1)} configured as follows:

$$I_0 = \Sigma a_i I(n-i-1) \quad \text{(Eqn. 1)}$$

where $a_i$ denote filter coefficients. In some implementations, the filter of Eqn. 1 may comprise an exponential filter with half-life decay window selected between 1 and 10 second for image sequence refreshed at 10 fps.

At operation 1504 Obtain current instance of sensory input I(n) may be obtained. In some implementations wherein camera sensor may comprise a general purpose camera (e.g., embodies in a smartphone 310 of FIG. 3A) the original image [provided by the camera may be down sampled from camera resolution (e.g., 1900×1280 or 1280× 720 pixels) to 80×60 pixels. In one or more wherein the camera sensor may be configured for feature detection application (e.g., embodied in apparatus 610 and/or 810) the original image may be provided by the camera at target resolution (e.g., 80×60 pixels).

At operation 1506 a discrepancy map between the currents instance of sensory input and the reference instance may be determined. In some implementations of image analysis, the discrepancy map $I_r$ may be configured based on a pixel-wise difference of the current image and the reference image I0 as follows:

$$I_r(n) = I(n) - I_0 \quad \text{(Eqn. 2)}$$

At operation 1508 most relevant (also referred to as salient) feature may be determined based on an analysis of the discrepancy map. In some implementations, the discrepancy map analysis may comprise cluster analysis (e.g., comprising thresholding and determination of largest contiguous (in pixel space) portion and/or portion with the greatest cumulative pixel value, and/or other techniques). The discrepancy map analysis may comprise a winner takes all (WTA) evaluation wherein a single portion may be selected (e.g., the largest area). In some implementations, the discrepancy map analysis may comprise a signal range squashing operation (e.g., based on a sigmoid, arctangent, and/or other operation configured to transform wide range input into a bounded range output). In some implementations, the discrepancy analysis may comprise a soft-max operation expressed as:

$$F=\max(S(I_r(n))), \qquad \text{(Eqn. 3)}$$

wherein F denotes feature output, and S denotes a sigmoid operation.

At operation 1510 a hash representation of the map representing the relevant feature may be determined. In one or more implementations, the hash representation may be determined based on size, location, and/or energy content of the detected relevant feature. Hashing of feature representations may enable more economical storage and/or faster retrieval of features during training and/or operation of the learning process.

At operation 1512, hash representation may be stored, in, e.g., memory of the learning controller (e.g., 1012, 1014 in FIG. 10) and/or in a cloud depository (e.g., 406 in FIG. 4).

FIGS. 17A-17D illustrates context detection using an image sequence in accordance with one or more implementations.

Various image sources may be utilized with the context detection methodology described herein such as digital images comprising plurality of pixels provided by a video camera (e.g., 212 in FIG. 2A), radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The sequence of images and/or image frame may be received from a CCD camera via a receiver apparatus and/or downloaded from a file. The image may comprise a two-dimensional matrix of red green, blue (RGB) values refreshed at a 25 Hz frame rate (and/or any suitable frame rate). It will be appreciated by those skilled in the arts that the above image parameters are merely exemplary, and many other image representations (e.g., bitmap, CMYK, HSV, HSL, grayscale, and/or other representations) and/or frame rates may be equally useful with the present disclosure. Original images provided by a video camera (e.g., 602 in FIG. 6A and/or 920 in FIG. 9) may be cropped (by e.g., 1-20%) to allow for view field translation/rotation, edge artifact removal, and/or other editing operations. Images of original video may be down sampled in spatial domain and/or temporal domain form, e.g., 1280× 720 pixels at 30 fps down to 80×60 pixels at 10 fps.

Figure 17A:
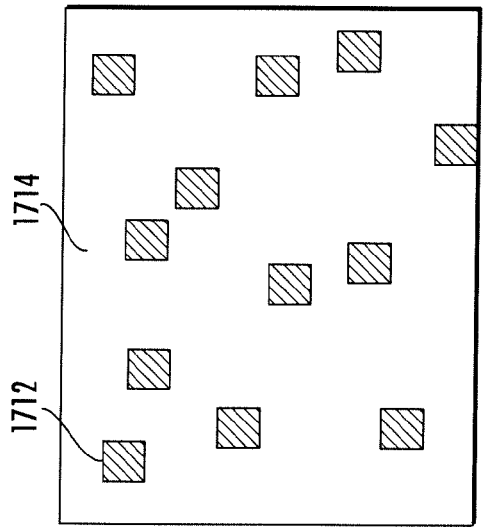
FIGS. 17A-17D presents data illustrating context detection using an image sequence in accordance with one or more implementations.

A reference image may be selected for use by the context detection process. In some implementations, the learning process may be configured to periodically acquire a reference image of the environment. FIG. 17A illustrates an exemplary reference image comprising representations of user hands 1702, 1704.

Figure 17B:
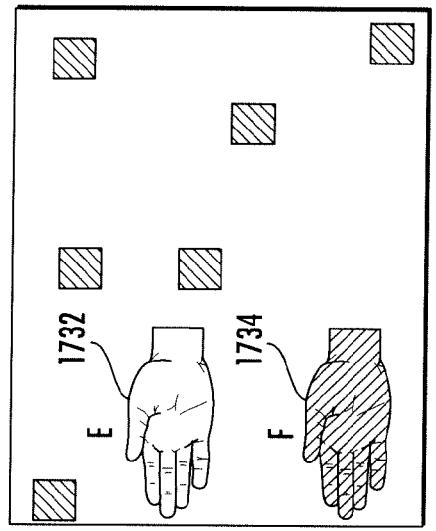

In one or more implementations, the reference image I0 may be determined based on an output of a high pass filter of the image sequence. The filter may comprise an exponential filter operation characterized by decay half life time window selected between 1 and 10 seconds. FIG. 17B illustrates an exemplary reference image determined based on an output of a high pass filter of a sequence of images comprising static (not changing within a given interval) representations (e.g., of user hands). As shown in FIG. 17B, high frequency content of static input comprises random noise component depicted by black 1712 and white 1714 blocks.

During operation of context detection process, a given image may be compared to the reference image in order to determine the context based on changes in sensory input.

Figure 17C:
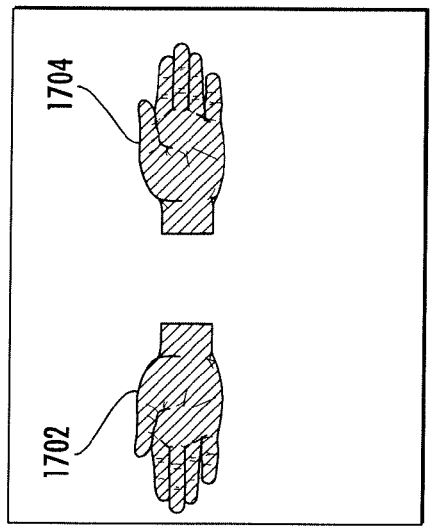

FIG. 17C illustrates output of change detection process (e.g., described by Eqn. 2-Eqn. 1) obtained based on a gradual motion (e.g., on a time-scale of the filter decay) of an object (e.g., user hand 1704 in FIG. 17A) from location A to location C along direction denoted by arrow 1728. User hand representation 1724 at location C may correspond to present time (t). User hand representation 1720 at location A may correspond to a prior time instance t-dt. User hand representation 1722 at location B may correspond to an intermediate time instance t-dt<tb<t. Data in FIG. 17C may be encoded using grayscale representation, wherein greater pixel values may be correspond to darker shades (e.g., maximum value of one may correspond to black), while lower pixel values may be correspond to lighter shades of gray (e.g., value of negative one corresponding to white). As shown in FIG. 17C, due to exponential decay (forgetting) of effects of prior inputs on current output, representation 1724 may comprise darker shape compared to hand representations at prior time instances (e.g., 1722, 1720). Detection of a 'ghosted' pattern of hand representations 1720, 1722, 1724 associated with gradual user hand motion may trigger context detection output indicative of first user gesture (e.g., 'sweep').

Figure 17D:
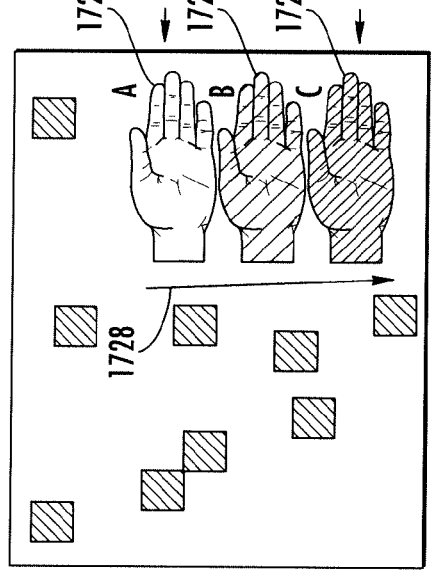

FIG. 17D illustrates output of change detection process (e.g., described by Eqn. 2 and fixed reference image of e.g., FIG. 17A Eqn. 1) obtained based on a sudden (e.g., on a time-scale of the filter decay) motion of an object (e.g., user hand 1702 in FIG. 17A) from location E to location F. Pixel encoding in FIG. 17D may be configured in accordance with the methodology described with respect to FIG. 17C.

As shown in FIG. 17D, pixels of representation 1732 corresponding to prior location of the hand may be characterized by lower relative average (e.g., negative) values creating a 'mirror' image of the hand. Pixels corresponding to current location of the hand may be characterized by greater relative average (e.g., positive) values creating a true image of the hand. The pattern of representations 1732, 1734 of user hand motion may trigger context detection output indicative of a second user gesture (e.g., 'shake').

Context detection methodology shown described with respect to FIGS. 17A-17D may enable context detection that may be sensitive to temporal changes as well as spatial location of the changes. A gesture at a first location may be associated with one action, while the same gesture occurring at another location may be associated with another (different in some implementations) action. In some implementations, the context detection methodology of the disclosure may be configured to perform functions of a location sensor by detecting positions of interesting events, (e.g., movement), and associates different positions with different actions.

In one or more implementations, data from two or more sensor types may be combined (e.g., via an adaptive data fusion process). By way of an illustration, false positive of features detected using video, may be filtered out using audio, proximity, and/or other signal provided in order to disambiguate context detection.

The methodology described herein may advantageously enable automatic operation of computerized appliances by a trained controller apparatus. The learning controller may automatically trigger an action execution by the appliance based on detecting a context that may have been associated with the action during training. In one or more implementations, the action execution may be effectuated based on provision of one or more control instructions to the appliance and/or to an intermediary device in data communication with the appliance.

Use of computerized controllers to automatically operate appliances may obviate need to users to perform mundane tasks (e.g., closing of doors/windows in bad weather), configuring home entertainment system in accordance with detected audience (e.g., based on age, sex, and/or other characteristics), allow users to perform other tasks without interruptions (e.g., automatic TV muting may enable the user to verify caller ID and answer a phone call before it goes to voice mail). Use of training, may enable users to operate home appliances by using gestures, posture, location, sounds, instead of and/or in addition to remote control devices provided by manufacturers. Use of computerized controllers for robot operation may afford users with added functionality that may not have been available otherwise.

In some implementations, a given learning controller (e.g., 210 in FIG. 2A) may be employed to operate a variety of computerized appliances and/or robotic devices. By way of an illustration, a learning controller configured to operate a computerized fan (e.g., 220 in FIG. 2A) may detect presence of another appliance and/or robotic device (e.g., a robotic vacuum cleaner, a night stand 640 in FIG. 6A). The learning controller may be configured to communicate with a depository of learning configurations ("controller brains") and automatically download software components, e.g., drivers, learned associations 104, communication protocol (e.g., to enable transmissions 636), and/or other components that may be required to operate the newly detected device (e.g., 620). In some implementations, a learning controller may be moved from one location to another (e.g., from one room to another room, or within the same room). Based on an analysis of sensory input (e.g., its own position, presence and/or position of objects) the controller learning process may be configured to determine if a previously developed learning configuration for the new location may exist. Based on determination that previously developed learning configuration for the new location exists, the learning controller may download the configuration thereby enabling operation in the new location without additional training.

Multiple learning controllers may be configured to operate a given computerized appliance and/or robotic device. In one or more implementations, multiple learning controllers may be disposed in different rooms of a house. The learning controller disposed in a given room may provide control instructions to a robotic appliance (e.g., vacuum cleaner) operating in that room. When a robotic appliance (e.g., vacuum cleaner) moves to another room, another learning controller disposed in that other room may take over the control operations of the appliance. In some implementations, two or more learning controllers may cooperate when operating a given appliance (e.g., the vacuum cleaner). By way of an illustration, one learning controller may collect and process sensory data, while another learning controller may communicate commands to the appliance, one controller may provide processing resources to another controller while processing sensory input (e.g., video). Various other configurations may be employed (e.g., one controller processing video while another controller processing audio sensory data).

In some implementations of a learning controller embodied in a portable user interface device (e.g., 710/740 of FIGS. 7A/7B) one user may utilize her/his smartphone operating one instance of the learning controller process to operate an appliance. Another user may employ his/her smartphone/tablet computer to operate the same appliance using another instance of the learning process. Individual instances of the learning process may be tailored to user-specific configuration, e.g., user gestures, body size, complexion, hair color/style, content interests (e.g., when operating entertainment appliances), and/or other characteristics.

The methodology described herein may be applicable to perform operations with a variety of household, office, industrial and/or other appliances and/or robotic devices. Various tasks may be executed using trained controllers described herein, including, e.g., cleaning, object removal/sorting/rearrangement, content recording/playback, premises security, premises maintenance, and/or other tasks.

It will be recognized that while certain aspects of the technology are described in terms of a specific sequence of steps of a method, these descriptions are only illustrative of the broader methods of the technology, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the technology disclosed and claimed herein.

While the above detailed description has shown, described, and pointed out novel features of the technology as applied to various implementations, it will be understood that various omissions, substitutions, and changes in the form and details of the device or process illustrated may be made by those skilled in the art without departing from the disclosure. The foregoing description is of the best mode presently contemplated of carrying out the technology. This description is in no way meant to be limiting, but rather should be taken as illustrative of the general principles of the technology. The scope of the technology should be determined with reference to the claims.

What is claimed:

1. A method of providing transmissions to a remotely controlled apparatus by a learning controller, the method comprising:

configuring the learning controller to monitor one or more sensors configured to provide information related to a state of the remotely controlled apparatus disposed remotely from the learning controller;

enabling the learning controller to transmit a wireless command to the remotely controlled apparatus;

performing a plurality of training sessions, each of the plurality of training sessions comprising:

determining the state of the remotely controlled apparatus based on the information from the one or more sensors;

receiving an indication of an activation of a user command; and incrementing an efficacy parameter corresponding to a contemporaneous occurrence of (i) the transmission of the wireless command to the remotely controlled apparatus and (ii) the receiving of the identification of the activation of the user command;

based on the incrementing of the efficacy parameter corresponding to the contemporaneous occurrence, developing an association between the wireless command and the information from the one or more sensors;

assigning a tag configured to identify the developed association between the wireless command and the information from the one or more sensors; and causing the remotely controlled apparatus to execute an action based on the assigned tag.

2. The method of claim 1, wherein at least one of the one or more sensors comprises a video camera.

3. The method of claim 2, wherein transmission of the wireless command comprises an infrared signal transmission.

4. The method of claim 2, wherein transmission of the wireless command comprises a radio frequency signal transmission.

5. The method of claim 1, further comprising:
recording user commands and the state of the remotely controlled apparatus via the learning controller; and
transmitting the wireless command via the learning controller.

6. The method of claim 1, further comprising:
recording the state of the remotely controlled apparatus via a computing cloud entity; and
providing the wireless command via the computing cloud entity;
wherein the learning controller comprises the computing cloud entity in data communication with the remotely controlled apparatus.

7. The method of claim 1, further comprising:
receiving the wireless command from a computing cloud entity, the wireless command based on a profile configured to associate the state with the wireless command;
wherein the learning controller is disposed remote from the computing cloud entity; and
the profile is configured in accordance with a characteristic of the remotely controlled apparatus.

8. A method of remotely controlling a robotic device by a universal controller, the method comprising:
determining a set of instructions based on a user indication provided via the universal controller;
developing an association between the set of instructions and a context determined at least in part on information received by one or more sensors, the developing of association comprising a learning process, the learning process comprising:
detecting the user indication contemporaneously with the context; and
when the contemporaneous user indication and the context are detected, incrementing an entry in a look up table, the entry being associated with performing a task correlated to the user indication;
based on the incrementing of the entry in the look up table, and upon a subsequent occurrence of the context, loading the set of instructions within the universal controller, the set of instructions configured to control the robotic device;
monitoring a state of the robotic device;
determining a command according to the set of instructions; and
transmitting the command to the robotic device, the transmission causing the robotic device to execute the command to perform the task.

9. The method of claim 8, wherein the state of the robotic device comprises a position of the robotic device in an environment of the robotic device.

10. The method of claim 8, wherein the state of the robotic device comprises a parameter characterizing an event that is external to the robotic device.

11. The method of claim 10, wherein the parameter is configured to convey one or more of a position, a gesture, or a movement of a person.

12. The method of claim 8, wherein:
the robotic device is configured to perform the task within an environment comprising one or more objects; and
the task comprises the robotic device displacing at least one of the one or more objects within the environment.

13. The method of claim 8, wherein:
the robotic device is configured to perform the task within an environment comprising one or more objects characterized by corresponding object motion parameters;
the command execution is characterized by a first motion parameter of the robotic device; and
the command execution is configured based on a modification of the first motion parameter based on value associated with at least one of the corresponding object motion parameters.

14. The method of claim 8, where the set of instructions was previously configured for another robotic device or another task.

15. The method of claim 8, wherein the loading of the set of instructions further comprises automatically triggering the loading of the set of instructions based on a detection of a remote transmission or a pre-defined context in a sensory input.

16. The method of claim 8, wherein monitoring the state of the robotic device comprises receiving an input from a video camera.

17. The method of claim 16, wherein:
the robotic device is configured to perform the task within an environment comprising one or more objects; and
the monitored state comprises a position of the robotic device relative to a position of the one or more objects determined based on the input from the video camera.

18. The method of claim 8, wherein:
the robotic device is configured to perform the task within an environment comprising one or more objects characterized by corresponding object motion parameters; and
the task comprises removing one of the one or more objects from a subset of the environment.

19. The method of claim 8; wherein:
the robotic device is configured to perform the task within an environment comprising a first area and a second area;
the monitoring comprises monitoring the state of the robotic device by the universal controller, the universal controller being in the first area, and where the state of the robotic device is monitored by a second universal controller in the second area; and
the transmission of the command is effectuated by one of the first or second universal controllers when the robotic device is within the first area.

20. The method of claim 19, wherein:
the robotic device is configured to receive the transmission of the command from the universal controller when the robotic device is within the first monitoring area; and the robotic device is configured to receive a second transmission from the second universal controller when the robotic device is within the second monitoring area.

21. The method of claim 8, wherein:
the transmitting the command comprises transmitting an infrared frequency signal;
and the state of the robotic device is determined based on an output provided by the one or more sensor.

22. The method of claim 8, wherein:
the robotic device comprises a household appliance; and
the task comprises one or more of a cleaning task.

* * * * *

UNITED STATES PATENT AND TRADEMARK OFFICE
CERTIFICATE OF CORRECTION

PATENT NO.         : 9,849,588 B2                                    Page 1 of 1
APPLICATION NO.    : 14/489242
DATED              : December 26, 2017
INVENTOR(S)        : Eugene M. Izhikevich et al.

It is certified that error appears in the above-identified patent and that said Letters Patent is hereby corrected as shown below:

In the Claims

Currently reads (Claim 21 – Column 53):
"21. The method of claim 8, wherein:
the transmitting the command comprises transmitting an
    infrared frequency signal;
and the state of the robotic device is determined based on
    an output provided by the one or more sensor."

Should read:
-- 21. The method of claim 8, wherein:
the transmitting the command comprises transmitting an
    infrared frequency signal;
and the state of the robotic device is determined based on
    an output provided by the one or more sensors. --

Signed and Sealed this
Twenty-sixth Day of June, 2018

Andrei Iancu
*Director of the United States Patent and Trademark Office*